United States Patent
Singh et al.

(10) Patent No.: US 12,149,635 B2
(45) Date of Patent: Nov. 19, 2024

(54) METHOD AND APPARATUS OF DIGITAL IDENTITY CLAIMS VERIFICATION USING NFC-ENABLED AND HCE-ENABLED SMART DEVICES

(71) Applicant: Elm Company, Riyadh (SA)

(72) Inventors: Shyam Pratap Singh, Riyadh (SA); Arshad Ali Khan, Riyadh (SA); Riad Souissi, Riyadh (SA)

(73) Assignee: Elm Company, Riyadh (SA)

( * ) Notice: Subject to any disclaimer, the term of this patent is extended or adjusted under 35 U.S.C. 154(b) by 193 days.

(21) Appl. No.: 17/888,050

(22) Filed: Aug. 15, 2022

(65) Prior Publication Data

US 2023/0216693 A1 Jul. 6, 2023

Related U.S. Application Data

(60) Provisional application No. 63/295,354, filed on Dec. 30, 2021.

(51) Int. Cl.
*H04L 9/32* (2006.01)
*H04L 9/30* (2006.01)

(52) U.S. Cl.
CPC .............. *H04L 9/3249* (2013.01); *H04L 9/30* (2013.01); *H04L 9/3234* (2013.01)

(58) Field of Classification Search
CPC ........ H04L 9/30; H04L 9/3234; H04L 9/3249
(Continued)

(56) References Cited

U.S. PATENT DOCUMENTS 10,484,345 B2 * 11/2019 Shastry .............. G06Q 20/3263
10,586,227 B2 * 3/2020 Makhdumi ........ G06Q 20/3276
(Continued)

FOREIGN PATENT DOCUMENTS

| CN | 104102939 A | 10/2014 |
|---|---|---|
| EP | 3028206 B1 | 3/2020 |
| WO | 2019052286 A1 | 3/2019 |

OTHER PUBLICATIONS

Pomak et al., Enterprise WiFi Hotspot Authentication with Hybrid Encryption on NFC-Enabled Smartphones, 2018 8th International Conference on Electronics Information and Emergency Communication (ICEIEC), pp. 247-250 (Jun. 2018). (Year: 2018).*
(Continued)

*Primary Examiner* — David P Zarka
(74) *Attorney, Agent, or Firm* — NKL Law; Allen Xue

(57) ABSTRACT

Provided is a method and/or system that facilitates offline sharing and verifying digital identity claims among NFC enabled portable smart devices that are enabled by enabling applications. The enabled portable smart-devices store, verify and share identity, peer to peer and offline. Each identity claim is digitally signed by an identity issuing authority, and the claim can be verified to reliably detect tampering of the claim and thus brings trust in the process of claim sharing and verifying the identity/credentials embodied in the claim. Either Blockchain or non-blockchain, as the backend system of the method/system, can be used, via an inter-operable middleware layer, for onboarding claim holders, claim verifiers, and claim issuers, and for creating/issuing, for managing digital identity claims. NFC, as the communication protocol, facilitates secure data sharing among the NFC-enabled devices.

10 Claims, 33 Drawing Sheets

(58) Field of Classification Search
USPC .......................................................... 713/176
See application file for complete search history.

(56) References Cited

U.S. PATENT DOCUMENTS

| | | | |
|---|---|---|---|
| 10,938,835 B2 | 3/2021 | Oberhauser et al. | |
| 11,042,719 B2 | 6/2021 | Rodriguez et al. | |
| 11,044,087 B2 | 6/2021 | Van Der Velden | |
| 11,223,470 B1* | 1/2022 | Shea | G06F 21/64 |
| 11,334,667 B1* | 5/2022 | Ramanathan | H04L 9/3263 |
| 11,336,462 B1* | 5/2022 | Maganti | H04L 9/0656 |
| 11,366,897 B1* | 6/2022 | Ramanathan | H04L 9/3263 |
| 11,838,410 B1* | 12/2023 | Ramanathan | H04L 9/0861 |
| 11,995,194 B1* | 5/2024 | Shea | H04L 9/0822 |
| 2004/0193685 A1 | 9/2004 | Proehl | |
| 2012/0239560 A1* | 9/2012 | Pourfallah | G06Q 20/102 |
| | | | 705/40 |
| 2016/0135048 A1* | 5/2016 | Huxham | H04L 63/0442 |
| | | | 455/411 |
| 2018/0089971 A1* | 3/2018 | Campero | G07C 9/00182 |
| 2018/0097640 A1* | 4/2018 | Queralt | H04L 63/0815 |
| 2021/0056547 A1 | 2/2021 | Monica et al. | |
| 2021/0194703 A1* | 6/2021 | Queralt | H04L 63/0815 |
| 2021/0365445 A1* | 11/2021 | Robell | G06F 16/90 |
| 2021/0377309 A1* | 12/2021 | Jogand-Coulomb | |
| | | | G06K 7/10366 |
| 2021/0385075 A1* | 12/2021 | Sullivan | H04W 12/04 |
| 2022/0075825 A1* | 3/2022 | Helms | H04L 9/3234 |
| 2022/0358240 A1* | 11/2022 | Neal | G06F 21/6245 |

OTHER PUBLICATIONS

Dirk Van Bokkem et al. "Self-Sovereign Identity Solutions: The Necessity of Blockchain Technology"; arXiv:1904.12816v1 [cs.CR] Apr. 29, 2019; Computer Science and EngineeringDelft University of Technology; pp. 1-8.

Shu Yun Lim et al. "Blockchain Technology the Identity Management and Authentication Service Disruptor: A Survey"; Sep. 2018; International Journal on Advanced Science Engineering and Information Technology; vol. 3, No. 4-2; ISSN: 2088-5334; pp. 1735-1745; DOI:10.18517/ijaseit.8.4-2.6838.

* cited by examiner

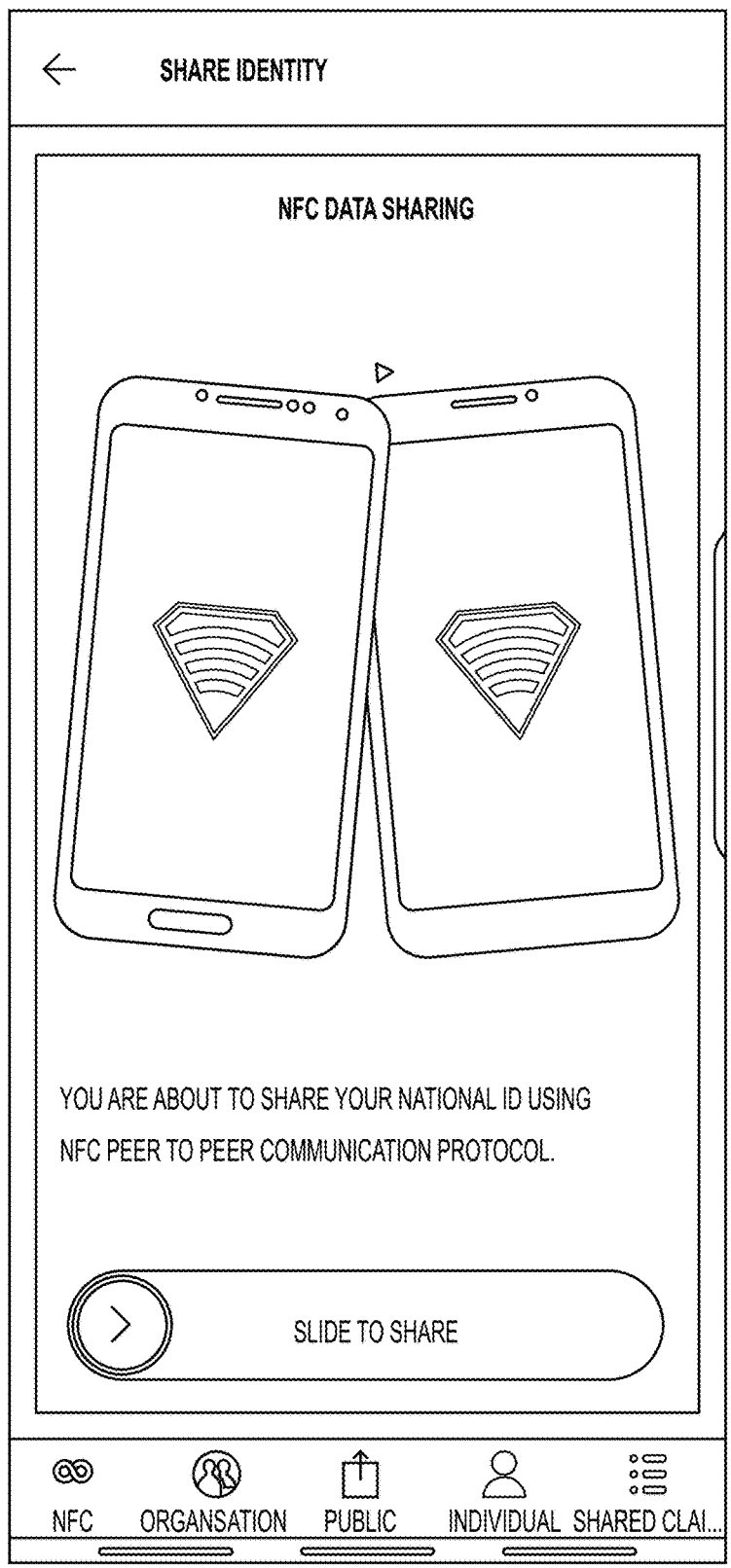
FIG. 7A  AN *iDENTITYCHAIN MOBILE APP* IS READY TO SHARE AN IDENTITY CLAIM (i.e., NATIONAL ID) WITH AN *iDENTITYCHAIN VERIFIER MOBILE* APP ON A NEARBY SMARTPHONE THE CLAIM HOLDER SWIPES RIGHT THE SLIDER CONTROL TO PERMIT THE SHARING OF IDENTITY CLAIM WITH A NEARBY CLAIM VERIFIER. THE TIMER SHOWS THE TIME LEFT BEFORE THE DATA SHARING IS COMPLETE.

THE CLAIM VERIFIER SWIPES RIGHT THE SLIDER CONTROL TO SCAN AND WAIT FOR THE VERIFIER APP TO READ THE IDENTITY CLAIM DATA. THE TIMER SHOWS THE TIME LEFT BEFORE DATA READING IS COMPLETE.

AN IDENTITY CLAIM (i.e., A USER NATIONAL ID) RECEIVED BY THE VERIFIER APP

VERIFIER VERIFIES THE DIGITAL SIGNATURE
ASSOCIATED WITH THE IDENTITY CLAIM

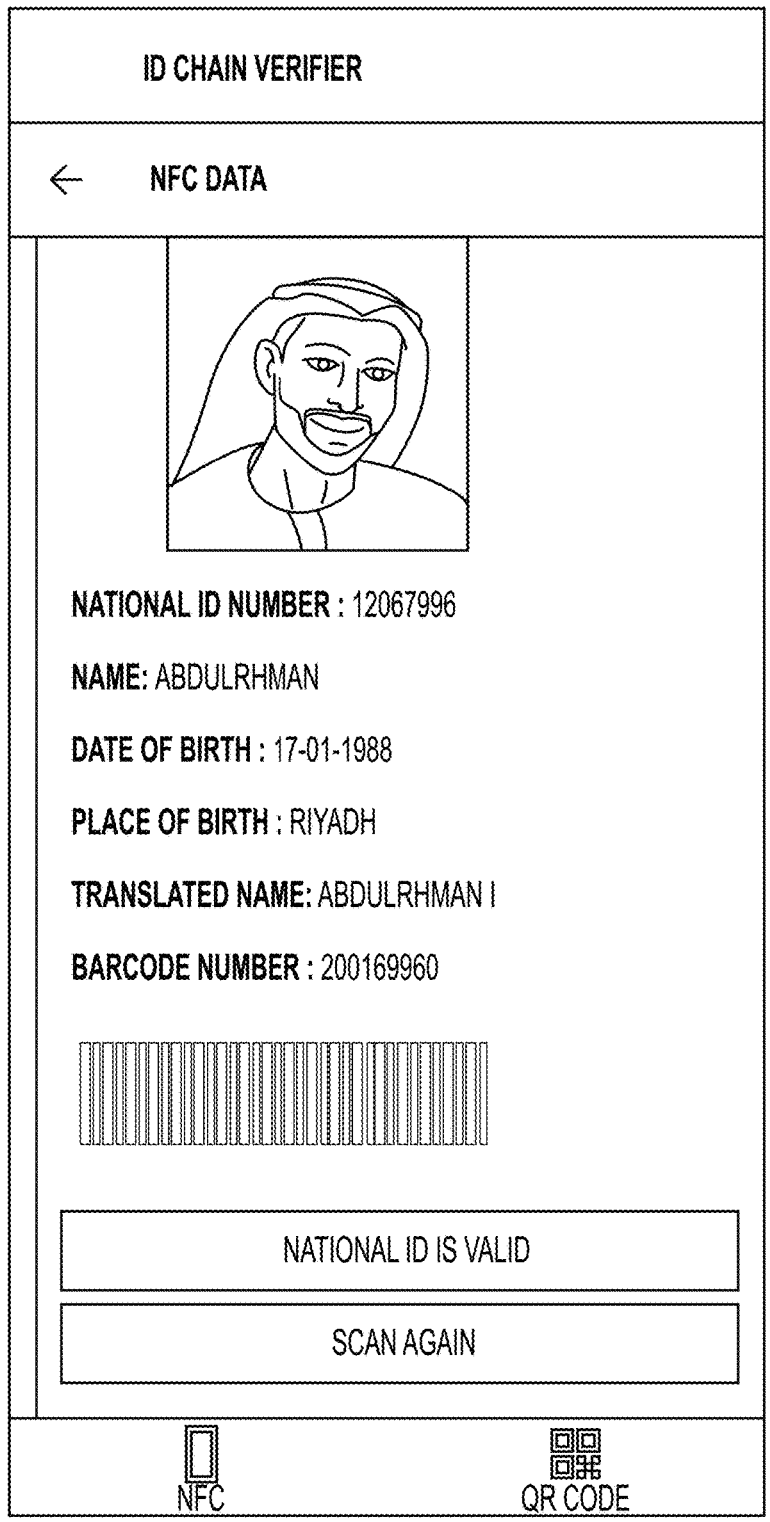
THE IDENTITY CLAIM IS ACCEPTED AS VALID AFTER CHECKING THE ASSOCIATED DIGITAL SIGNATURE. THE DISPLAYED IDENTITY INFORMATION IS FOR THE VERIFIER TO VISUALLY VERIFY THE IDENTITY OF THE IDENTITY CLAIM HOLDER
FIG. 7C (CONT. 2)

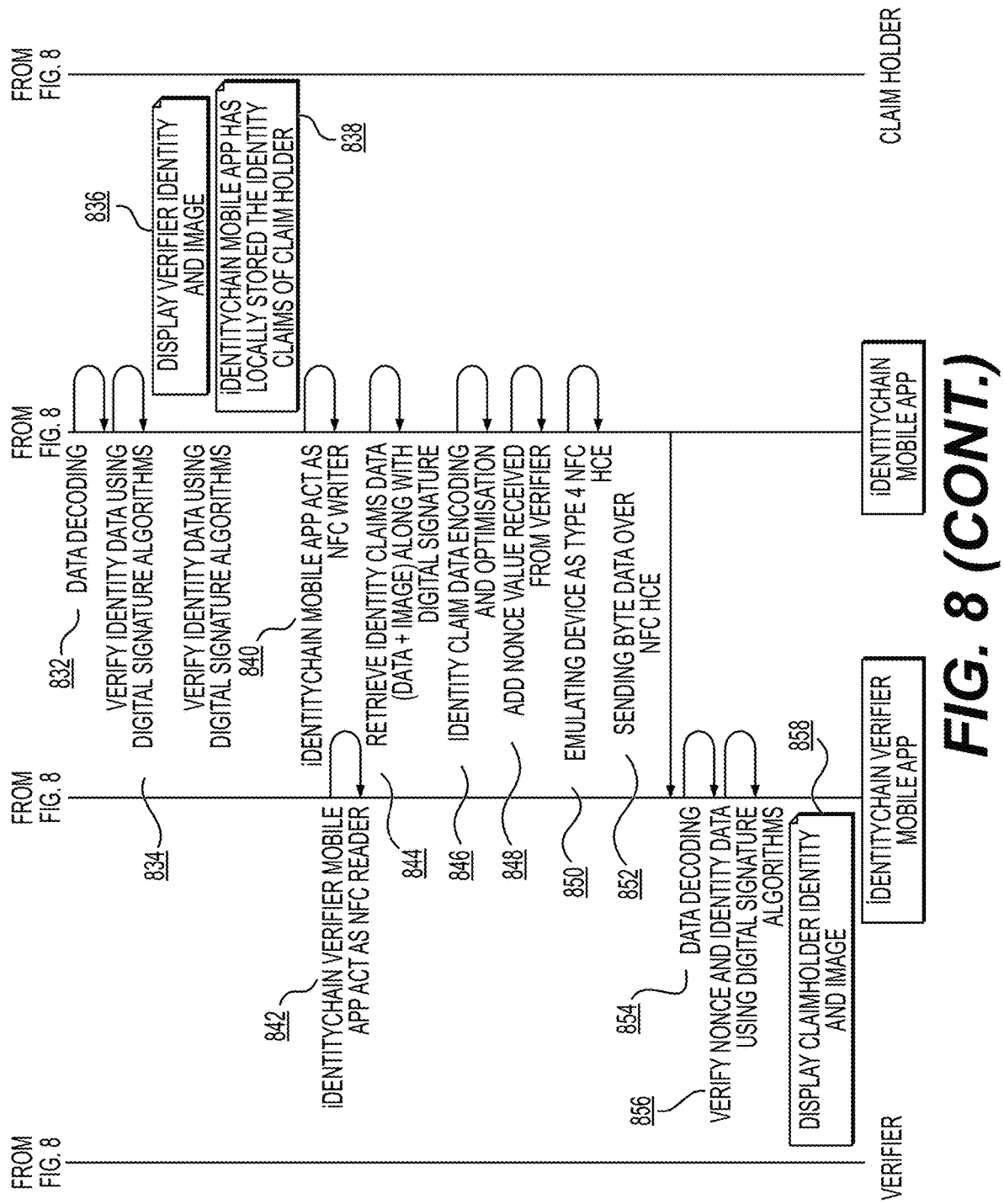

METHOD AND APPARATUS OF DIGITAL IDENTITY CLAIMS VERIFICATION USING NFC-ENABLED AND HCE-ENABLED SMART DEVICES

RELATED APPLICATIONS

This application claims the benefit of priority under 35 U.S.C. § 119 to U.S. Provisional Application No. 63/295,354, filed on Dec. 30, 2021, the entire contents of which are incorporated herein by reference.

BACKGROUND

1. Field of Technology

The present disclosure relates to the field of digital identity claims verification. Specifically, the present method and/or system relates to establishing and authenticating, either online or offline but mainly offline, digital identity claims that are downloaded, stored in, and shared among portable smart and app-enabled devices (such as smartphones or smartwatches) by using Near Field Communication (NFC) peer-to-peer protocol and Host Card Emulation (HCE) protocol. The present method and/or system also relates to an identity management system that is pluggable or interoperable to either a blockchain backend system or a non-blockchain-based backend system to enable individuals to interact with identity claims issuing organizations to register, manage, issue, retrieve, and synchronize identity claims.

2. Introduction of Digital Identity

Digital identity, in general, is defined as a digital representation of the information known about an individual, an entity, or an organization. It is also known as digital identity claim. For the sake of brevity, "digital identity" and "digital identity claim" are abbreviated to "identity", "claim", and/or "identity claim" respectively, terms are interchangeable throughout this document unless otherwise stated. An identity claim is used when an individual expresses his/her right to something that belongs to him/her. For example, a birth certificate is a claim, issued by a hospital, a National ID is a claim issued by the respective ministry of interior, and a university attestation is a claim, issued by a higher education institute such as a university, etc. Those claims can exist in physical forms such as a document printed on paper, or in a digital form such as a verifiable digital form of a paper-based document.

In order to process a request for a certification of an identity claim, several relevant organizational bodies and stakeholders (e.g., verifier, issuer, identity information providers, etc.) need to participate in facilitating the digital identity claim storage, secure retrieval, verification and authentication processes ("participants" herein thereafter).

However, due to circumstances and/or regulations, further need arises for the identity information providers to keep a fine-grained control of their identity related data without unnecessarily sharing every piece of information of the identity related data among participants. The difficulty in establishing trust across various participants of digital identity claim issuing, management, and verification is exacerbated by the need to have a fine-grained control over the amount of identity related information to be shared across the participants. Additionally, there is also a need for supporting online identity verification (i.e., the devices involved in the verification are all connected to the internet that facilitates a real-time communication between the devices and the identity management system from which the requested identity claims are securely and on-demandly retrieved) and offline identity verification as well (i.e., some or all of the devices involved in the verification are disconnected to the internet making impossible of a real-time communication between the devices and the remotely-located identity management system). Lastly, there is also a need to have a inter-operable interface layer that facilities transparent interactions between the front-end devices (i.e., smart devices directly used by end-users such as smartphones or smartwatches) and the backend system (i.e., one or more information managemental systems that collectively receives, stores, manage, secure, and dispatch identity related information), regardless the architectural nature of the backend system such as blockchain architecture or non-blockchain architecture.

To fulfill these challenging needs, an identity claim verification and management platform called the iDentityChain platform is proposed and implemented, as described in later sections. The identity management system can work with a traditional non-blockchain backend or a blockchain backend, and this feature enables participants to manage identity claims securely, transparently, flexibly and efficiently. Moreover, the iDentityChain platform can be relied upon by NFC-enabled devices. NFC/HCE protocols enable sharing and verifying the identity claims among claim holders and claim verifiers in online and offline mode (in the case of lacking the internet connectivity) alike, shielding the end-users from the details of issurance, storage, management, and distribution of identity claims, which are made happen behind the scene, in the collaboration of a middleware layer and a backend system.

3. Description of Related Art

Identity claims of users (i.e., proofs of the identity of a person who claims s/he is) exist in various forms in physical forms (such as a national id, a physical passport, a driver's license, an employment card, and educational records), and/or digital forms (such as digital copy of those physical hard copies). Since these forms of identity claims are not freely exchangeable and communicable, the sharing and verifying thereof across various systems and organizations is a challenge. Conventionally, sharing identity claims entirely depends on the way of sharing allowed by the identity issuing organizations that issue the identity claims to be shared, and as the result, users are constrained to share their identity claims with each other within a limited digital ecosystem (such as via e-mail, or a social media app (e.g., WhatsApp)) prescribed by the identity issuing organizations. Even though sharing users' identity claims outside of the prescribed ecosystem, in some cases, is facilitated, to a certain degree, by the identity issuing organizations, the way that the identity claims are requested and verified outside of the prescribed ecosystem is strictly dictated by the identity issuing organizations.

Another drawback is that a verifier often relies on the verification services provided by an identity issuing organization, and the verification may take long time to get the result back and have a risk of single point of failure (i.e., because identity issuing organizations typically are bureaus, not digital infrastructure builders, their digital infrastructures are not the most effective, responsive and robust). In other words, identity issuing organizations themselves might be bottlenecks or even chokeholds of the performance of the service they provide to their subjects.

Apart from sharing and verifying identities (i.e., identity claims), identity (or identity claims) storage is also a big concern as the data theft, identity leakage cases are going up due to the breakage or leakage of the centralized storage hosted by the identity issuing organizations. It becomes increasingly important to have an identity solution (including an identity storage solution) that provides a secure layer to store identity information and let individuals or organizations to share and verify identity based on mutual consent and trust.

The need to solve the challenges of efficient, flexible, and secure sharing and verifying identity calls for new methods and/or system for registering, managing, retrieving, issuing, and verifying identity claims. The disclosure of the instant application demonstrates one of the new methods and/or systems via the use of, among other things, the NFC-based P2P protocol to enable smart devices to share, store and verify identity across systems in offline or online mode (especially the offline mode). Under this method and/or system, the way that identity claims are verified is free from the identity issuing organizations prescribed constrains and potential performance bottlenecks, and the authenticity of the retrieved identity claims, during the process of identity verification, are secured by a digital signature associated with the identity claims.

The Need to Apply the Solution to Smartwatches

Smartwatches have been seeping into everyday life due to its portability and highly accessible approach towards getting various users' tasks done. It helps in tracking health information, sports activities and blends in many of mobile features like calling and messaging, etc. Because of their wearability, smartwatches serves and extends the purpose of future version of the mobile phones. Smartwatches are already being used as an established method of payment where users can add their debit/credit card on to a smartwatch. Afterwards, users can pay the due amount via the NFC technology by relaying to physical payment terminals. The Wave and Verify method (which will be described later in this document) that we designed and applied has implemented a similar feature in the identity management system where users can share the identity-related data like a National ID, a driver's license, a passport in smartwatch using mobile to smartwatch NFC HCE protocol. These details can be used at the verification stage where users can simply wave the smartwatch near the NFC enabled mobile phones and identity data can be shared securely and efficiently. The entire process works offline that enhances the overall claims verification to go beyond the online mode. Based on such features and enhancements, applying the solution of sharing and verifying identity claims to smartwatches empowers users to carry identity claims in an even more portable devices such as smartwatches (i.e., smartwatches is more portable than smartphones) than presenting physical copies or digital copies (stored in mobile phones) at points of interest (POIs).

SUMMARY OF THE DESCRIPTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The purpose of the present disclosure is to resolve the aforementioned problems and/or limitations of the conventional technique, that is, to provide a solution for effectively and conveniently sharing and verifying digital identity claims using portable smart devices facilitated by enabling apps, and a middleware layer that interfaces the various apps, and a backend system (identity management and storage system) that interoperates with the middleware layer.

Provided is a method for offline sharing and verifying identity claims among app enabled and Near Field Communication (NFC) enabled portable devices, comprising: retrieving, by a first app installed and running on a first device that is held by an identity claim holder, a first set of identity claims that is pre-obtained and locally stored on the first device, wherein the first app is set to a claim holder mode, wherein the identity claim holder has onboarded with a backend system in an onboarding process of the identity claim holder with the backend system; encoding and optimizing, by the first app, the first set of identity claims into a first payload, and emulating the first device as a Type 4 NFC Host Card Emulation (HCE) device; moving, by an identity claim verifier, a second device enabled by a second app, to a distance less than 10 centimeter from the first device to allow the first device and the second device to establish an NFC communication, wherein the second device is a smartphone storing a public key of a claim issuer, and the second app is a smartphone-based app, wherein the second app is set to a claim verifier mode, wherein the public key of the claim issuer is previously retrieved from the backend system in an onboarding process of the identity claim verifier with the backend system, and wherein the public key of the claimer issuer is pre-assigned to the claim issuer by the backend system and stored in the backend system in an onboarding process of the claim issuer with the backend system; sending, by the first device upon an establishment of the NFC communication, the first payload to the second device; receiving and then decoding, by the second app, the first payload; verifying, by the second app, the authenticity of the first set of identity claims that is included in first payload, by validating, by using the pre-stored public key of the claim issuer, a first digital signature included in the first payload, wherein the validating applies a Rivest-Shamir-Adleman (RSA) algorithm to validate the first digital signature by passing the pre-stored public key of the claim issuer, the first digital signature, and a checksum of the first set of identity claims created by using a hashing algorithm; displaying, in the second app upon the authenticity of the first set of identity claims being verified, one or more identities and an image of the identity claim holder that are included in the first set of identity claims to the identity claim verifier.

In one embodiment of the provided method, the backend system is either a permissioned enterprise blockchain framework (FEBF) or a non-blockchain platform (NBP), wherein the FEBF comprises a built-in Certifying Authority (CA), a ledger, and a distributed network by using the FEBF's CA to obtain a plurality of public keys, a plurality of private keys, and a x.509 certificate, wherein the NBP comprises a data storage and an identity management server, wherein the first device is either a smartphone or a smartwatch, wherein the first app is a smartphone-based app when the first device is a smartphone, and the first app is a smartwatch-based app when the first device is a smartwatch.

In a further refinement of the embodiment stated in previous paragraph, the onboarding process of the claim issuer with the backend system comprising: registering the identity issuer in the backend system by providing a first set of required credentials of the identity issuer to an administrator of the backend system, wherein the required credentials of the identity verifier are information presented on a government issued document showing that the identity issuer is authorized to issue identity claims of other people within the scope of an authorized capacity, issuing, by the backend system, the public key, a x.509 certificate, and a private key to the claim issuer, and storing the public key, the x.509 certificate, and the private key in the backend system; and wherein the onboarding process of the identity claim holder with the backend system comprising: registering the identity claim holder in the backend system by providing a first set of basic identity claims of the identity issuer to the administrator of the backend system, wherein the first set of basic identity claims of the identity claim holder comprises identity information about the identity claim holder presented on a government issued identification document of the identity claim holder, retrieving the public key of the identity issuer from the backend system, and storing the retrieved public key on the first device held by the identity claim holder; and wherein the onboarding process of the identity claim verifier with the backend system comprising: registering the identity claim verifier in the backend system by providing a second set of basic identity claims and a second set of required credentials of the identity verifier to the administrator of the backend system, wherein the second set of basic identity claims of the identity claim verifier comprises identity information about the identity claim verifier presented on a government issued identification document of the identity claim verifier and the second set of required credentials of the identity verifier are information presented on a government issued document showing that the identity claim verifier is authorized to verify identity claims of other people, retrieving, by the identity claim verifier upon a successful registration of the identity claim verifier in the backend system, the public key of the identity issuer from the backend system, and storing the retrieved public key on the second device held by the identity claim verifier.

In a further refinement of the embodiment stated in previous paragraph, the first device is a smartphone, and wherein the first set of identity claims is pre-obtained by the first device when the first device is online in a first recurring process of obtaining the first set of identity claims for the first device, the first recurring process starts in a first pre-defined interval and the first recurring process comprising: determining, by the first app, whether the first set of identity claims of the identity claim holder is stored on the first device; in response to the determination of that the first set of identity claims of the identity claim holder is stored on the first device, further determining, by the first app, whether the first set of identity claims of the identity claim holder has been stored on the first device for more than a first pre-defined time limit; in response to the determination of that the first set of identity claims of the identity claim holder has been stored on the first device for no more than the first pre-defined time limit, exiting the first recurring process of obtaining the first set of identity claims process, otherwise proceeding to the following steps; removing, if there is the first set of identity claims of the identity claim holder on the first device, the first set of identity claims of the identity claim holder from the first device; sending, by the identity claim holder via the first app on the first device, a request to issue the first set of identity claims of the identity claim holder, along with the first set of basic identity claims of the identity claim holder, to a middleware layer that infaces with the backend system; sending, by the middleware layer upon successful authentication of the first set of basic identity claims of the identity claim holder based on the first set of basic identity claims of the identity claim holder, an event to the middleware layer to fetch a set of identity claims data for the identity claim holder; determining, by the middleware layer, whether there is a signed identity payload of a set of identity claims of the identity claim holder stored on a storage device of the backend system; in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the first app, otherwise creating, by the middleware layer, a signed identity payload, and sending the signed identity payload to the first app, wherein the creating step comprising: sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the first app, the signed identity payload from the middleware layer, and storing the signed identity payload on the first device, wherein the signed identity payload contains the first set of identity claims and a digital signature that is the result of the signing of the identity payload with the private key assigned to and possessed by the identity issuer; and storing, by the first app, the first set of identity claims on the first device.

In yet another refinement of the embodiment stated two paragraphs above, the first device is a smartwatch, and wherein the first set of identity claims is pre-obtained by the first device from a third device that is an app-enabled and NFC-enabled smartphone and is under the control of the identity claim holder, in a second recurring process of obtaining the first set of identity claims for the first device, the second recurring process starts in a second pre-defined interval, and the second recurring process comprising: determining, by the first app, whether the first set of identity claims of the identity claim holder is stored on the first device; in response to the determination of that the first set of identity claims of the identity claim holder is stored on the first device, further determining, by the first app, whether the first set of identity claims of the identity claim holder has been stored on the first device for more than a second pre-defined time limit; in response to the determination of that the first set of identity claims of the identity claim holder has been stored on the first device for no more than the second pre-defined time limit, exiting the second recurring process of obtaining the first set of identity claims process, otherwise proceeding to the following steps; removing, if there is the first set of identity claims of the identity claim holder on the first device, the first set of identity claims of the identity claim holder from the first device, moving, by the identity claim holder, the first device, to a distance less than 10 centimeters from the third device, to allow the first device and the third device to establish an NFC communication, sending, by the first app upon establishing the NFC communication between the first device and the third device, a request to synchronize the first set of identity claims of the identity claim holder from the third device; determining, by a third app running on the third device, whether the first set of identity claims of the identity claim holder is stored on the third device; in response to the determination of that the first set of identity claims of the identity claim holder is stored on the third device, the third app sending the first set of identity claims of the identity claim holder to the first app, otherwise the third app conducting steps comprising: sending, by the third app, a request to issue the first set of identity claims of the identity claim holder, along with the first set of basic identity claims of the identity claim holder, to a middleware layer that infaces with the backend system, sending, by the middleware layer upon successful authentication of the first set of basic identity claims of the identity claim holder, an event to the middleware layer to fetch a set of identity claims data for the identity claim holder, determining, by the middleware layer, whether there is a signed identity payload of a set of identity claims of the identity claim holder stored on a storage device of the backend system, in response to the determination of that there is a signed identity payload of a set of identity claims of the identity claim holder stored on the storage device of the backend system, retrieving and sending to the third app on the third device, by the middleware layer, the signed identity payload, and obtaining, by the third device, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device; otherwise, creating, by the middleware layer, an identity payload based on the x.509 certificate assigned to and possessed by the identity issuer and is signed with the private key assigned to and possessed by the identity issuer, storing, by the middleware layer, the signed identity payload in the storage device of the backend system, sending to the third app, by the middleware layer, the signed identity payload, obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer, and storing, by the third app, the first set identity claims on the third device; and sending, by the third app, the first set of identity claims of the identity claim holder to the first app.

In a further refinement of the embodiment stated in the above paragraph, the first set of identity claims is pre-obtained by the third device when the third device is online in a third recurring process of obtaining the first set of identity claims for the third device, the third recurring process starts in a third pre-defined interval and the third recurring process comprising: determining, by the third app, whether the first set of identity claims of the identity claim holder is stored on the third device; in response to the determination of that the first set of identity claims of the identity claim holder is stored on the third device, further determining, by the third app, whether the first set of identity claims of the identity claim holder has been stored on the third device for more than a third pre-defined time limit; in response to the determination of that the first set of identity claims of the identity claim holder has been stored on the third device for no more than the third pre-defined time limit, exiting the third recurring process of obtaining the first set of identity claims process, otherwise proceeding to the following steps; removing, if there is the first set of identity claims of the identity claim holder on the third device, the first set of identity claims of the identity claim holder from the third device; sending, by the identity claim holder via the third app on the third device, a request to issue the first set of identity claims of the identity claim holder, along with the first set of basic identity claims of the identity claim holder, to the middleware layer that infaces with the backend system; sending, by the middleware layer upon successful authentication of the first set of basic identity claims of the identity claim holder based on the first set of basic identity claims of the identity claim holder, an event to the middleware layer to fetch a set of identity claims data for the identity claim holder; determining, by the middleware layer, whether there is a signed identity payload of a set of identity claims of the identity claim holder stored on a storage device of the backend system; in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the third app, otherwise creating, by the middleware layer, a signed identity payload, and sending the signed identity payload to the third app, wherein the creating step comprising: sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device.

In a further refinement of the embodiment stated in the above paragraph, the third pre-defined interval is longer than the second pre-defined interval, and the third pre-predefined time limit is longer than the second pre-defined time limit.

In yet another embodiment of the provided method, further comprising verifying, by the identity claim holder, the identity of the identity claim verifier prior to the step of retrieving, by the first app installed and running on a first device that is held by an identity claim holder, a first set of identity claims that is pre-obtained and locally stored on the first device, wherein the verifying the identity of the identity verifier comprising: setting the second app to a claim holder mode, setting the first app to the claim verifier mode, retrieving, by the second device acting as an NFC Writer under the control of the second app, a second set of identity claims that is pre-obtained and locally stored on the second device, encoding and optimizing, by the second app, the second set of identity claims into a second payload, adding a nonce value to the second payload, and emulating the second device as a Type 4 NFC HCE device, moving, by the identity claim verifier, the second device, to a distance less than 10 centimeters to the first device to allow the second device and the first device to establish an NFC communication, wherein the first device stores the public key of the identity issuer, wherein the public key of the claim issuer is previously retrieved from the backend system in the onboarding process of the identity claim holder with the backend system, sending, by the second app upon an establishment of the NFC communication, the second payload to the first device, receiving, by the first device acting as an NFC Reader under the control of the first app, the second payload, decoding, by the first app, the second payload, and storing the nonce value added to the second payload on the first device; verifying, by the first app by using the public key of the claim issuer, the authenticity of the second set of identity claims by validating a second digital signature included in the second payload, wherein the validating applies the RSA algorithm to validate the second digital signature by passing the public key of the claim issuer, the second digital signature, and a checksum of the second set of identity claims created by using the hashing algorithm; displaying, in the first app upon the authenticity of the second set of identity claims being verified, one or more identities and an image of the identity claim verifier that are included in the second set of identity claims to the identity claim holder; wherein the encoding and optimizing, by the first app, the first set of identity claims into a first payload, further comprising adding the nonce value stored on the first device to the first payload; and wherein the verifying, by the second app, the authenticity of the first set of identity claims, further comprising: determining whether the nonce value included in the first payload matches with the nonce value added to the second payload; in response to the determination of that the nonce value included in the first payload does not match with the nonce value added to the second payload, aborting, by the second app, the verifying step, otherwise, continuing the verifying step.

In a refinement of the embodiment stated in above paragraph, the step of retrieving the first set of identity claims only proceeds when the identity of the identity claim verifier is successfully verified by the identity claim holder.

In yet another refinement of the embodiment stated in paragraph above the previous paragraph, the second set of identity claims is pre-obtained by the second device when the second device is online in a fourth recurring process of obtaining the second set of identity claims for the second device, the fourth recurring process starts in a fourth pre-defined interval and the fourth recurring process comprising: determining, by the second app, whether the second set of identity claims of the identity claim verifier is stored on the second device; in response to the determination of that the second set of identity claims of the identity claim verifier is stored on the second device, further determining, by the second app, whether the second set of identity claims of the identity claim verifier has been stored on the second device for more than a fourth pre-defined time limit; in response to the determination of that the second set of identity claims of the identity claim verifier has been stored on the second device for no more than the fourth pre-defined time limit, exiting the fourth recurring process of obtaining the second set of identity claims process, otherwise proceeding to the following steps; removing, if there is the second set of identity claims of the identity claim verifier on the second device, the second set of identity claims of the identity claim verifier from the second device; sending, by the identity claim verifier via the second app on the second device, a request to issue the second set of identity claims of the identity claim verifier, along with the second set of basic identity claims of the identity claim verifier, to a middleware layer that infaces with the backend system; sending, by the middleware layer upon successful authentication of the second set of basic identity claims of the identity claim verifier based on the second set of basic identity claims of the identity claim verifier, an event to the middleware layer to fetch a set of identity claims data for the identity claim verifier; determining, by the middleware layer, whether there is a signed identity payload of a set of identity claims of the identity claim verifier stored on a storage device of the backend system; in response to the determination of that there is a signed identity payload of a set of identity claims of the identity claim verifier stored on the storage device of the backend system, retrieving, by the middleware layer, the signed identity payload of a set of identity claims of the identity claim verifier stored on the storage device of the backend system, and sending the signed identity payload to the second app, otherwise creating, by the middleware layer, a signed identity payload, and sending the signed identity payload to the second app, wherein the creating step comprising: sending, by the backend system, an event to the identity issuer to get identity details of the identity claim verifier, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the second app, the signed identity payload from the middleware layer, and storing the signed identity payload on the second device, wherein the signed identity payload contains the second set of identity claims and a digital signature that is the result of the signing of the identity payload with the private key assigned to and possessed by the identity issuer; and storing, by the second app, the second set of identity claims on the second device.

Provided is a system for offline sharing and verifying identity claims among app enabled and Near Field Communication (NFC) enabled portable devices, comprising: a backend system configured to enroll claim issuers, issue, store, and distribute identity claims; a middleware layer configured to interact with a database that manages sharing and verifying identity claims events, and, co-operate with the backend system to retrieve and receive identity claims therefrom, and to provide identity services to end users; a user interaction layer configured to use the identity services provided by the middleware layer and to provide user interface to a user for sharing and verifying identity claims, wherein the user interaction layer interfaces with the user either in a web portal mode, a claim holder mode, or a claim verifier mode, wherein in a web portal mode, the user interaction layer is used to onboard the user to the backend system, whereas in a claim holder mode, the user interaction layer is used to have the user's identity claims shared and verified, whereas in a claim verifier mode, the user interaction layer is used to facilitate the user to verify the identity claims of a different user.

In one embodiment of the provided system, when the system is running, it facilitates operations comprising: retrieving, by a first app installed and running on a first device that is held by an identity claim holder, a first set of identity claims that is pre-obtained and locally stored on the first device, wherein the first app is set to a claim holder mode, wherein the identity claim holder has onboarded with the backend system in an onboarding process of the identity claim holder with the backend system; encoding and optimizing, by the first app, the first set of identity claims into a first payload, and emulating the first device as a Type 4 NFC Host Card Emulation (HCE) device; moving, by an identity claim verifier, a second device enabled by a second app, to a distance less than 10 centimeter from the first device to allow the first device and the second device to establish an NFC communication, wherein the second device is a smartphone storing a public key of a claim issuer, and the second app is a smartphone-based app, wherein the second app is set to a verifier mode, wherein the public key of the claim issuer is previously retrieved from the backend system in an onboarding process of the identity claim verifier with the backend system, and wherein the public key of the claimer issuer is pre-assigned to the claim issuer by the backend system and stored in the backend system in an onboarding process of the claim issuer with the backend system; sending, by the first device upon an establishment of the NFC communication, the first payload to the second device; receiving and then decoding, by the second app, the first payload; verifying, by the second app, the authenticity of the first set of identity claims that is included in first payload, by validating, by using the pre-stored public key of the claim issuer, a first digital signature included in the first payload, wherein the validating applies a Rivest-Shamir-Adleman (RSA) algorithm to validate the first digital signature by passing the pre-stored public key of the claim issuer, the first digital signature, and a checksum of the first set of identity claims created by using a hashing algorithm; displaying, in the second app upon the authenticity of the first set of identity claims being verified, one or more identities and an image of the identity claim holder that are included in the first set of identity claims to the identity claim verifier.

In one refinement of the above embodiment, the backend system is either a permissioned enterprise blockchain framework (FEBF) or a non-blockchain platform (NBP), wherein the FEBF comprises a built-in Certifying Authority (CA), a ledger, and a distributed network by using the FEBF's CA to obtain a plurality of public keys, a plurality of private keys, and a x.509 certificate, wherein the NBP comprises a data storage and an identity management server, wherein the first device is either a smartphone or a smartwatch, wherein the first app is a smartphone-based app when the first device is a smartphone, and the first app is a smartwatch-based app when the first device is a smartwatch.

In a further refinement of the above embodiment, the onboarding process of the claim issuer with the backend system comprising: registering the identity issuer in the backend system, via the user interface layer in the web portal mode, by providing a first set of required credentials of the identity issuer to an administrator of the backend system, wherein the required credentials of the identity verifier are information presented on a government issued document showing that the identity issuer is authorized to issue identity claims of other people within the scope of an authorized capacity, issuing, by the backend system, the public key, a x.509 certificate, and a private key to the claim issuer, and storing the public key, the x.509 certificate, and the private key in the backend system; and wherein the onboarding process of the identity claim holder with the backend system comprising: registering the identity claim holder in the backend system, via the user interface layer in the web portal mode, by providing a first set of basic identity claims of the identity issuer to the administrator of the backend system, wherein the first set of basic identity claims of the identity claim holder comprises identity information about the identity claim holder presented on a government issued identification document of the identity claim holder, retrieving the public key of the identity issuer from the backend system, and storing the retrieved public key on the first device held by the identity claim holder; and wherein the onboarding process of the identity claim verifier with the backend system comprising: registering the identity claim verifier in the backend system, via the user interface layer in the web portal mode, by providing a second set of basic identity claims and a second set of required credentials of the identity verifier to the administrator of the backend system, wherein the second set of basic identity claims of the identity claim verifier comprises identity information about the identity claim verifier presented on a government issued identification document of the identity claim verifier and the second set of required credentials of the identity verifier are information presented on a government issued document showing that the identity claim verifier is authorized to verify identity claims of other people, retrieving, by the identity claim verifier upon a successful registration of the identity claim verifier in the backend system, the public key of the identity issuer from the backend system, and storing the retrieved public key on the second device held by the identity claim verifier.

In a further refinement of the above stated embodiment, the first device is a smartphone, and wherein the first set of identity claims is pre-obtained by the first device when the first device is online in a first recurring process of obtaining the first set of identity claims for the first device, the first recurring process starts in a first pre-defined interval and the first recurring process comprising: determining, by the first app, whether the first set of identity claims of the identity claim holder is stored on the first device; in response to the determination of that the first set of identity claims of the identity claim holder is stored on the first device, further determining, by the first app, whether the first set of identity claims of the identity claim holder has been stored on the first device for more than a first pre-defined time limit; in response to the determination of that the first set of identity claims of the identity claim holder has been stored on the first device for no more than the first pre-defined time limit, exiting the first recurring process of obtaining the first set of identity claims process, otherwise proceeding to the following steps; removing, if there is the first set of identity claims of the identity claim holder on the first device, the first set of identity claims of the identity claim holder from the first device; sending, by the identity claim holder via the first app on the first device, a request to issue the first set of identity claims of the identity claim holder, along with the first set of basic identity claims of the identity claim holder, to a middleware layer that infaces with the backend system; sending, by the middleware layer upon successful authentication of the first set of basic identity claims of the identity claim holder based on the first set of basic identity claims of the identity claim holder, an event to the middleware layer to fetch a set of identity claims data for the identity claim holder; determining, by the middleware layer, whether there is a signed identity payload of a set of identity claims of the identity claim holder stored on a storage device of the backend system; in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the first app, otherwise creating, by the middleware layer, a signed identity payload, and sending the signed identity payload to the first app, wherein the creating step comprising: sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the first app, the signed identity payload from the middleware layer, and storing the signed identity payload on the first device, wherein the signed identity payload contains the first set of identity claims and a digital signature that is the result of the signing of the identity payload with the private key assigned to and possessed by the identity issuer; and storing, by the first app, the first set of identity claims on the first device.

In a further refinement of the embodiment stated in the paragraph above the proceeding paragraph, the first device is a smartwatch, and wherein the first set of identity claims is pre-obtained by the first device from a third device that is an app-enabled and NFC-enabled smartphone and is under the control of the identity claim holder, in a second recurring process of obtaining the first set of identity claims for the first device, the second recurring process starts in a second pre-defined interval, and the second recurring process comprising: determining, by the first app, whether the first set of identity claims of the identity claim holder is stored on the first device; in response to the determination of that the first set of identity claims of the identity claim holder is stored on the first device, further determining, by the first app, whether the first set of identity claims of the identity claim holder has been stored on the first device for more than a second pre-defined time limit; in response to the determination of that the first set of identity claims of the identity claim holder has been stored on the first device for no more than the second pre-defined time limit, exiting the second recurring process of obtaining the first set of identity claims process, otherwise proceeding to the following steps; removing, if there is the first set of identity claims of the identity claim holder on the first device, the first set of identity claims of the identity claim holder from the first device, moving, by the identity claim holder, the first device, to a distance less than 10 centimeters from the third device, to allow the first device and the third device to establish an NFC communication, sending, by the first app upon establishing the NFC communication between the first device and the third device, a request to synchronize the first set of identity claims of the identity claim holder from the third device; determining, by a third app running on the third device, whether the first set of identity claims of the identity claim holder is stored on the third device; in response to the determination of that the first set of identity claims of the identity claim holder is stored on the third device, the third app sending the first set of identity claims of the identity claim holder to the first app, otherwise the third app conducting steps comprising: sending, by the third app, a request to issue the first set of identity claims of the identity claim holder, along with the first set of basic identity claims of the identity claim holder, to a middleware layer that infaces with the backend system, sending, by the middleware layer upon successful authentication of the first set of basic identity claims of the identity claim holder, an event to the middleware layer to fetch a set of identity claims data for the identity claim holder, determining, by the middleware layer, whether there is a signed identity payload of a set of identity claims of the identity claim holder stored on a storage device of the backend system, in response to the determination of that there is a signed identity payload of a set of identity claims of the identity claim holder stored on the storage device of the backend system, retrieving and sending to the third app on the third device, by the middleware layer, the signed identity payload, and obtaining, by the third device, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device; otherwise, creating, by the middleware layer, an identity payload based on the x.509 certificate assigned to and possessed by the identity issuer and is signed with the private key assigned to and possessed by the identity issuer, storing, by the middleware layer, the signed identity payload in the storage device of the backend system, sending to the third app, by the middleware layer, the signed identity payload, obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer, and storing, by the third app, the first set identity claims on the third device; and sending, by the third app, the first set of identity claims of the identity claim holder to the first app.

In a further refinement of the above embodiment, the first set of identity claims is pre-obtained by the third device when the third device is online in a third recurring process of obtaining the first set of identity claims for the third device, the third recurring process starts in a third pre-defined interval and the third recurring process comprising: determining, by the third app, whether the first set of identity claims of the identity claim holder is stored on the third device; in response to the determination of that the first set of identity claims of the identity claim holder is stored on the third device, further determining, by the third app, whether the first set of identity claims of the identity claim holder has been stored on the third device for more than a third pre-defined time limit; in response to the determination of that the first set of identity claims of the identity claim holder has been stored on the third device for no more than the third pre-defined time limit, exiting the third recurring process of obtaining the first set of identity claims process, otherwise proceeding to the following steps; removing, if there is the first set of identity claims of the identity claim holder on the third device, the first set of identity claims of the identity claim holder from the third device; sending, by the identity claim holder via the third app on the third device, a request to issue the first set of identity claims of the identity claim holder, along with the first set of basic identity claims of the identity claim holder, to the middleware layer that infaces with the backend system; sending, by the middleware layer upon successful authentication of the first set of basic identity claims of the identity claim holder based on the first set of basic identity claims of the identity claim holder, an event to the middleware layer to fetch a set of identity claims data for the identity claim holder; determining, by the middleware layer, whether there is a signed identity payload of a set of identity claims of the identity claim holder stored on a storage device of the backend system; in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the third app, otherwise creating, by the middleware layer, a signed identity payload, and sending the signed identity payload to the third app, wherein the creating step comprising: sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device.

In a further refinement of the above embodiment, the third pre-defined interval is longer than the second pre-defined interval, and the third pre-predefined time limit is longer than the second pre-defined time limit.

In yet another embodiment of the provided system, when running, the provided system facilitates operations further comprising verifying, by the identity claim holder, the identity of the identity claim verifier prior to the step of retrieving, by the first app installed and running on a first device that is held by an identity claim holder, a first set of identity claims that is pre-obtained and locally stored on the first device, wherein the verifying the identity of the identity verifier comprising: setting the second app to the claim holder mode, setting the first app to the claim verifier mode, retrieving, by the second device acting as an NFC Writer under the control of the second app, a second set of identity claims that is pre-obtained and locally stored on the second device, encoding and optimizing, by the second app, the second set of identity claims into a second payload, adding a nonce value to the second payload, and emulating the second device as a Type 4 NFC HCE device, moving, by the identity claim verifier, the second device, to a distance less than 10 centimeters to the first device to allow the second device and the first device to establish an NFC communication, wherein the first device stores the public key of the identity issuer, wherein the public key of the claim issuer is previously retrieved from the backend system in the onboarding process of the identity claim holder with the backend system, sending, by the second app upon an establishment of the NFC communication, the second payload to the first device, receiving, by the first device acting as an NFC Reader under the control of the first app, the second payload, decoding, by the first app, the second payload, and storing the nonce value added to the second payload on the first device; verifying, by the first app by using the public key of the claim issuer, the authenticity of the second set of identity claims by validating a second digital signature included in the second payload, wherein the validating applies the RSA algorithm to validate the second digital signature by passing the public key of the claim issuer, the second digital signature, and a checksum of the second set of identity claims created by using the hashing algorithm; displaying, in the first app upon the authenticity of the second set of identity claims being verified, one or more identities and an image of the identity claim verifier that are included in the second set of identity claims to the identity claim holder; wherein the encoding and optimizing, by the first app, the first set of identity claims into a first payload, further comprising adding the nonce value stored on the first device to the first payload; and wherein the verifying, by the second app, the authenticity of the first set of identity claims, further comprising: determining whether the nonce value included in the first payload matches with the nonce value added to the second payload; in response to the determination of that the nonce value included in the first payload does not match with the nonce value added to the second payload, aborting, by the second app, the verifying step, otherwise, continuing the verifying step.

In one refinement of the above embodiment, the step of retrieving the first set of identity claims only proceeds when the identity of the identity claim verifier is successfully verified by the identity claim holder.

In one refinement of the embodiment stated in the paragraph above the proceeding paragraph, the second set of identity claims is pre-obtained by the second device when the second device is online in a fourth recurring process of obtaining the second set of identity claims for the second device, the fourth recurring process starts in a fourth pre-defined interval and the fourth recurring process comprising: determining, by the second app, whether the second set of identity claims of the identity claim holder is stored on the second device; in response to the determination of that the second set of identity claims of the identity claim verifier is stored on the second device, further determining, by the second app, whether the second set of identity claims of the identity claim verifier has been stored on the second device for more than a fourth pre-defined time limit; in response to the determination of that the second set of identity claims of the identity claim verifier has been stored on the second device for no more than the fourth pre-defined time limit, exiting the fourth recurring process of obtaining the second set of identity claims process, otherwise proceeding to the following steps; removing, if there is the second set of identity claims of the identity claim verifier on the second device, the second set of identity claims of the identity claim verifier from the second device; sending, by the identity claim verifier via the second app on the second device, a request to issue the second set of identity claims of the identity claim verifier, along with the second set of basic identity claims of the identity claim verifier, to a middleware layer that infaces with the backend system; sending, by the middleware layer upon successful authentication of the second set of basic identity claims of the identity claim verifier based on the second set of basic identity claims of the identity claim verifier, an event to the middleware layer to fetch a set of identity claims data for the identity claim verifier; determining, by the middleware layer, whether there is a signed identity payload of a set of identity claims of the identity claim verifier stored on a storage device of the backend system; in response to the determination of that there is a signed identity payload of a set of identity claims of the identity claim verifier stored on the storage device of the backend system, retrieving, by the middleware layer, the signed identity payload of a set of identity claims of the identity claim verifier stored on the storage device of the backend system, and sending the signed identity payload to the second app, otherwise creating, by the middleware layer, a signed identity payload, and sending the signed identity payload to the second app, wherein the creating step comprising: sending, by the backend system, an event to the identity issuer to get identity details of the identity claim verifier, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system; obtaining, by the second app, the signed identity payload from the middleware layer, and storing the signed identity payload on the second device, wherein the signed identity payload contains the second set of identity claims and a digital signature that is the result of the signing of the identity payload with the private key assigned to and possessed by the identity issuer; and storing, by the second app, the second set of identity claims on the second device.

Other features and aspects will be apparent from the following detailed description, the drawings, and the claims.

BRIEF DESCRIPTION OF THE DRAWINGS

The present disclosure is illustrated by way of example and not limited in the figures of the accompanying drawings in which like references indicate similar elements.

DETAILED DESCRIPTION

Various embodiments and aspects of the disclosures will be described with reference to details discussed below, and the accompanying drawings will illustrate some embodiments. The following description and drawings are illustrative of the disclosure and are not to be construed as limiting the scope of the disclosure. Numerous specific details are described to provide an overall understanding of the present disclosure to one of ordinary skill in the art.

Reference in the specification to "one embodiment" or "an embodiment" or "another embodiment" means that a particular feature, structure, or characteristic described in conjunction with the embodiment can be included in at least one embodiment of the disclosure but need not be in all embodiments. The appearances of the phrase "in one embodiment" in various places in the specification do not necessarily all refer to the same embodiment.

Embodiments use smartphones or smartwatches as frontend terminals for receiving, storing and verifying identity claims, and use a transparent pluggable platform to facilitate the flexible and trustable interactions between the frontend terminals and backend systems, regardless of the architectural nature of the backend systems.

Figure 1:
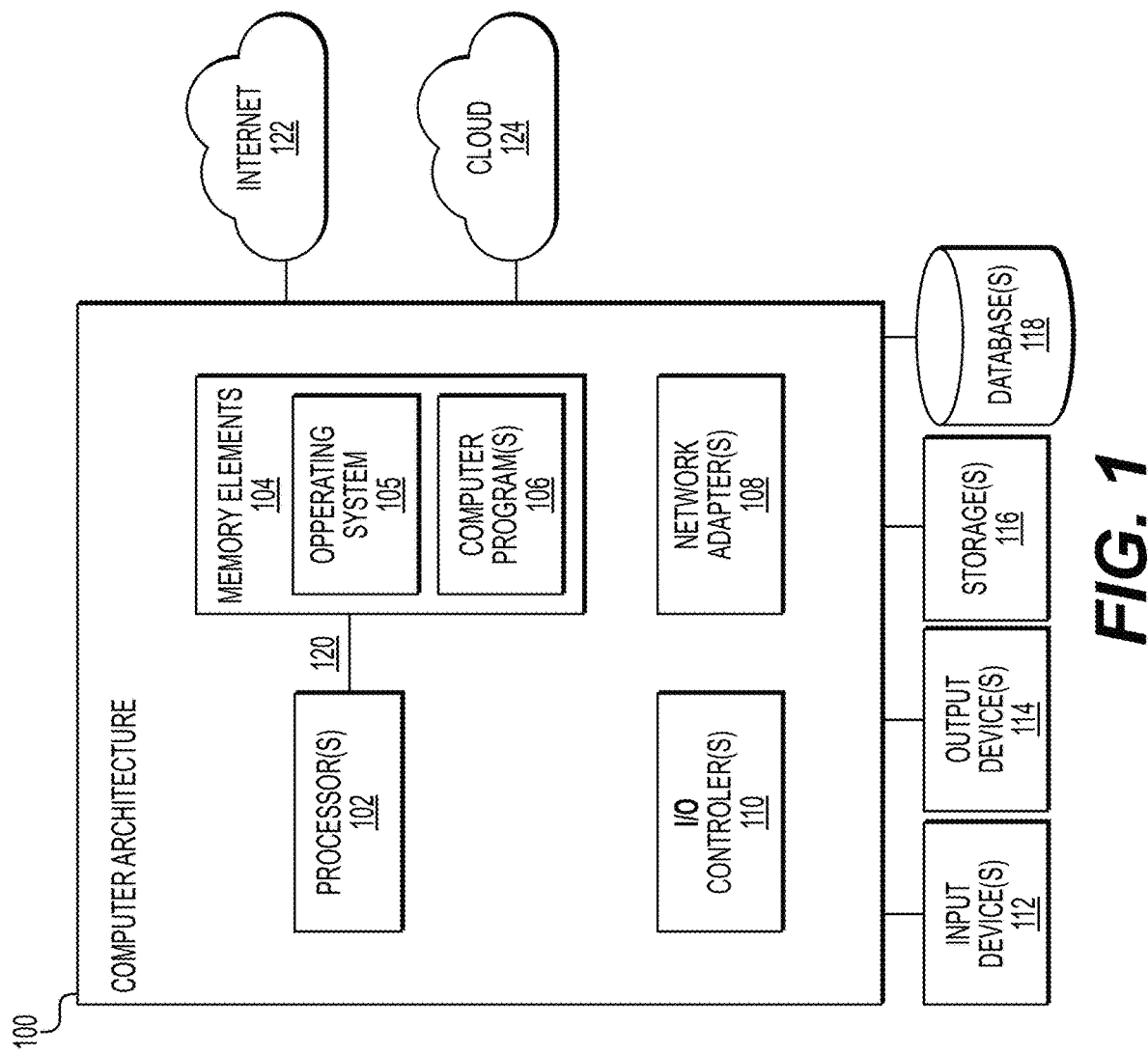
FIG. 1 illustrates, in a schematic block diagram, a computing environment being used in either the frontend, a middleware layer, or the backend of the system accordance with certain embodiments. The environment, in certain embodiments, may include blockchain related features (not shown, but are implicit in the Computer Programs) in the case of the backend system being a system with a blockchain architecture.

FIG. 1 illustrates a computer architecture 100 that may be used in accordance with certain embodiments. In certain embodiments, the identity claim data collection, storage, and process use computer architecture 100. The computer architecture 100 is suitable for storing and/or executing computer readable program instructions and includes at least one processor 102 coupled directly or indirectly to memory elements 104 through a system bus 120. The memory elements 104 may include one or more local memories employed during actual execution of the program code, bulk storage, and cache memories which provide temporary storage of at least some program code in order to reduce the number of times code must be retrieved from bulk storage during execution. The memory elements 104 include an operating system 105 and one or more computer programs 106, and the operating system 105, as understood by one skilled in the computer art, controls the operation of the entire computer architecture 100 and the architecture 100's interaction with components coupled therewith such as the shown components (input device(s) 112, output device(s) 114, storage(s) 116, databases 118, internet 122, and cloud 124) and unshown components that are understood by one skilled in the art, and the operating system 105 may be switched, upgraded, downgraded, and changed as fit.

Input/Output (I/O) devices 112, 114 (including but not limited to keyboards, displays, pointing devices, transmitting device, mobile phone, edge device, verbal device such as a microphone driven by voice recognition software or other known equivalent devices, etc.) may be coupled to the system either directly or through intervening I/O controllers 110. More pertinent to the embodiments of disclosure are smartphones' screen (or smartwatches' screen) as one genre of output device and input device. Touchable screen of a smartphone/smartwatch along with other buttons of the phone/watch constitute input devices. Also, the cameras of a smartphone/smartwatch are also input devices, which are used to take pictures of the user of the phone/watch in the process of identity verification.

Input Devices 112 receive input data (raw and/or processed), and instructions from a user or other source. Input data includes, inter alia, (i) commands/instructions issued by the users of the devices, (ii) captured pictures of frontend terminals' users, and/or (iii) other conceivable data inputs by the users of frontend terminals or by the operators of backend systems.

Network adapters 108 may also be coupled to the system to enable the data processing system to become coupled to other data processing systems or remote printers or storage devices through intervening private or public networks. Modems, cable modem and Ethernet cards are just a few of the currently available types of network adapters 108. Network adapters 108 may also be coupled to internet 122 and/or cloud 124 to access remote computer resources. Network adapters 108 may be coupled to the frontend terminals to facilitate NFC-based communication, and may be coupled to the devices of the backend system to facilitate interactions among the devices and interactions between frontend terminals and backend system.

The computer architecture 100 may be coupled to storage 116 (e.g., any type of storage device; a non-volatile storage area, such as magnetic disk drives, optical disk drives, a tape drive, etc.). The storage 116 may comprise an internal storage device or an attached or network accessible storage. Computer programs 106 in storage 116 may be loaded into the memory elements 104 and executed by a processor 102 in a manner known in the art.

Computer programs 106 may include programs or apps related to identity claims verification, management, and issuance, and the computer programs 106 may either entirely or partially reside in storage 116 and partially reside in cloud 124 or internet 122, and the computer programs 106 may fluidly and dynamically be transferred from one location in a local storage 116 to and from cloud 124 or internet 122 as the circumstances may demand.

The computer architecture 100 may include fewer components than illustrated, additional components not illustrated herein, or some combination of the components illustrated and additional components. The computer architecture 100 may comprise any computing device known in the art, such as a mainframe, server, personal computer, workstation, laptop, handheld computer, telephony device, network appliance, virtualization device, storage controller, virtual machine, smartphone, tablet, wearable devices, etc.

Input device(s) 112 transmits input data to processor(s) 102 via memory elements 104 under the control of operating system 105 and computer program(s) 106. The processor(s) 102 may be central processing units (CPUs) and/or any other types of processing device known in the art. In certain embodiments, the processing devices 102 are capable of receiving and processing input data from multiple users or sources, thus the processing devices 102 have multiple cores. In addition, certain embodiments involve intensive computations when managing identity claim data's storing and indexing, these embodiments therefore employ graphic processing units (GPUs) as the processor(s) 102 in lieu of or in addition to CPUs.

Certain embodiments also comprise at least one database 118 for storing desired data. Some raw input data are converted into digitized data format before being stored in the database 118 or being used to create the desired output data. It's worth noting that storage(s) 116, in addition to being used to store computer program(s) 106, are also sometimes used to store input data, raw or processed, and to store intermediate data. The permanent storage of input data and intermediate data is primarily database(s) 118. It is also noted that the database(s) 118 may reside in close proximity to the computer architecture 100, or remotely in the cloud 124, and the database(s) 118 may be in various forms or database architectures. It is also noted that the database(s) 118 may be used to implement the blockchain ledger(s) if the backend system is implemented in a blockchain architecture.

Because certain embodiments need a storage for storing large volumes of identity related data, more than one database is likely used.

Figure 2:
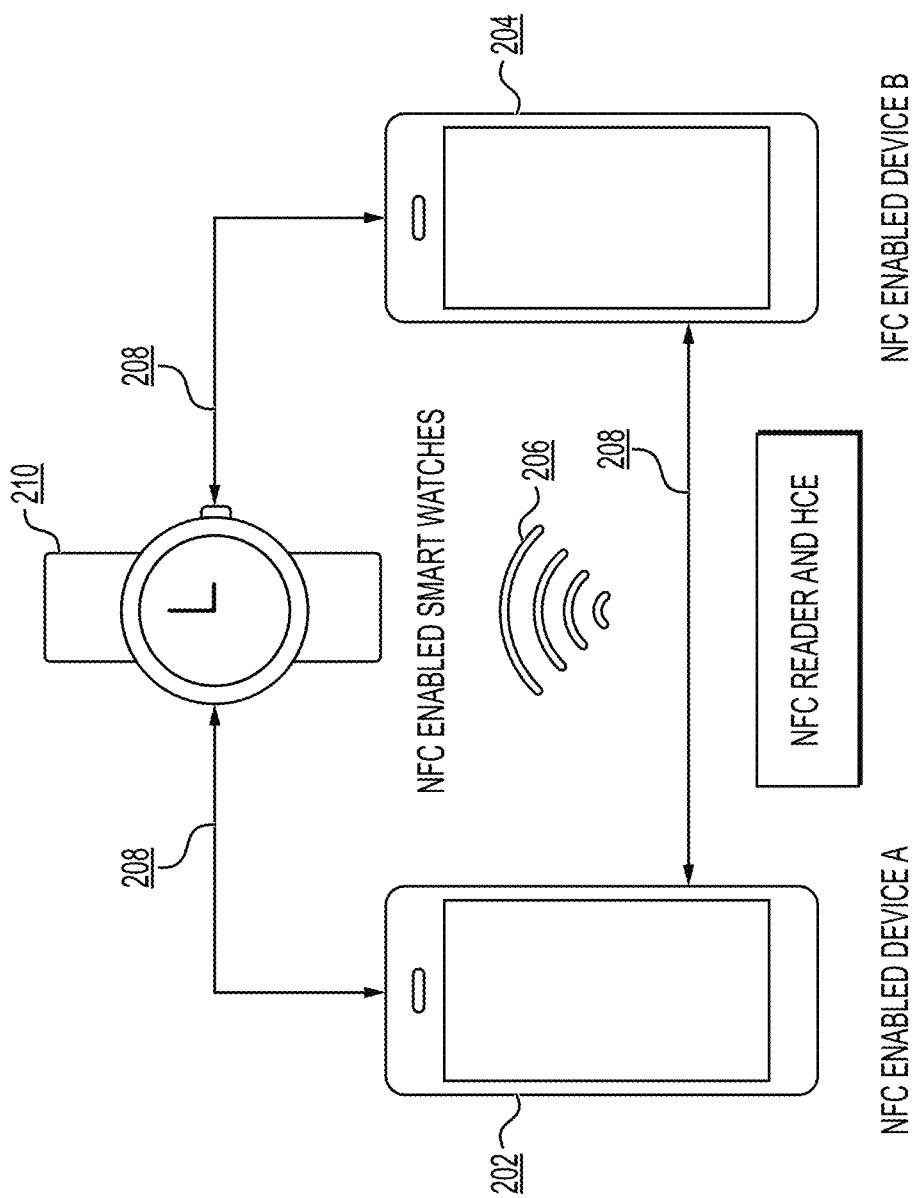
FIG. 2 schematically illustrates three NFC enabled smart devices sharing digital identities via NFC protocol and HCE protocol when the three devices are placed in close proximity, according to certain embodiments.

FIG. 2 shows a setup 200 in which two NFC enabled smartphones 202 and 204 and one NFC enabled smartwatch 210 ("smart devices", collectively) are held at a proximity 208 from each other, a distance less than 10 centimetres. The smart devices wirelessly communicate 206 with each other using Near Field Communication (NFC) to share the identity claims between smart devices in short-range in either online mode or offline mode. The NFC based communication between the 202 and 204 and 210 simulates how the NFC-based card payments happen between mobile phones and NFC payment terminal devices. Identity claims, either managed by a blockchain based backend system or a non-blockchain based backend system, are stored locally in the NFC enabled smartphones or watches and can be shared subject to the user consent over Host Card Emulation (HCE) NFC protocol. The receiver NFC-enabled device (such as devices 204, 210) can verify the authenticity of identity claims using digital signature, wherein the identity claims are beamed from device 202 to device 204 or device 210.

The setup of 200 of sharing offline identity claims via NFC is advantageous over sort-distance communication approaches such as using QR code, as the NFC communication facilitates fast transfer rate, secured communication, capability of transferring more payload.

Offline/online identity claim sharing relies on android-based smart devices which are NFC-enabled such as Samsung S20, S10 smartphones. The same application of offline/online identity claim sharing on iOS-based smartphones would be the same once there are NFC-enabled support of NFC HCE in iOS.

When an NFC enabled device is emulated using host-based card emulation, the data is routed to the host CPU on which smart device apps are running directly, instead of routing the NFC protocol to a secure element (note, a NFC secure element is a dedicated chipset controlled by the smart device operating system. The card emulation is done within a secure element and any communication with external NFC terminal is handled by the secure element itself without needing an app.)

In the HCE mode, a smart device such as device 202 acts as an NFC card that has the capability of sending data to any nearby NFC reader such as the NFC enabled smartphone 204, or the NFC enabled smartwatch 210. The emulated NFC card can also be accessed by an external NFC reader, such as an NFC point-of-sale terminal or another NFC Reader smart device such as device 204 or 210.

Wave & Verify Method/App

Wave and Verify method/app can be described from four angles: mobilephone to smartwatch identity sharing via NFC; verifying digital identity from smartwatch to a mobile app via NFC; managing blockchain based digital identity; and, a brief overview of NFC HCE in smartwatches.

Mobile phone to smartwatch identity claims sharing is to enable users to store blockchain based (or non-blockchain based) identity in their smartwatch from the mobile apps (i.e., iDentityChain mobile app) so that identity can be accessible from a Wave and Verify app installed on the smartwatches for the verification services. The component acts as a smartwatch wallet where all digital identity claims reside in or associate with the smartwatch app.

Once the user has stored the identity claim information in the smartwatch app, the app can share the identity details via NFC to the verifier or service provider when identity verification is needed. The user can select the required identity claim details that need to be shared and then swipe the watch near the verifier's NFC enabled mobile phone so that data can be shared even in offline mode. The verifier can subsequently verify the digital identity using the public key of the claim issuer who issued the identity claim.

iDentityChain NFC-enabled mobile app can act as a source of identity claim information which in turn retrieves the identity claim information from a blockchain server and keeps it stored offline. Thereafter, this data can be synched to a smartwatch app using NFC HCE protocol for greater portability. Once the identity claim data are synchronized from the phone to the watch, when a user needs to verify the identity information like a driver's license, the user can select the identity from the smartwatch wallet, a storages of various identity claims, and share it to an iDentityChain verifier mobile app over NFC HCE protocol.

Wave and Verify smartwatch app acts as both an NFC reader and an NFC writer for receiving and sharing identity information with NFC-enabled mobile apps. FIG. 2 also depicts the devices with which a smartwatch app exchanges and shares data using NFC.

In summary, a smartwatch, once enabled by a relevant smartwatch app, is able to retrieve identity data via the exchanges between the smartwatch app and the mobile app (installed on a smartphone) using NFC, share identity data from the enabled smartwatch to a mobile app enabled smartphone for verification using NFC, share identity data from the enabled smartwatch to a mobile app enabled smartphone in a handshake mode (note, the handshake mode will be disclosed latter in this document).

Figure 3:
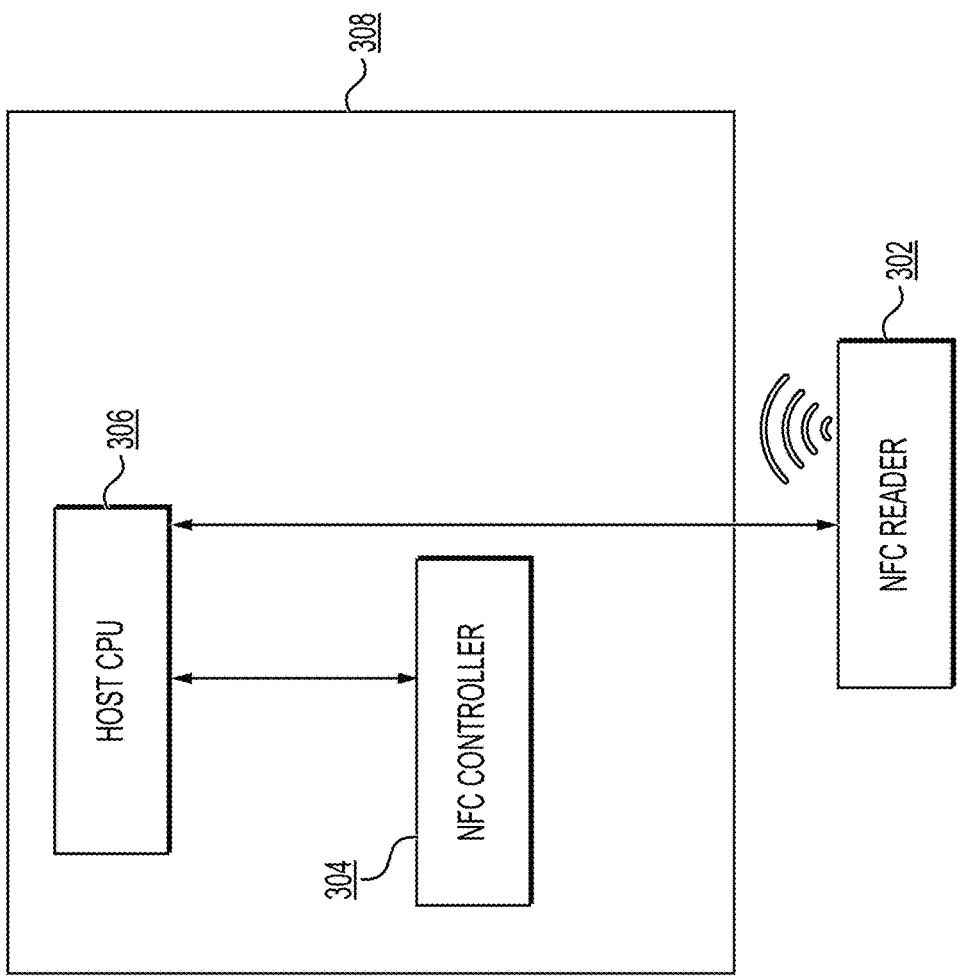
FIG. 3 schematically illustrates the host-based NFC card emulation device's key components, and the interactions among the components and an NFC Reader.

FIG. 3 schematically illustrates the major interactions among components of a host-based NFC card emulation device and an NFC Reader.

In the setup of 300, NFC Reader 302 is a device (such as 204 or 210 of FIG. 2) that reads NFC data from various NFC chips, NFC tags or emulated NFC card. In the case of a HCE setup such as 300, an NFC reader 302 beams a request, and the beaming request is received by a nearby (i.e., less than 10 cm away) NFC enabled and Host-based emulated device 308. Upon receiving the request, device 308's the NFC controller 304 routes the received request to device 308's Host CPU 306. Since NFC controller 304 is pre-configured to have a routing table, it pointedly routes the request to a particular application (such as a mobile payment app) running in the host CPU 306, and since the application is a logical unit that emulates an NFC card, the application writes data to the NFC Reader 302.

Like the above-described general settings, certain embodiments of the disclosure use the HCE capability to turn a user mobile app (which runs on the Host CPU 306) into an NFC writer. The NFC writer writes data into nearby NFC reader smart devices that are equipped with one or more mobile apps make the devices capable to receive the data from the NFC writer. Instead of merely processing payment transaction via NFC enabled mobile app hosted on a smart device like what is traditionally done in a NFC enabled mobile payment settings, certain embodiments of the disclosure process the identity claims, as the data being passed along between a writer and a reader, securely through other devices. In fact, the technique that adds a heightened security to the data is one of the key features of the iDentityChain platform-based digital identity claims sharing and verification.

In certain embodiments of the disclosure, NFC services are integrated into two mobile apps—iDentityChain mobile app and iDentityChain verifier mobile app, and the installation and running of those two apps on mobile devices effectively make the devices NFC enabled. iDentityChain mobile apps offer identity claims management solution to users, where users can store, share and verify the identity claims easily, and more importantly, securely. Under the control of the installed iDentityChain mobile apps, the NFC enabled portable smart devices held by the users are turned into a HCE mode (i.e., NFC card writer mode), allowing the users to securely share their identity claims in an offline mode. The security feature of the iDentityChain will be explained later in the disclosure.

iDentityChain verifier mobile app ("verifier app" hereinafter), on the other hand, helps organizations (such as service providers, traffic police, etc.) and even individual to share and verify identity in offline mode and in online mode alike. The verifier app, being installed and activated on an NFC-enabled mobile device such as 302, acts as an NFC reader that reads the data shared by the wirelessly connected iDentityChain mobile app on a nearby mobile device (such as 308) and then it verifies the authenticity of the shared data by using the digital signature embedded within the shared data.

iDentityChain mobile app supports emulating cards, and the cards are based on the NFC-Forum ISO-DEP specification (which is based on ISO/IEC 14443-4). The app processes Application Protocol Data Units (APDUs), as defined in the ISO/IEC 7816-4 specification. It is noted that Android system mandates emulating ISO-DEP only on top of the NFC-A (ISO/IEC 14443-3 Type A) technology.

Figure 4:
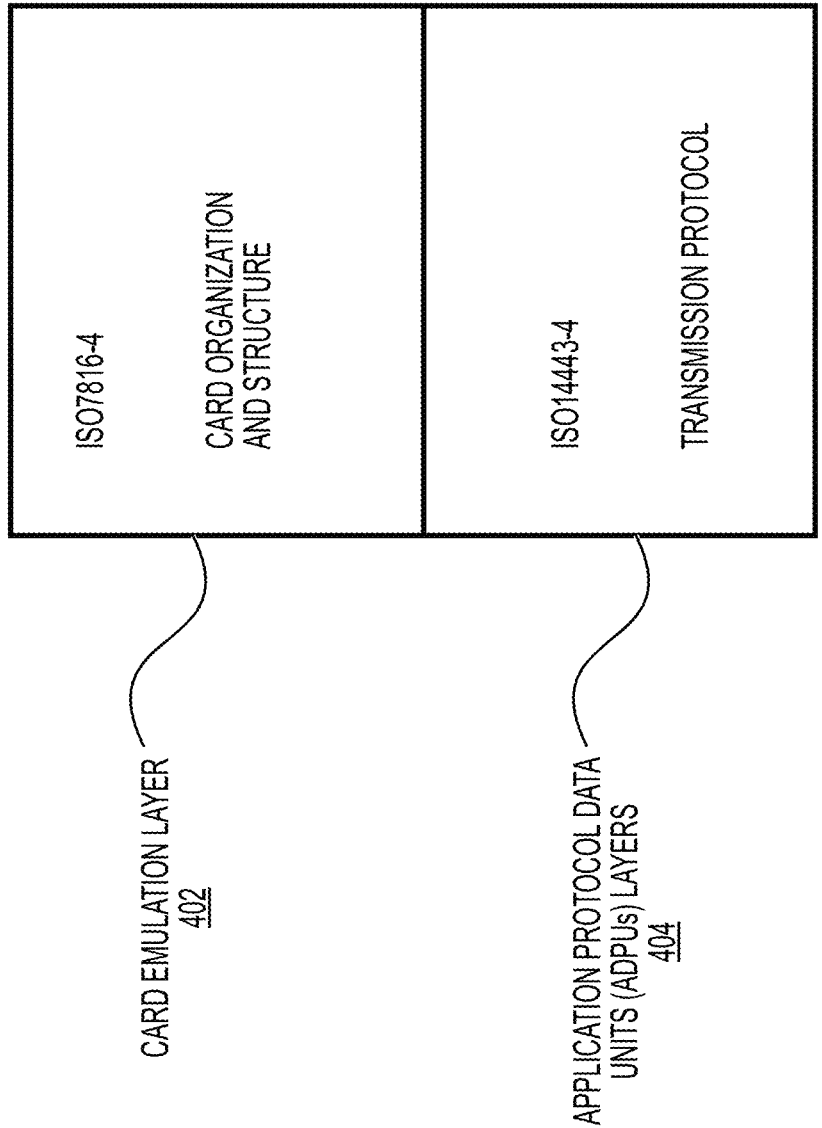
FIG. 4 schematically illustrates the stack of HCE protocol.

FIG. 4 shows a stack used by HCE protocol on smartphones installed with Android operating system. For smartphones installed with iOS, the stack used by HCE protocol may or may not vary, but the essence of the communication protocols would be similar. In FIG. 4, the shown stack incorporates the Card Emulation Layer (CEL) and Application Protocol Data Units Layers (ADPUs), each of which uses different ISO standards (i.e., ISO7816-4 (402) for Card organization and structure, and ISO14443-4 (404) for transmission protocol respectively).

The HCE architecture in aforementioned apps is based around Android Service components (known as "HCE services"). One of the key advantages of this service is that it can run in the background without any user interface. This advantage enables a user who wants to share an identity claim (such as a National ID card) to share it directly without needing to launch the iDentityChain mobile app to make the sharing happen.

Specifically, tapping the device that has the HCE services running against a verifier's mobile phone that has the identity verifier app up and running (which makes the phone act as an NFC reader) starts the correct service (if the service has not already been running) and executes the identity sharing in the background.

In a different scenario, when a user brings his/her mobile phone that has iDentityChain mobile app up and running closer to a verifier's phone that has the iDentityChain verifier mobile app up and running, the Android operating system is prompted to know which HCE service that the NFC reader wants to talk to. This is when and where the ISO/IEC 7816-4 specification 402 is invoked—it defines a way to select applications, centered around an Application ID (AID). An AID consists of up to 16 bytes and for example in a sample of certain embodiments of the disclosure, AID is D2760000850101. The AID is pre-registered, by a claiming organization (or, in a different term, a service provider) on a platform like Google beforehand as an asset of the claiming organization. In other words, for an application/app to be selected by the ISO/IEC 7816-4 specification, it needs to be pre-registered on a platform that matches with the operating system used on the mobile phone and on which the application/app is installed.

The following table (Table 1) shows the HCE-related details of the iDentityChain mobile app. The text in bold signifies the unique HCE details that some embodiments of the disclosure have incorporated into this disclosure.

TABLE 1

HCE Details for iDentityChain mobile app

| HCE Details | Description |
| --- | --- |
| AID Group Category: Other | Category that can be used for all other card emulation services. |
| AID: D2760000850101 | Unique Application ID for user mobile App |
| android.permission.NFC<br>android.hardware.nfc.hce<br>android.permission.BIND_NFC_SERVICE | Permissioned required to use HCE Service |
| name: com.reactnativehce.services.CardService<br>permission: android.permission.BIND_NFC_SERVICE<br>intent name: android.nfc.cardemulation.action.HOST_APDU_SERVICE<br>intent category: android.intent.category.DEFAULT | HCE Service Details |
| react-native-hce | React Native libraries that support HCE |
| Text | NFCContentType |
| NFCTagType4 | NFCTagType |
| 1-12 KB | Data size support to transfer data between HCE and NFC Reader |

As mentioned above, the iDentityChain verifier mobile app acts as an NFC reader that reads data from the NDEF tags (note, a NDEF is a standardized data format that makes it possible for a smartphone to write or read on an NFC card or an NFC tag. The NDEF format is used to store URLs, text documents, or electronic business cards. NFC-enabled chips such as the MiFare® NTAG® or DesFire® may be configured together with NDEF). The NFC data reading is executed in four steps as given below: 1). Request a particular NFC technology (e.g., Ndef, NfcA, IsoDep, Mifare-Classic, etc.), 2). Select the proper technology handler (e.g., ndefHandler, nfcAHandler), 3). Call specific methods on the NFC technology handler (e.g., writeNdefMessage), and 4). Clean up the technology registration.

The following table shows details of verifier app as a NFC reader.

TABLE 2

NFC reader's details

| NFC Reader Details | Description |
| --- | --- |
| AID Group Category: Other | Category that can be used for all other card emulation services. |
| AID: D2760000850101 | Unique Application ID for user mobile App |
| Android.permission.NFC | Permissioned required to use NFC Service |
| Ndef | NFC technology |
| react-native-nfc-manager | React Native libraries that support NFC Reader |
| Text | NFCContentType |

Figure 5:
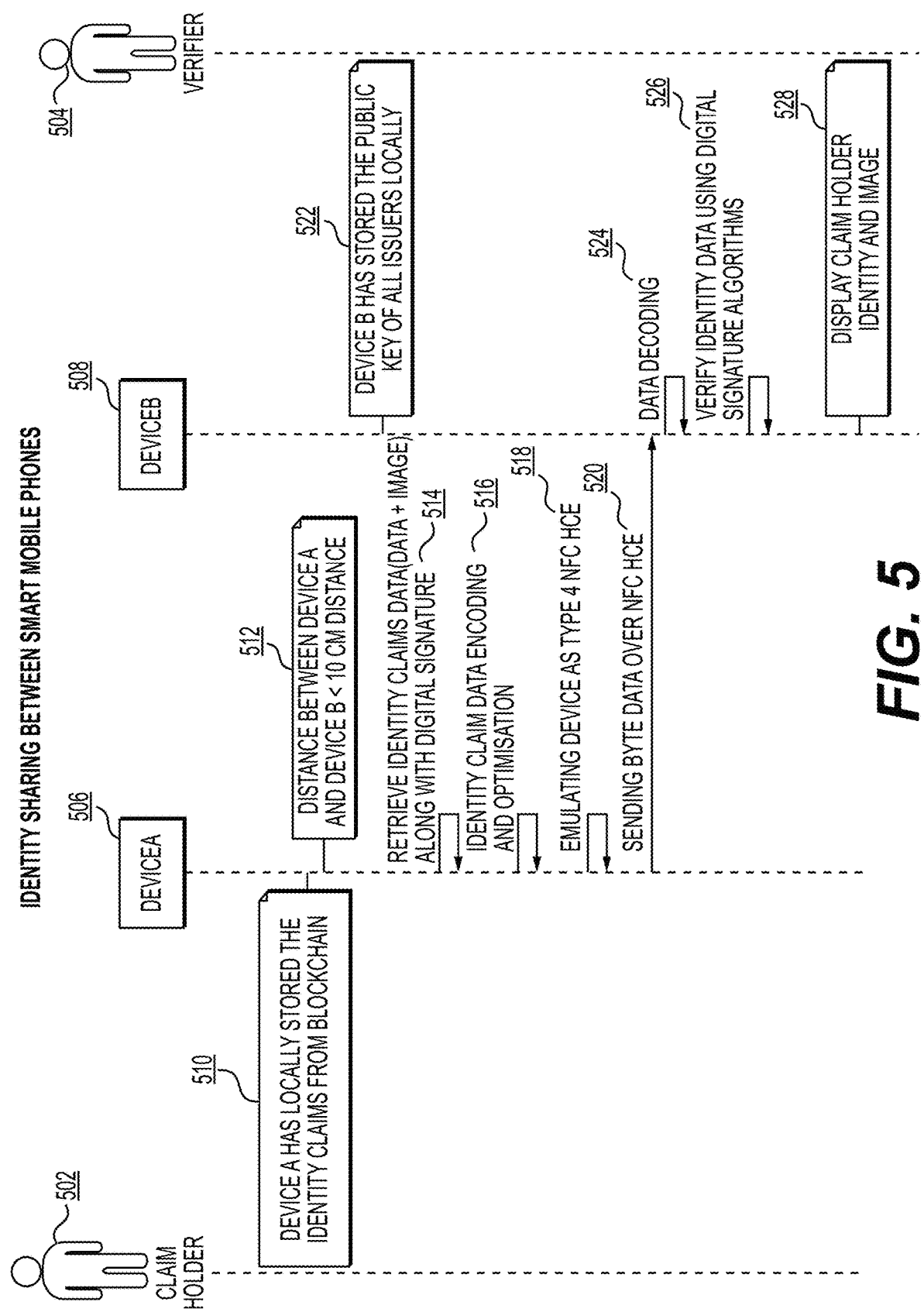
FIG. 5 illustrates a schematic smartphone-to-smartphone process flow for verifying digital identity claim of a claim holder by a claim verifier, according to certain embodiments.

FIG. 5 illustrates, via a process flow chart 500, the identity sharing and verification process between the two NFC-enabled mobile devices—smartphones 506 and 508, each of which is held by a Claim Holder 502 ("Holder" hereinafter) and a Claim Verifier 504 ("Verifier" hereinafter) respectively. In most embodiments, offline identity sharing between two smartphones and online identity sharing between mobile phones are alike. The sharing involves using HCE-enabled smartphone apps: the iDentityChain mobile app (on Device A 506) on the left side of the process flow chart 500, and the NFC reader app—iDentityChain verifier mobile app (on Device B 508) on the right side of the process flow chart 500. The identity-sharing process between the two smartphones 506 and 508 is achieved through NFC Read/Write process that entails device emulation, data encoding (516) and decoding (524) on device A 506 and device B 508 respectively. It is noted that device, mobile phone, and smartphone are terms interchangeable in describing the interactions involved in digital identity verification.

The sharing process begins, when device A 506 and device B 508 are placed nearby 512 (i.e., distance between the devices are within 10 centimeter), by retrieving identity claims, on device A 506, from the local database as indicated in 514 (note, identity claims are stored in a database located on device A 506 as shown in 510) which is either timely synchronized with a backend system in the case of online verification, or pre-synchronized with the backend system, wherein the backend system is either a blockchain server or a non-blockchain server, that store up-to-date identity claims information. An identity claim consists of identity detail, image of the claim holder, and digital signature (which is going to be used to verify the authenticity of the identity data and image). It is worth noting that identity claims, as a plural term, means multiple claims (e.g., National Id, Passports, etc.), each of which is a verifiable attestation of what a claim holder claims. Naturally, one claim holder can have more than one identity claims. For example, a passport, an experience letter, a degree certificate, etc. Each of the identity claim of the claim holder is meant to attest one kind of identity of the holder. In the case of passport, the identity claim is to attest the name, sex, birthday, nation of birthplace, and nationality of the claim holder, whereas a degree certificate is to attest the academic degree held by the claim holder, and whereas an experience letter is to attest the experience the claim holder once had.

It is to be mentioned herein that in some embodiments of the disclosure, one set of identity claims is associated with one digital signature, while in other embodiments of the disclosure, for each identity claim, there is one associated digital signature. It is often the case, that on device A 506, one retrieval of identity claim from local database 514, the retrieval retrieves a set of identity claims along with one digital signature for the sake of efficiency, and the retrieved digital signature is used to verify the authenticity of each claim of the set of identity claims. Further details on the digital signature issuance, storage and onboarding have been given in the section named "onboarding identity issuer and verifier".

Referring back to FIG. 5, once identity claims and digital signature are retrieved by the iDentityChain mobile app, they are going through encoding and optimization process 516. To restrict the data size for transferring data between two or more NFC-enabled devices such as 506 and 508, a payload optimization algorithm (see Table 3) is used to reduce the overall data size by eliminating redundant characters and fields, converting JSON (JavaScript Object Notation—an open standard file format and data interchange format that uses human-readable text to store and transmit data objects consisting of attribute—value pairs and arrays (or other serializable values) into a more concise format. It is a common data format with diverse uses in electronic data interchange, including that of web applications with servers) to plain comma-separated string with a fixed order, and encoding images with base 64 formats. The optimization and encoding collectively makes the data payload lighter and thus make the NFC communication faster.

TABLE 3

Payload Optimization Algorithm
Algorithm 1: Payload optimization algorithm

Input: claim data, image, digital signature
Output: {optimized payload}
    for value in ClaimData;
      do;
      value = value + ',';
    end for;
    value = value + digitalSignature;
    encodeClaim = encodeBase64(value + ':');
    encodeImage = encodeBase64(image);
    optimizedPayload = encodeClaim + encode Image;
    return optimizedPayload;

Once, the data optimization 516 is done, the iDentityChain mobile app emulates 518 the mobile phone 506 as an NFC writer and looks for an NFC Reader in the close proximity.

An NFC reader, on the other hand, emulated by the iDentityChain Verifier mobile app on device B 508, discovers and manifests NDEF (NFC Data Exchange Format) Tags (such as the snippet shown in Table 4). Once the NFC Reader detects the tags, identity claims successfully get transferred between mobile phones 506 and 508. Note, the shown example of an NFC tag is merely a demonstration of an NFC tag based on Android operating system, and an NFC tag based on other kinds of operating system would be similar. In general, as shown in the code snippet, identity claims are stored in the NDEF Message payload section in a form of a byte array.

The NFC Reader (i.e., the iDentityChain Verifier mobile app) running on device B 508, then, performs data decoding 524 to bring back the original JSON format of the identity claims data for reading and displaying purposes. The identity claim verification process 526 begins with verifying the digital signature(s) in the identity claims data. The verifier app has already stored all public keys of all relevant identity issuers locally in the mobile app (see 522). When the payload is received, the digital signature verification process 526 is performed by creating a hash for each of the identity claims, followed by individually verifying of the signature (s), using the relevant identity issuers' public keys (note, each identity issuer has its own unique public key). If the signatures are verified, it means that the associated identity claims have not been tampered with during the sharing process. The verification is to verify the authenticity of the identity claim data, because once an identity claim data is tampered, the hashed created from the identity claim data would not be able to pass the digital signature verification based on the digital signature associated with the identity claim data.

TABLE 4

An example of NFC tag details

{"canMakeReadOnly": false, "id": "08FB808D", "isWritable": false, "maxSize": 65532, "ndefMessage": [{"id": "", "payload": [Array], "tnf": 1, "type": [Array]}], "ndefStatus": {"capacity": 65532, "status": 3}, "techTypes": ["android.nfc.tech.IsoDep", "android.nfc.tech.NfcA", "android.nfc.tech.Ndef"], "type": "NFC Forum Type 4"}

Figure 6:
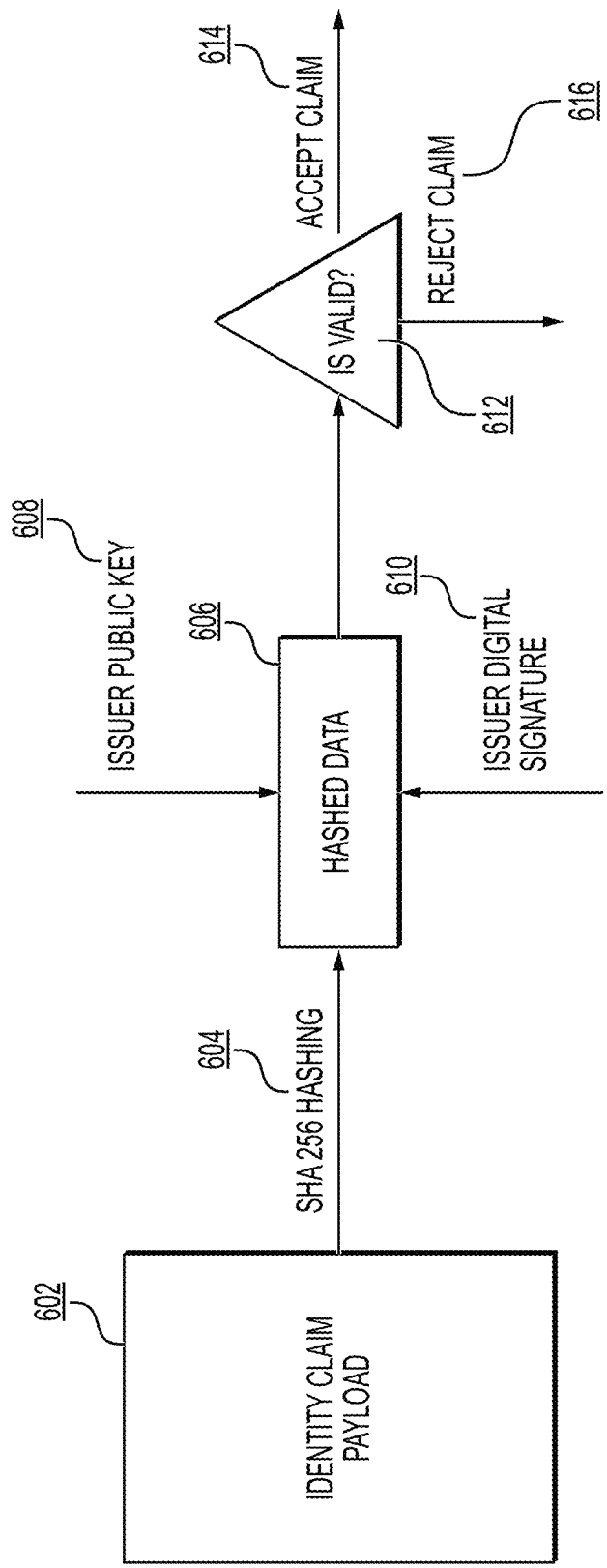
FIG. 6 illustrates a schematic flowchart for digital signature verification for an identity claim.

FIG. 6 shows the process of digital signature verification in detail. The verifier app receives the identity claim payload 602 which has details of a user's identity, user image (usually a closeup picture of the user's face) and a digital signature of the issuer that issued the identity claim. It is noted that a digital signature such as the issuer's digital signature 610 is a mathematical scheme for presenting the authenticity of a digital message or a digital document such as an identity claim ("message/file" hereinafter), and the message/file is signed with a private key of the entity who issued the message/file. It is also noted that the message/file received by the recipient is authenticated by using a public key of the entity who issued the message file, and the authentication often is called as digital signature verification as shown in FIG. 6.

Specifically, the verifier app creates a unique checksum of the identity claim using SHA 256 Hashing algorithm 604. The Hashing algorithms create a fixed length string of any input size and the created string (i.e., the hashed data 606) acts as a fingerprint that uniquely represents the contents of the identity claim. It is noted that the hashed data 606 is irreversible, meaning that from the hashed data, input data (i.e., the identity claim from which the hashed data is stemmed) can't be reproduced via reverse-engineering. The verifier app then uses a digital signatures verification algorithm RSA (Rivest-Shamir-Adleman algorithm, an asymmetric cryptography algorithm) to validate the issuer's digital signature 610, by passing the issuer's public key 608 (which is pre-loaded into the verifier app in advance), digital signature 610 and the hashed data 606 stemmed from the identity claim. The verifier app uses the algorithm to validate the digital signature 610. If the signature comes out validated, the set of identity claim received by the verifier app is authentic (i.e., it has not been tainted, tampered, or doctored in any way) and the identity claim is accepted 614. If the signature comes out as invalidated, the set of identity claim is deemed as tainted and thus rejected 616.

More specifically, the RSA algorithm uses the issuer's public key to decrypt the digital signature into another set of hashed data (let's call it as the "marker"). The validation then is essentially a comparison between the hashed data 606 that is stemmed from the identity claim data and the "marker", if the comparison yields the result of the two sets of hash data being identical, then the signature is deemed as validated (meaning the identity claim is accepted). Otherwise, the signature is deemed as invalidated (meaning the identity claim is rejected).

Once the received identity claim(s) are accepted as authentic, the verifier entity 504 (such as a border control officer or a police officer, etc.) verifies the details and compares the image of the user who shared his/her identity claim(s) with the verifier entity 504 just as if the verifier entity uses a physical identity document (such as a passport or a driver's license) of the claim holder (i.e., user) to verifies the details of the physical identity document knowing that the physical identity document is authentic and trustworthy. If the identity details presented in the digital identity claim(s) matches with what the verifier entity 504 observes and/or exams the user (such as the visage of the user, the answers to the questions asked by the verifier entity to the claim holder, etc.), the verification process 500 in FIG. 6 is concluded by that identity of the claim holder is accepted. Otherwise, the process is concluded by that identity of the claim holder is rejected.

Figure 7A:
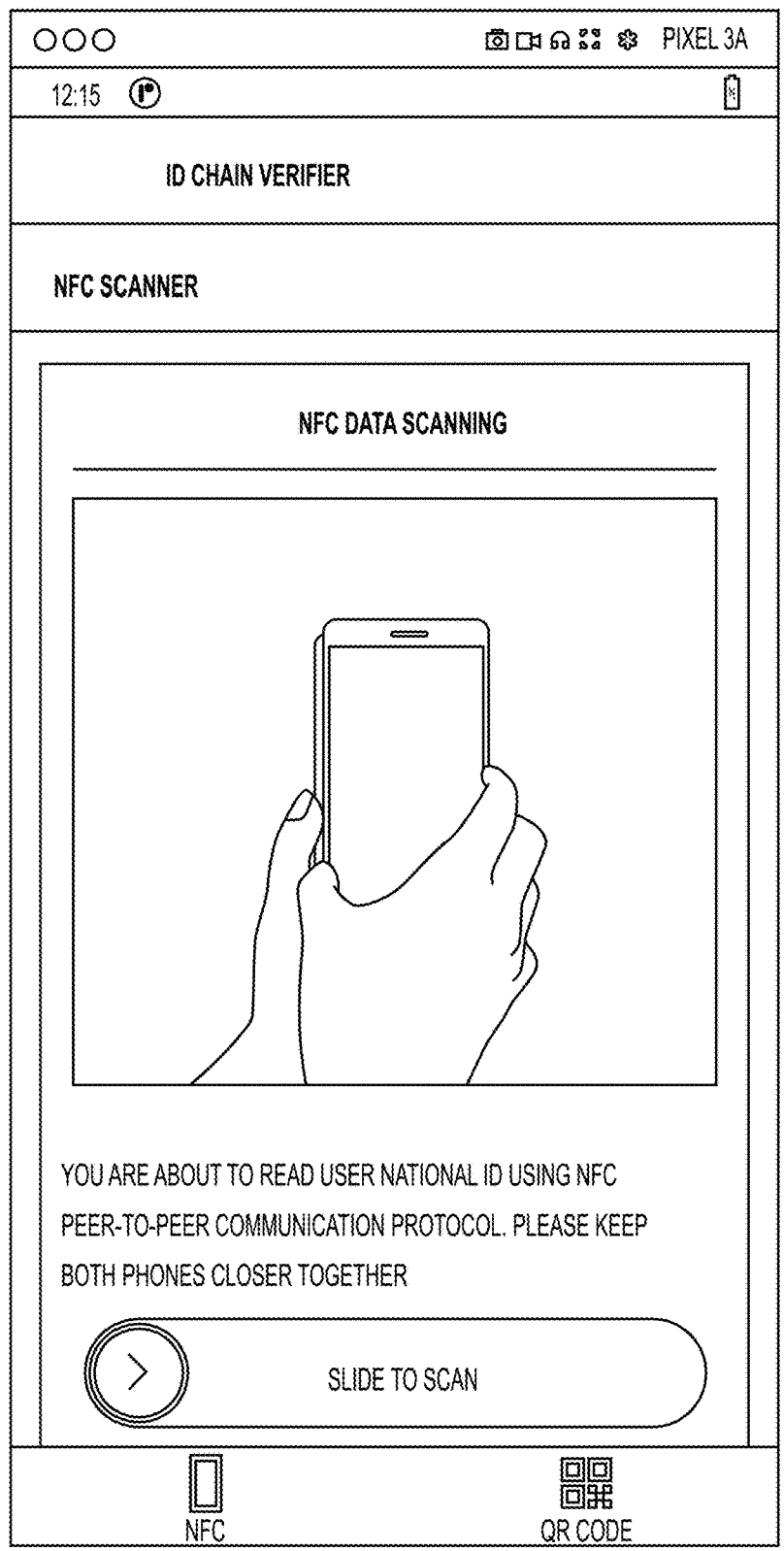
FIGS. 7A and 7B illustrate interfaces of smartphone apps used for sharing and verifying digital identity claims among NFC-enabled smartphones at the beginning and during the sharing process.
Figure 7B:
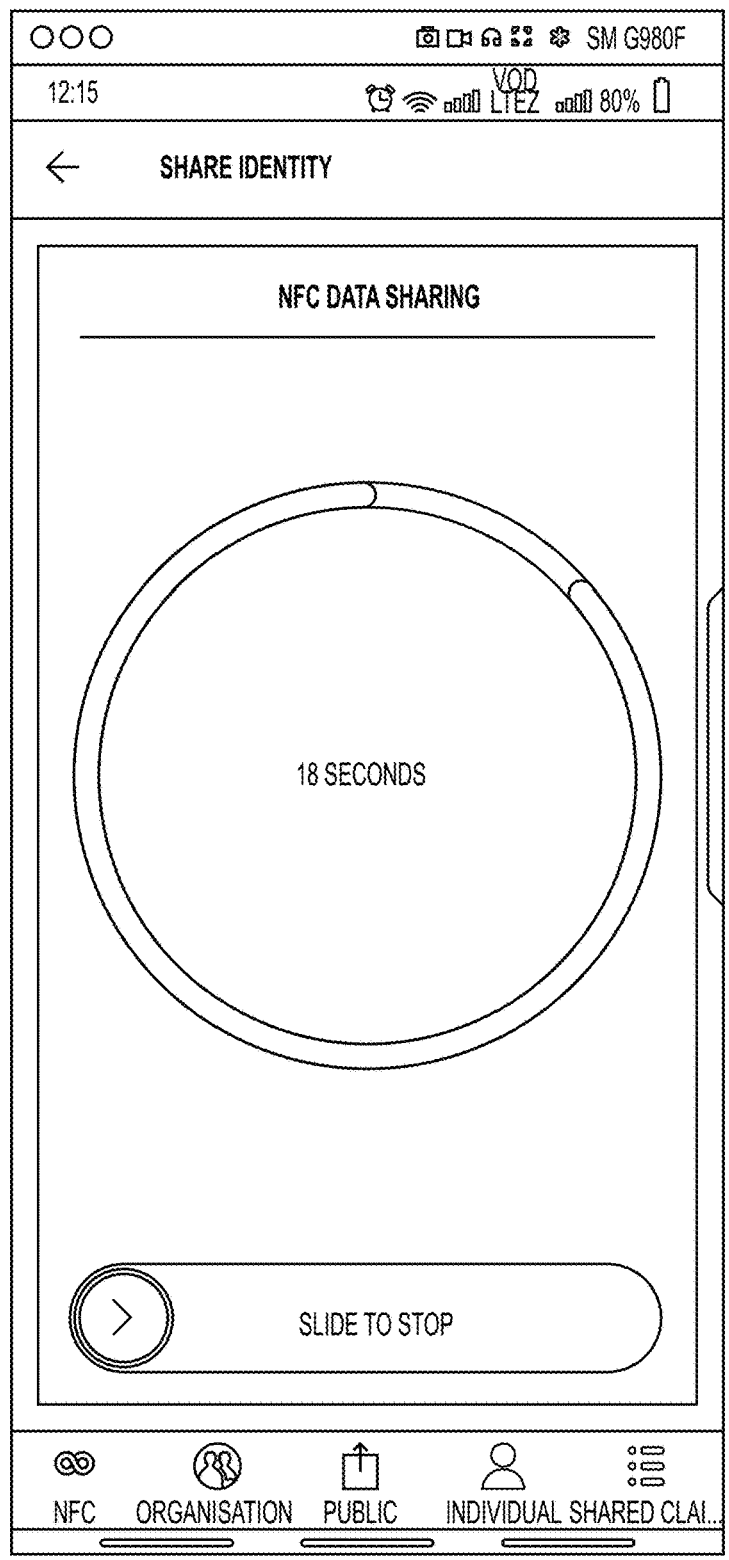
Figure 7B:
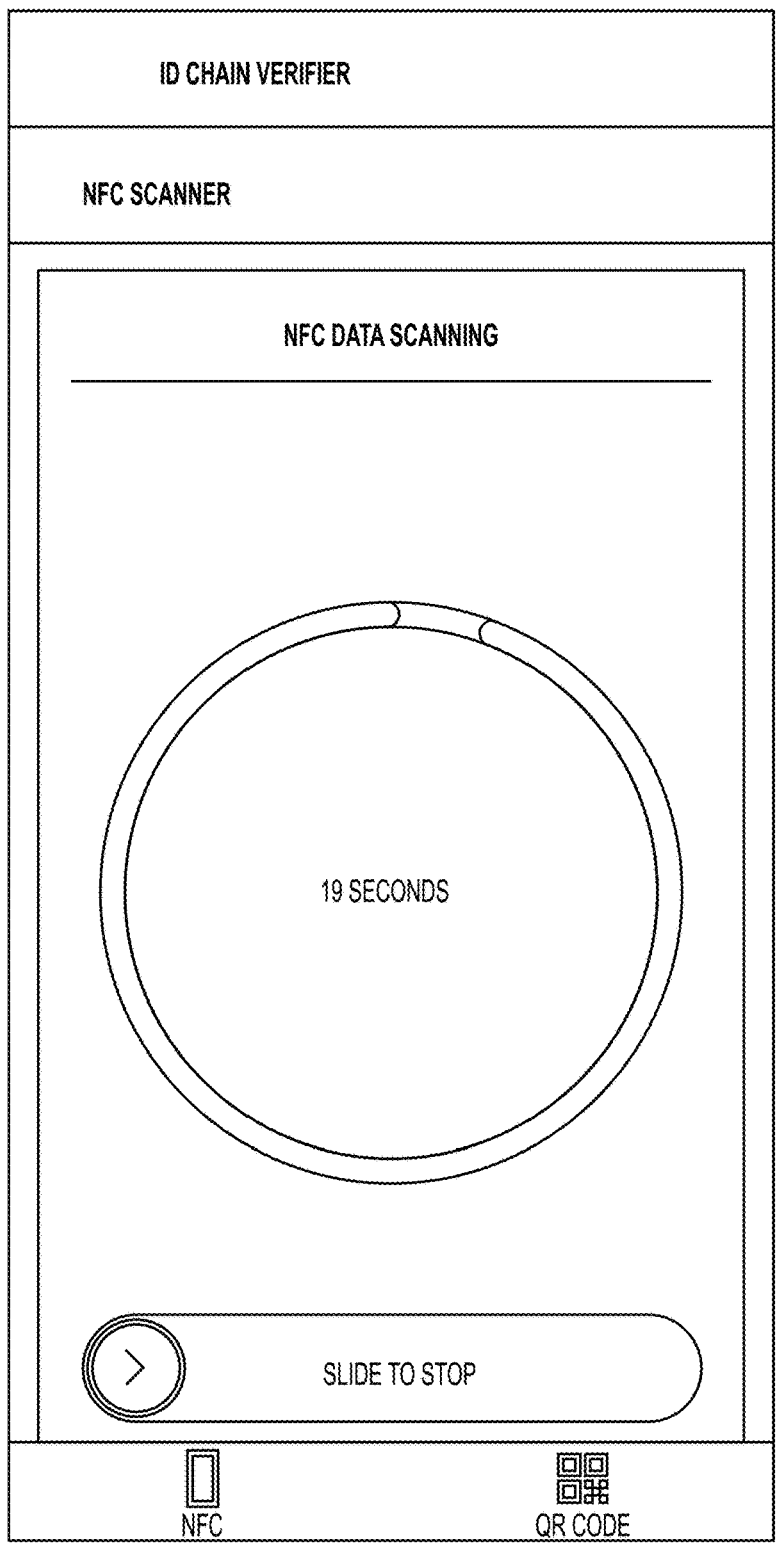

FIGS. 7A, 7B are the screenshots of identity claim sharing and verification, using the iDentityChain mobile app on an identity claim holder's smartphone with the iDentityChain verifier mobile app on a nearby identity claim verifier's smartphone.

FIG. 7A demonstrates what are shown on the iDentityChain mobile app and the iDentityChain verifier app before the sharing of identity claim and reading of data start, respectively. The shown slide controls, if been slide to the right, would start the transmission and receiving of identity claim data, respectively. FIG. 7B demonstrates what are shown on the iDentityChain mobile app and the iDentityChain verifier mobile app during the sharing of identity claim and reading of data, respectively. The shown slide controls, if been slide to the right, would stop the already started transmission and receiving of identity claim data, respectively.

Figure 7C:
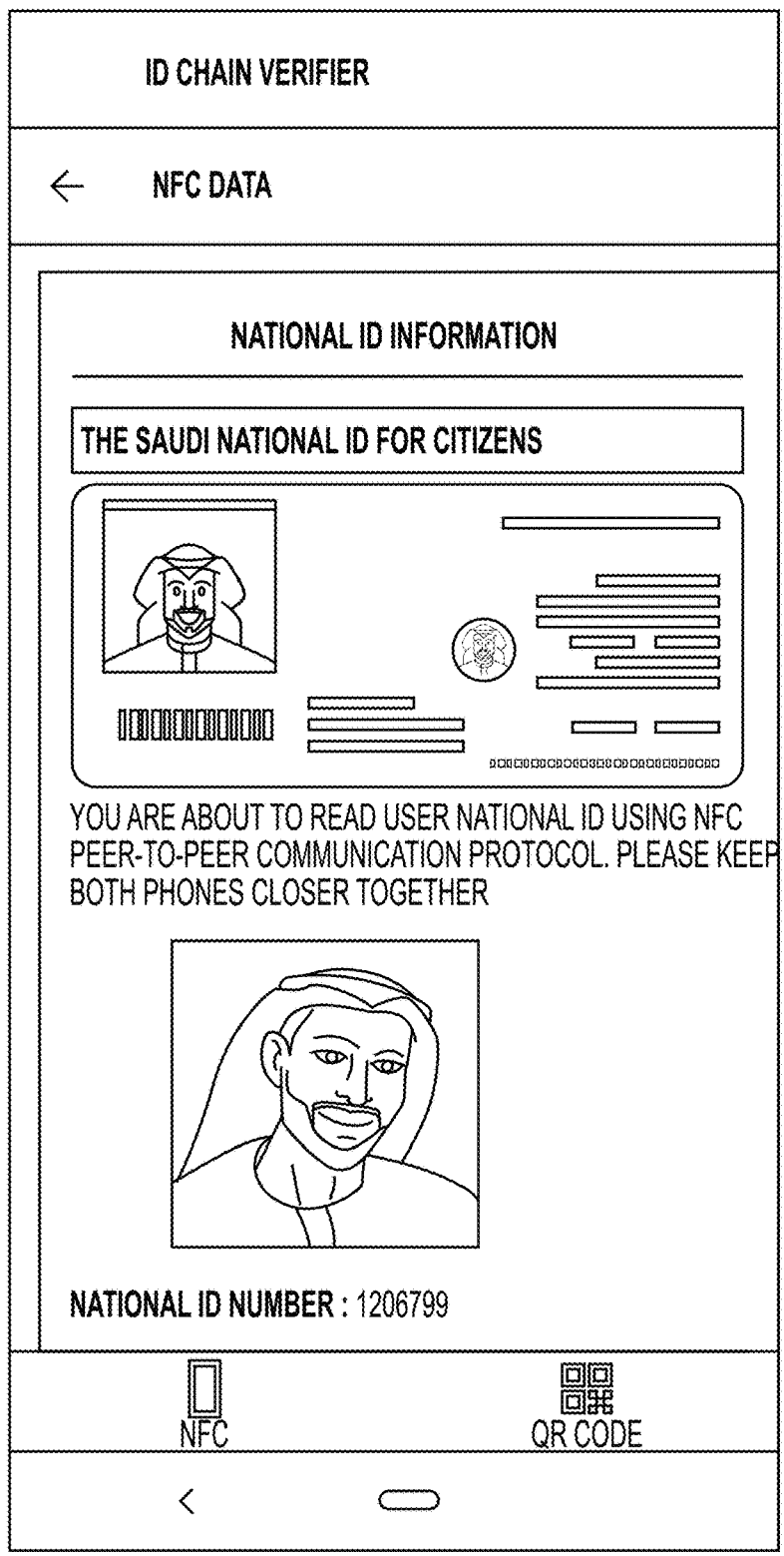
FIG. 7C illustrates screenshots on a verifier app's screen after the app receives an identity claim.
Figure 7C:
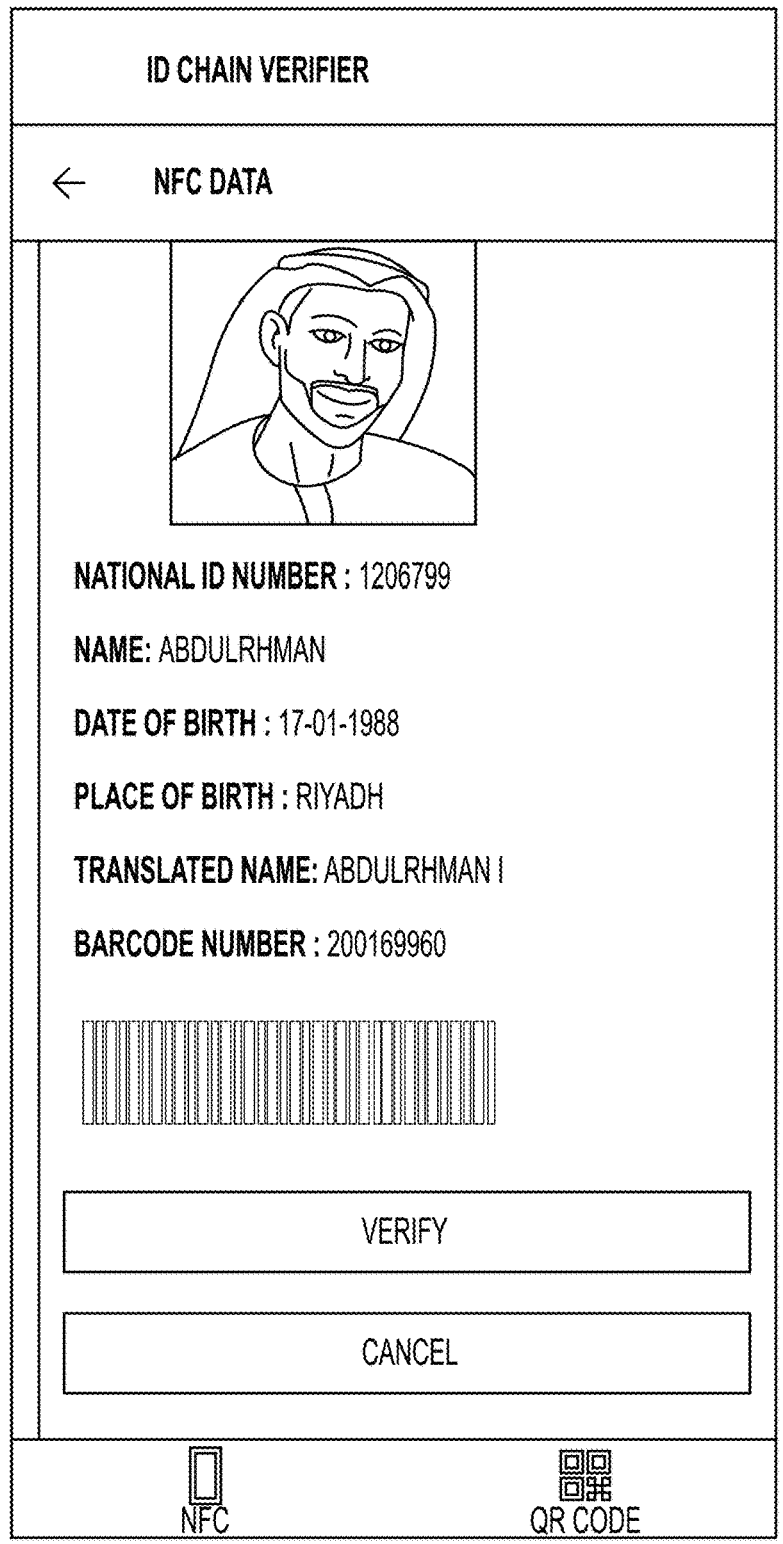

FIG. 7C shows a few screenshots on the verifier app's interface, demonstrating the screens when an identity claim is received, the claim is ready to be verified, and the claim is accepted as valid.

Offline Identity Claim Sharing Between Smart Devices in Handshake Mode

NFC Handshake mode approach is an effective way for a claim holder (such as 502 of FIG. 5) to verify the authenticity of a claim verifier (such as 504 of FIG. 5) before the claim verifier asking identity details from the claim holder. It adds additional layers of trust and security to the entire verification process to prevent an imposter of a claim verifier from assuming the claim verifier's authority of checking his/her subjects' identity. The offline identity sharing, and verification process in handshake mode are demonstrated in FIG. 8.

In handshake mode, before a verifier asks a claim holder to share the claim holder's identity claims, the verifier shares his/her own identity claims with the claim holder to let the holder verify the verifier's identity. During this phase of verification, the iDentityChain mobile app, whose default mode being a claim holder mode, is set to a claim verifier mode instead, and iDentityChain verifier mobile app, whose default mode being a claim verifier mode, is set to a claim holder mode instead. Under their respective mode, the two apps respectively drive their host phones as an NFC reader and writer in a certain interval. At the time of onboarding of claim holders and verifiers, the apps store the public key of the issuer who issued the identity claim(s) of the holders and verifiers, so that the apps can verify the digital signature of the identity claim(s) receive from the party who sends the identity claim(s).

The process can be explained by using a driver's license verification use case. A verifier like a Traffic Police shares a government-issued identity claims of his/her proving that he/she is an authorized personal to verify other people's driver's license. The verifier first selects the one of his/her identity claims and shares it via NFC HCE mode to a driver with whom the verifier intends to verify his/her credential as a driver. The driver (claim holder) receives encoded optimized payload of the Traffic Police officer's identity claim and the nonce value (like a timestamped value, which is unique one-time generated key). The driver verifies the authenticity of identity claims of the Traffic Police officer based on the digital signature with the received payload and after successful verification, the driver shares his driver's license identity claim along with the received nonce value (which was received from the verifier in the previous step). Nonce value is an extra security step to make sure that both participants of the verification are communicating to the same channel with the same verification process. It precludes the possibility of any intruder to send data to the verifier while a legitimate user is sharing information with the verifier. Since nonce value is only known between a particular claim holder and a particular claim verifier, it makes their exchange of data exclusive, and thus makes the exchange more secure and trustworthy.

After the Traffic Police officer receives the payload of the driver's license identity claim data and the nonce value, the verifier app on the officer's phone verifies the payload, using the digital signature associated with the license identity claim data. If verification is successful, it is proven that what the driver presented is trustworthy information of his/her driver's license. This approach adds two layers of trust: first, to verify the authenticity of the traffic police personnel, and secondly the authenticity of the driver's driver's license. Also, the trust among the two parties is further boosted by the added nonce value.

Figure 8:
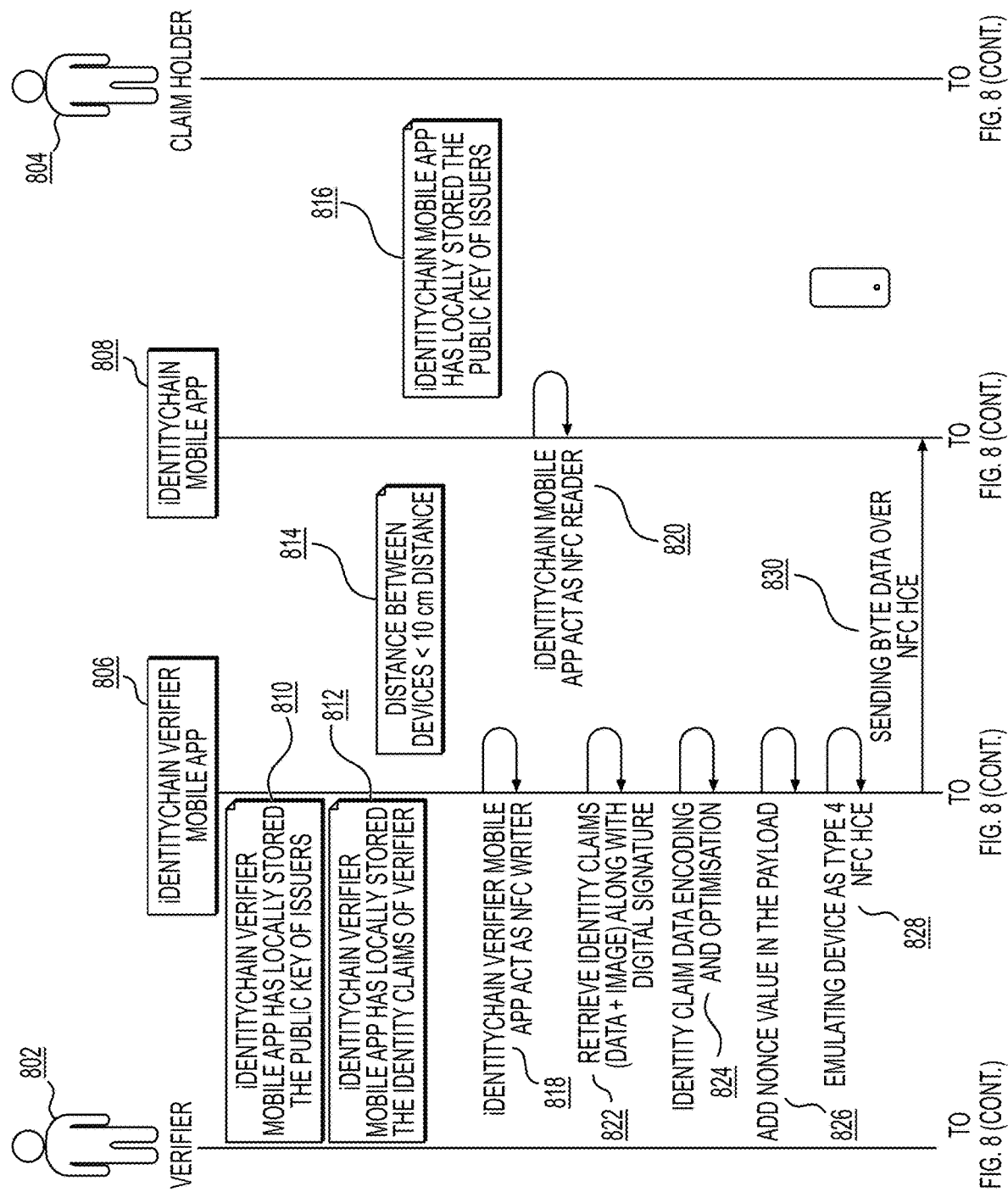
FIG. 8 schematically illustrates an offline identity sharing and verification using NFC Handshake mode between two mobile phones, each of which is enabled by the iDentityChain Verifier mobile app and iDentityChain mobile app respectively.

Referring to FIG. 8, a claim verifier 802 and a claim holder 804 each has a mobile phone which has iDentityChain Verifier mobile app 806 and iDentityChain mobile app 808 respectively installed and running thereon. As a setup, the iDentityChain Verifier mobile app has locally stored the public key of all claim issuers (810) and the identity claims of the verifier (812) as well, and similarly the iDentityChain mobile app has locally stored the public key of all claim issuers (816) and the identity claims of the claim holder (838) as well. The setup is necessary for the offline sharing and verification process because without which the process has no claims and public keys of issuers to begin with. For an online sharing and verification process, the setup is unnecessary, because the claims and public keys can be retrieved on demand via an available internet connection. When the two mobile phones are placed within a distance of 10 centimeters (814), the two mobile apps begin to interact.

While iDentityChain Verifier mobile app acts as an NFC Writer (818, meaning, the app is set to a claim holder mode), the iDentityChain mobile app acts as an NFC Reader (820, meaning, the app is set to a claim verifier mode). The iDentityChain Verifier mobile app retrieves identity claims data (data+visage image) along with a digital signature for the data (note, the identity claims data is for the verifier's identity claims, and the digital signature is provided by the issuer of the identity claims data, i.e., signed by the issuer) (see 822). Then the iDentityChain Verifier mobile app encodes and optimizes the identity claims data (see 824) to create a payload, and then adds a nonce value to the created payload. Subsequently, the iDentityChain Verifier mobile app emulates the mobile phone held by the verifier as a Type 4 NFC HCE device (see 828) and then sends the payload byte by byte over NFC HCE to the iDentityChain mobile app on the mobile phone held by the claim holder (see 830).

Upon receiving the entire payload of the verifier's identity claims data, the iDentityChain mobile app decodes the received data (832), and verifies the received data using digital signature algorithm(s) (834) as described in the step 526 of FIG. 5. Once the digital signature associated with the verifier's identity claims data is verified, the iDentityChain mobile app displays the identity and visage image to the claim holder (836) to let the holder visually exam whether what are displayed on the iDentityChain mobile app match with what the holder visually observe and/or inquire about the verifier. If the holder thinks the verifier passes his/her visual examination and/or oral inquiry, the first phase of the handshaking concludes, and the second phase begins. Otherwise, the second phase will not begin, as failure of passing the visual examination and/or oral inquiry indicate that the verifier does not have the needed authority for verifying other people's identity.

In the second phase, the two apps reverse their respective role, so do they reverse their operation mode. In contrast to the beginning of the first phase wherein the iDentityChain mobile app is set to the claim verifier mode and the iDentityChain Verifier mobile app is set to the claim holder mode, in the beginning of the second phase though, the iDentityChain mobile app is set to the claim holder mode and the iDentityChain Verifier mobile app is set to the claim verifier mode (i.e., the two apps are reverted back to their respective default mode). The different mode would dictate the apps' behavior including whether or not act as a Writer or a Reader. It is also noted, in an offline identity sharing and verification among smart devices without using the Handshake, the holder's device is, by default, set to the claim holder's mode, and the verifier's device is, by default, set to the claim verifier's mode. Therefore, in general, there are three kind of mode of operation for the user interface involved in the entire identity claims management, sharing and verification system: web portal mode (for allowing users to register, and/or onboard with the backend system, and for submitting large quantity documents), claim holder mode (for allowing users to share their identity claims with claim verifier(s)), and claim verifier mode (for allowing users to verify other people's identity claims). Switching among the operation modes can be done automatically by the apps or manually under the control of the users of the apps.

At the second phase, the iDentityChain mobile app acts as an NFC Writer (840), and the iDentityChain Verifier mobile app acts as an NFC Reader (842). The iDentityChain mobile app retrieves identity claims data (data+visage image) along with a digital signature for the data (note, the identity claims data is for the holder's identity claims, and the digital signature is provided by the issuer of the identity claims data, i.e., signed by the issuer) (see 844). Then the iDentityChain mobile app encodes and optimizes the identity claims data (see 846) to create a payload, and then adds the nonce value received from the verifier app at the step 826 to the created payload (848). Subsequently, the iDentityChain mobile app emulates the mobile phone held by the holder as a Type 4 NFC HCE device (see 850) and then sends the payload byte by byte over NFC HCE to the iDentityChain Verifier mobile app on the mobile phone held by the claim verifier (see 852).

Upon receiving the entire payload of the holder's identity claims data, the iDentityChain Verifier mobile app decodes the received data (854), and verifies the received data using digital signature algorithm(s) (856) as described in the step 526 of FIG. 5. Once the digital signature associated with the claim holder's identity claims data is verified, the iDentityChain Verifier mobile app displays the identity and visage image of the claim holder (858) to let the verifier visually exam and/or orally inquire whether what are displayed on the iDentityChain Verifier mobile app match with what the verifier visually examines and/or orally inquires about the holder. If the verifier thinks the holder passes his/her the visual examination and/or the oral inquiries, the second phase of the handshaking and the entire process concludes.

It is noted that the process of sharing and verification in handshake mode is applicable to both online and offline mode alike, the only difference between the two modes is that in the offline mode, all the necessary information such as identity claims data and public keys are pre-loaded on to the mobile phones whereas in the online mode, all the necessary information can be retrieved on-demand. The process is also applicable between an iDentityChain Verifier mobile app enabled mobile phone (held by the verifier) and a smartwatch app (e.g., a WaveID app disclosed later in this document, wherein the WaveID app functions similarly to the iDentityClaim mobile app) enabled smartwatch (held by the claim holder) as well.

Pluggable/Interoperable Blockchain-Based Digital Identity Management

Figure 9:
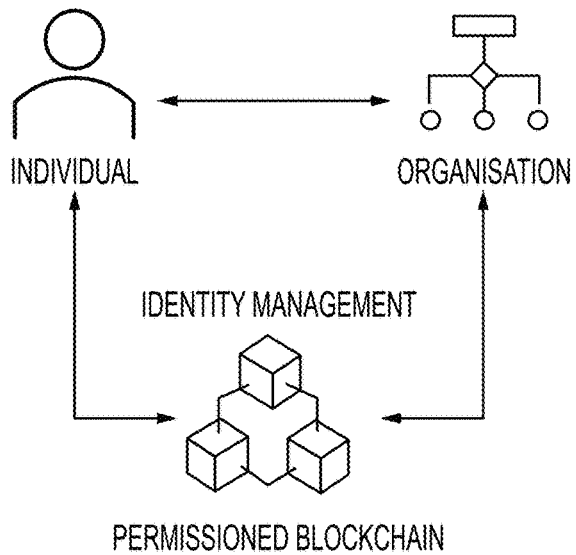
FIG. 9 schematically illustrates a blockchain-based identity management scheme.

In some embodiments of the disclosure, traditional non-blockchain architecture is used as the backend system for supporting the online/offline digital claim sharing and verification using NFC-enabled portable smart devices, via the iDentityChain platform. Alternatively, in other embodiments of the disclosure, a blockchain-based digital identity management system is used as the backend system instead, inter-operating with the same iDentityChain platform.

iDentityChain is an inter-operable blockchain-based identity management system. It enables individuals and/or organization to manage identity claim securely, transparently, and efficiently. It allows the identity issuers to issue digital signature-based identity claims like national IDs, passports, driving licenses and get them stored in a blockchain ledger in the blockchain backend system. IDentityChain platform being pluggable/inter-operable means it can support both blockchain architecture and non-blockchain architecture as a backend system. More specifically, IDentityChain platform is interoperable because it supports both blockchain based architecture and non-blockchain architecture as the backend. IdentityChain platform can connect with non-blockchain system by a set of enabling endpoints that can fetch user's digitally signed claimed and issuer's public key and rest of the process remain same as it is. As of now, the core focus of the iDentityChain platform is to use a blockchain style backend system for better security and transparency. FIG. 9 illustrates the typical role of permissioned blockchain in identity management. In the setup of 900, individuals 902 and organizations 904 can share and verify each other's identity claim(s) as indicated by the dual direction of the arrowed line between 902 and 904. Individuals can register and retrieve their identity claim(s) to and from a permissioned blockchain 906 as the backend of an identity management. Similarly, organizations can register and retrieve their identity claim(s) to and from the permissioned blockchain 906 as the backend of an identity management.

Individual users (citizens) and/or organizations can share and verify their respective identity claims based on the iDentityChain platform that is inter-operable with a permissioned blockchain (as shown in FIG. 8) like a Hyperledger Fabric, or a non-blockchain backend. A blockchain stores the identity claim(s) and the claim(s) can be retrieved by the individual users and/or organizations in their respective mobile smart devices and/or web-based applications on non-mobile devices such as computers.

A permissioned blockchain framework Hyperledger Fabric is used to store and manage identity claims securely as Hyperledger fabric stores data into a ledger which hosts sequential, non tampered transaction of all records. Identity claims are stored in this ledger and access to the ledger in terms of read and write is provided to the blockchain nodes which host the smart contract (chain code). Since the ledger is replicated across all the nodes, its not possible to create fake, tampered records in the blockchain system without being detected. A Hyperledger Fabric being permissioned means that participants in the network are known to each other, and all the transactions happen within a secure network are known to all participants. Participants like organizations (e.g., government ministries, universities, hospitals) and individuals alike can all be part of the network.

Figure 10:
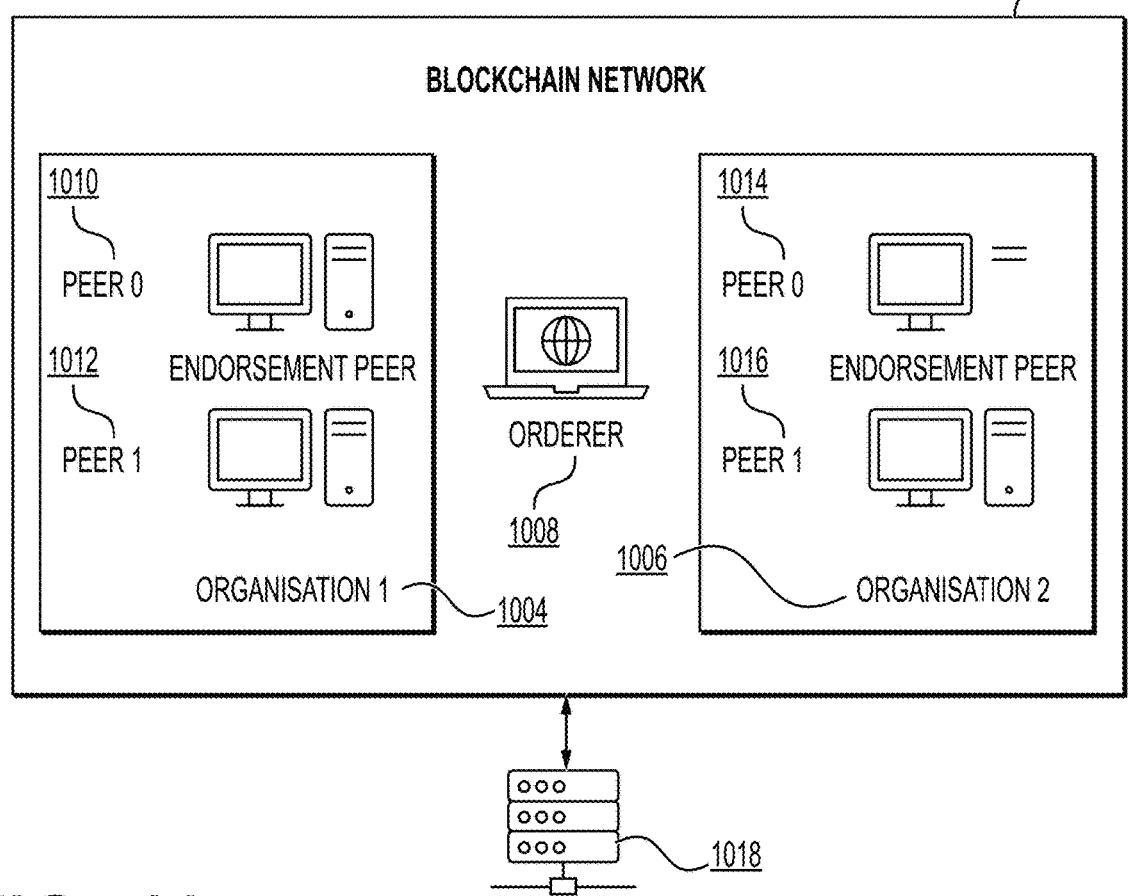
FIG. 10 schematically illustrates an example of a blockchain network for identity management.

For demonstration purpose, a sample network of two organizations to demonstrate the distributed capability of blockchain as illustrated in FIG. 10 which shows all the components of permissioned blockchain 1000 in the context of two organizations (1004 and 1006).

Each organization can have two peers in minimum (e.g., 1004 has 1010 and 1012, and 1006 has 1014 and 1016) in which one of the peers is an endorsement peer (e.g., peer 1010 in organization 1004, and peer 1014 in organization 1006), which executes smart contracts. An endorsement peer is a node in the blockchain network where a smart contract (i.e., identity claims business logic) is deployed and executed. The Orderer node (1008) orders the transaction, received by peers in organization 1 (1004) and organization 2 (1006). The order is timestamped and it creates a block that eventually gets stored in a ledger. A copy of the ledger is stored in all the peers of organization 1004 and organization 1006. Server 1018 represents one or more computing servers that collectively provide the computing infrastructure for the blockchain network 1002.

When a request to create a transaction is received by the iDentityChain platform, in which an application server forwards the request according to a pre-defined endorsement policy (i.e., it is defined from the outset by a particular organization in its endorsing peer node). Example of one such transaction can be the creation of an identity claim like a national ID, or a driving license into a blockchain network.

Figure 11:
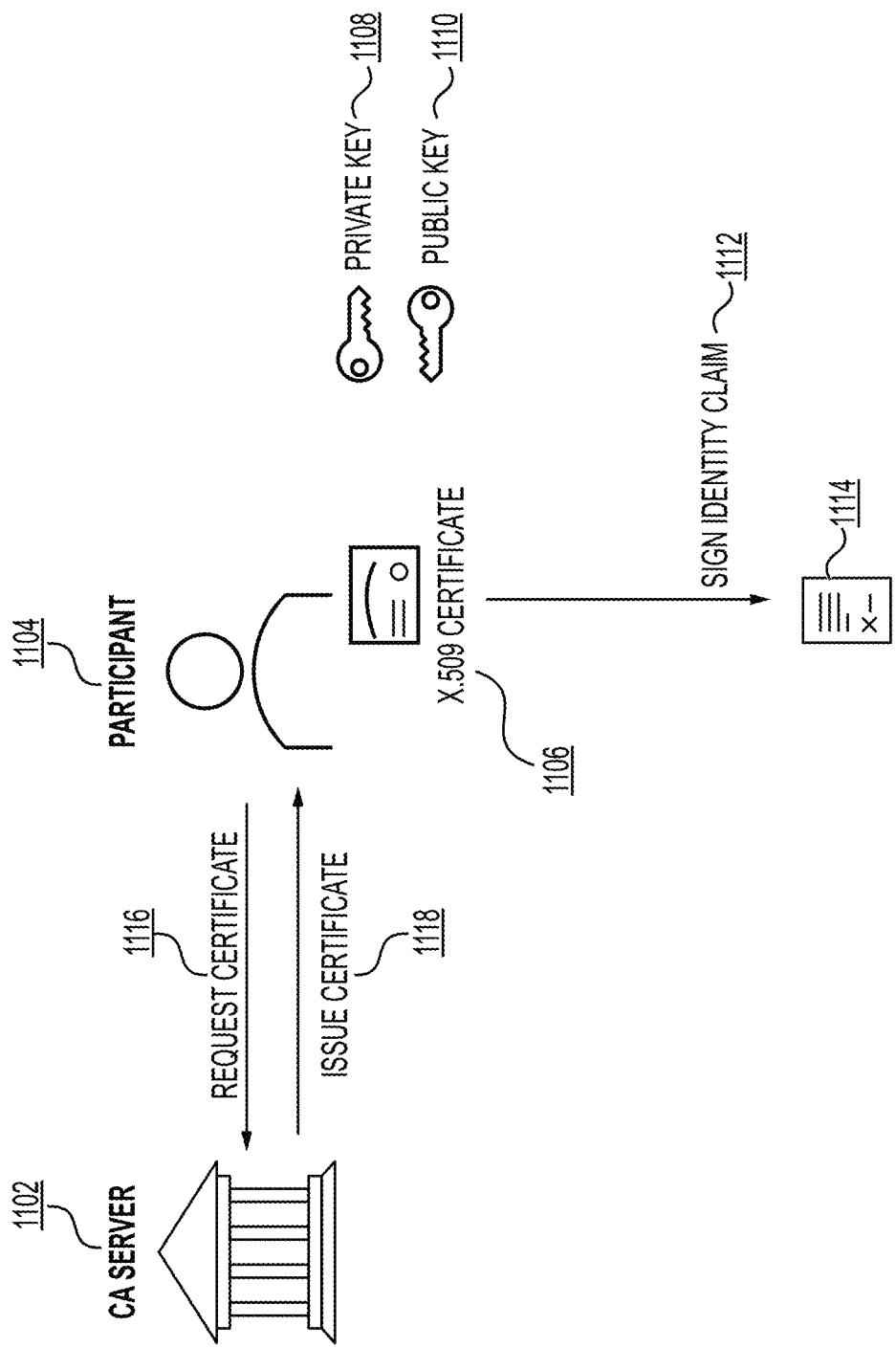
FIG. 11 schematically illustrates a certifying authority server issuing certificates to a blockchain network's participants.

The security feature of a permissioned blockchain framework is achieved by using a Public Key Infrastructure (PKI). Specifically, identity of organization and peer in the network is maintained by a PKI which uses a Certifying authority (CA) and a Membership Service Provider (MSP) to ensure the secure operation of the network. A CA Server issues self-signed (x.509) certificates to all the participants into the network and MSP manage these certificates at the network level.

x.509 certificates, issued by CA, are used to digitally sign all the identity claims, issued by a claim issuing organization to an individual, for offline verification as demonstrated in FIG. 11.

Referring to FIG. 11, in a setup 1100, a participating organization such as participant 1104 in a blockchain network 1002 requests (1116) a self-signed certificate from the CA server 1102 at the time of onboarding (i.e., registering) into the network. Once the requested certificate is issued (1118) by the CA Server 1102, the organization 1104 can use the certificate to digitally sign on identity claims (1114) of users (i.e., the signing 1112) while issuing the users' respective identities into the blockchain, and it is the signed claims 1114 that are issued and stored in the blockchain network. It is noted that at the time of onboarding the organisations into the network, Certifying Authority registers the organizations into the blockchain network and each registered organization have a public key and a private key, and the keys are stored in a key vault (which can be a normal file system or any cloud-based secured file system). Private key will be used for signing the digital claims and public key will be used to verify the signed digital claims.

Each organization have a wallet hosted on a blockchain node to store the public key 1110 and the private key 1108 for signing any transactions. These keys can be stored securely to a key vault as well. As mentioned above, a key vault is typically a file system specifically designed for storing the keys. In iDentityChain, keys are getting stored in either a normal file system or in secured cloud file servers.

Application Architecture of Identity Framework

Figure 12A:
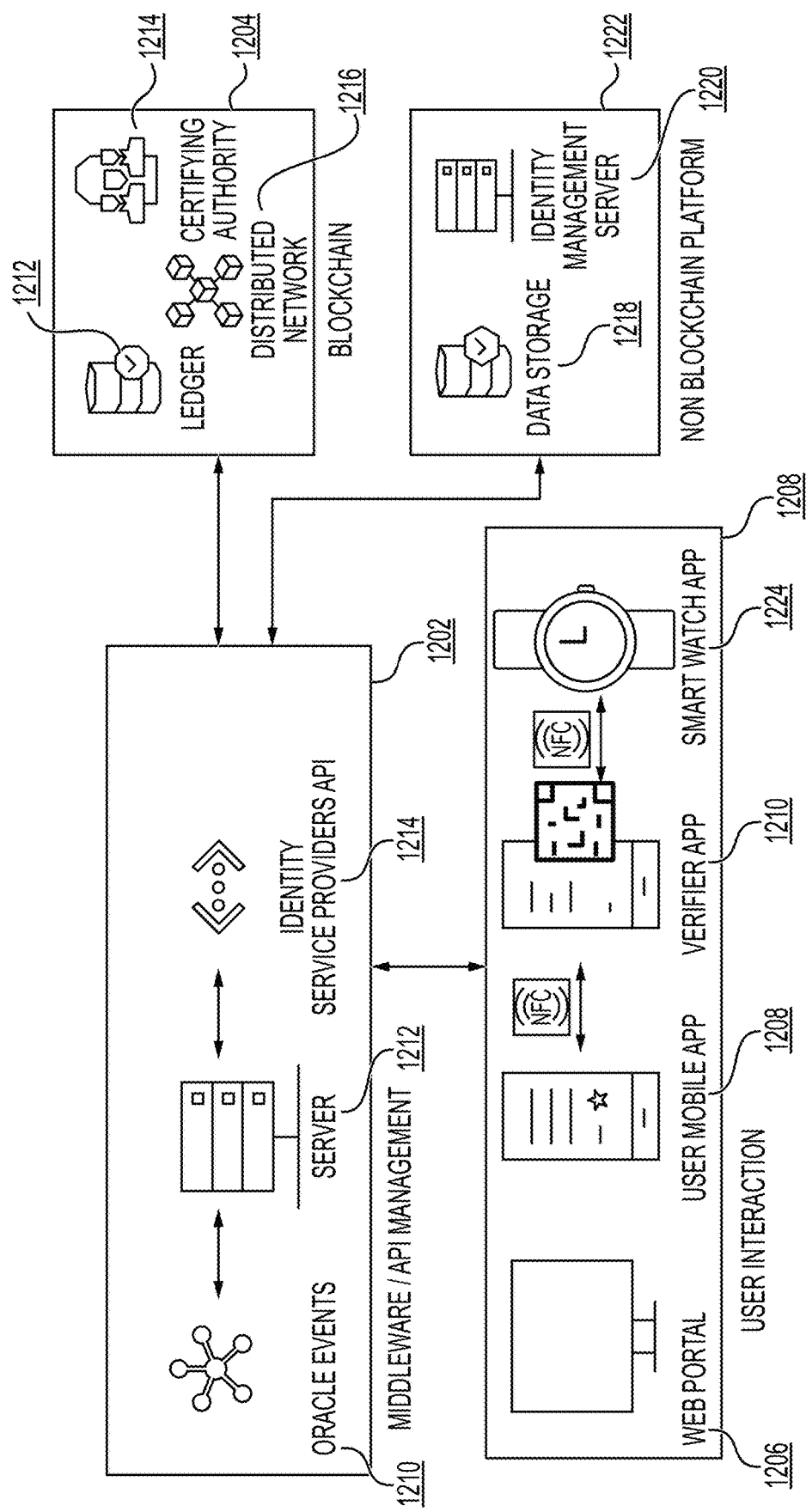
FIG. 12A schematically illustrates major modules of an identity claim framework, according to certain embodiments.

The framework consists of three major layers as shown in FIG. 12A: a backend layer (i.e., backend system) such as blockchain 1204 or non-blockchain platform 1222, a middleware layer 1202, and a user interaction layer 1208.

A blackend layer/system is mainly for storing, managing, and distributing identity claims. It is also for onboarding and managing participants of the entire framework such as claim issuers, claim holders, and claim verifiers. Like any backend system in a typical computing framework, the backend system herein has one or more storage systems, and one or more management servers. A backend system in the Identity Framework, though, also has a system for maintaining security for identity claims such as the Certifying Authority 1214 in a blockchain style backend system.

Blockchain Layer 1204: For managing identity claims a permissioned enterprise blockchain framework, and Hyperledger fabric. Hyperledger Fabric offers in-built CA services 1214 which are easy to build secure layer around the distributed blockchain network 1216. The layer uses couch database (DB) as a world database 1212 and Level DB as Transaction logging system to store immutable identity claim records.

Hyperledger Convector is a wrapper on top of the Hyperledger Fabric core API's (Application Programming Interface) to provide easy and hassle-free blockchain network creation and management.

iDentityChain is inter-operatable in terms of interfacing and supporting a backend system such as Blockchain and Non-blockchain system. It also extricates the iDentityChain platform from relying on a blockchain-only solution and thus expands the scope of the applicability of the iDentityChain layer to a non-blockchain-based solution. Although the focus of iDentityChain platform is to integrate Blockchain system for better security and transparency, it is interoperable and can integrate with a non-blockchain system provided the non-blockchain system can connect with API endpoints in the iDentityChain platform (such as 1214 of FIG. 12A) for retrieving digitally signed identity claims and issuers' public key.

Middleware/API Management Layer 1202: Node JS-based (JavaScript-based) server 1212 has been configured as a middleware layer to host APIs which can be integrated, as an interface, to inter-operate with a backend system such as the Blockchain 1204 smart contracts and with the User interaction layer 1208. The server uses Oracle events 1210 to manage smart contract events which internally calls identity service API 1214 for identity claims issuance. The server is accessible by JSON (JavaScript Open Notation) Web Tokens (JWT) for secured access.

User Interaction/Presentation Layer 1208: a wide variety of mobile apps (1208 and 1210) and web apps 1206 are offered to users so that individuals and/or organizations can easily manage digital identity claims.

Web Portal 1206: The web portal is primarily designed for an organization to approve, reject and verify identity claims online, shared by or requested by individual users. Web portals offer login access to individuals with limited services compared to the mobile app.

User Mobile Apps 1208: iDentityChain mobile app is a mobile wallet where the identity claims are stored offline/online securely. The app is accessed by biometric authentication as a layer of added security. User mobile app offers offline identity sharing to another mobile app using NFC communication protocol.

Verifier App 1210: iDentityChain Verifier mobile app is for identity verifying entities (such as traffic police, banks etc.) that have authority of verifying other people's identity. It has NFC reader that can read identity claims offline from user mobile app securely and verify the claims using digital signatures.

SmartWatch App 1224: a smartwatch app, also coded as Wave and Verify app, such as the WaveID app (more detail later in this disclosure), enables an individual to transfer primary identity (National ID) from mobile phones to smartwatches which can be subsequently verified offline by the above-mentioned verifier app. The smartwatch app uses NFC protocol to read and share identity claims. The major features of the app are explained in referring to FIG. 12B.

Non Blockchain platform 1222 can also be part of the iDentityChain ecosystem. To make the iDentityChain pluggable/inter-operable, the Identity Management server 1220 exposes its API related to issuing and retrieving digitally signed identity claims of user to the middleware 1202. These APIs can be used by iDentityChain server to create identity claims and retrieve identity claims based on user's request. Identity Claims are stored in database(s) 1218.

Figure 12B:
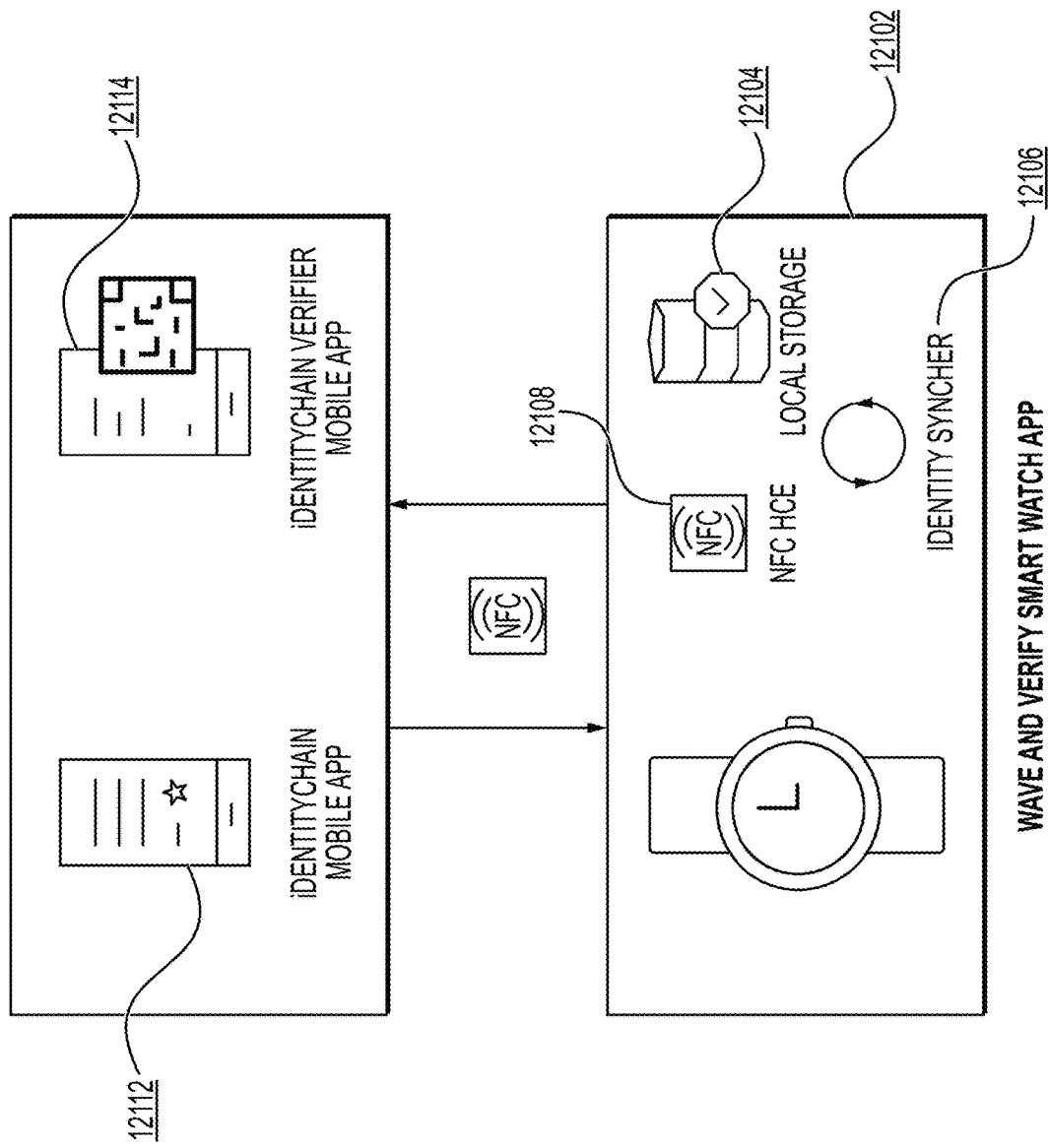
FIG. 12B schematically illustrates the architecture of a NFC-enabled smartwatch app and its interaction with other iDentityChain mobile apps.

Referring to FIG. 12B, a Wave and Verify app 12102 has the following major features.

NFC HCE 12108: Wave and Verify primarily relies on Tizen NFC API in order to communicate to external devices. NFC HCE 12108 acts as emulator NFC writer sharing data with other peer devices like mobile phones that are enabled by either the iDentityChain mobile app 12112, or the iDentityChain Verifier mobile app 12114 over NFC 12110. Wave and Verify in handshake mode verifies the identity of verifying agencies before sharing the claim holder's own identity data to the verifying agencies.

Local Storage 12104: identities in a smartwatch are stored locally to facilitate offline sharing of identity information. The data is stored for a certain days and will be getting updated in a certain frequency/interval to avoid being staled. Data is encrypted and stored to add security layer.

Identity Syncher 12106: It update the smartwatch app with latest identity information in a pre-defined interval. This approach ensures that the app doesn't have an outdated identity information and it may prompt the verifier that the latest updated time stamp to increase the trustworthiness on integrity of the claim data. Synching happens with an iDentityChain mobile app which in turn, independent of the Wave and Verify app, retrieves the claim data from the backend system. The sharing and/or synchronizing process takes place offline and relies on NFC 12110 for any peer to peer communication.

Figure 13:
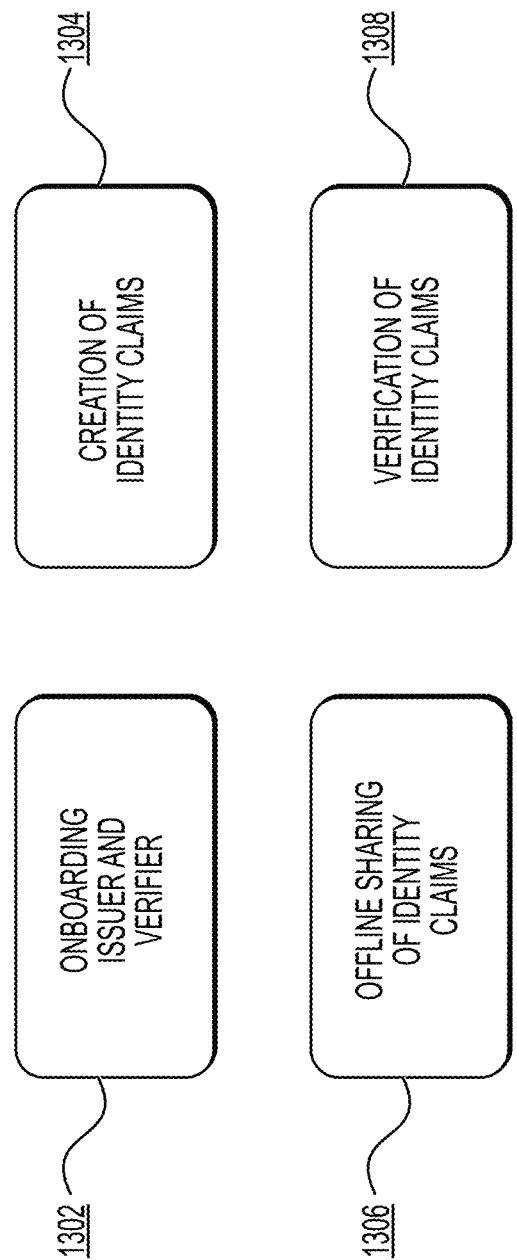
FIG. 13 lists four major identity services provided by the identity claim framework, according to certain embodiments.

In some embodiments of the disclosure, an identity management system using blockchain architecture as a backend, identity claims are created and stored in Hyperledger Fabric ledger 1212. The stored claims are later used by organizations for verification and/or revoking identities. FIG. 13 shows the four major components of identity management system, among which the offline sharing of identity claims 1306 among mobile devices is the core component.

Figure 14:
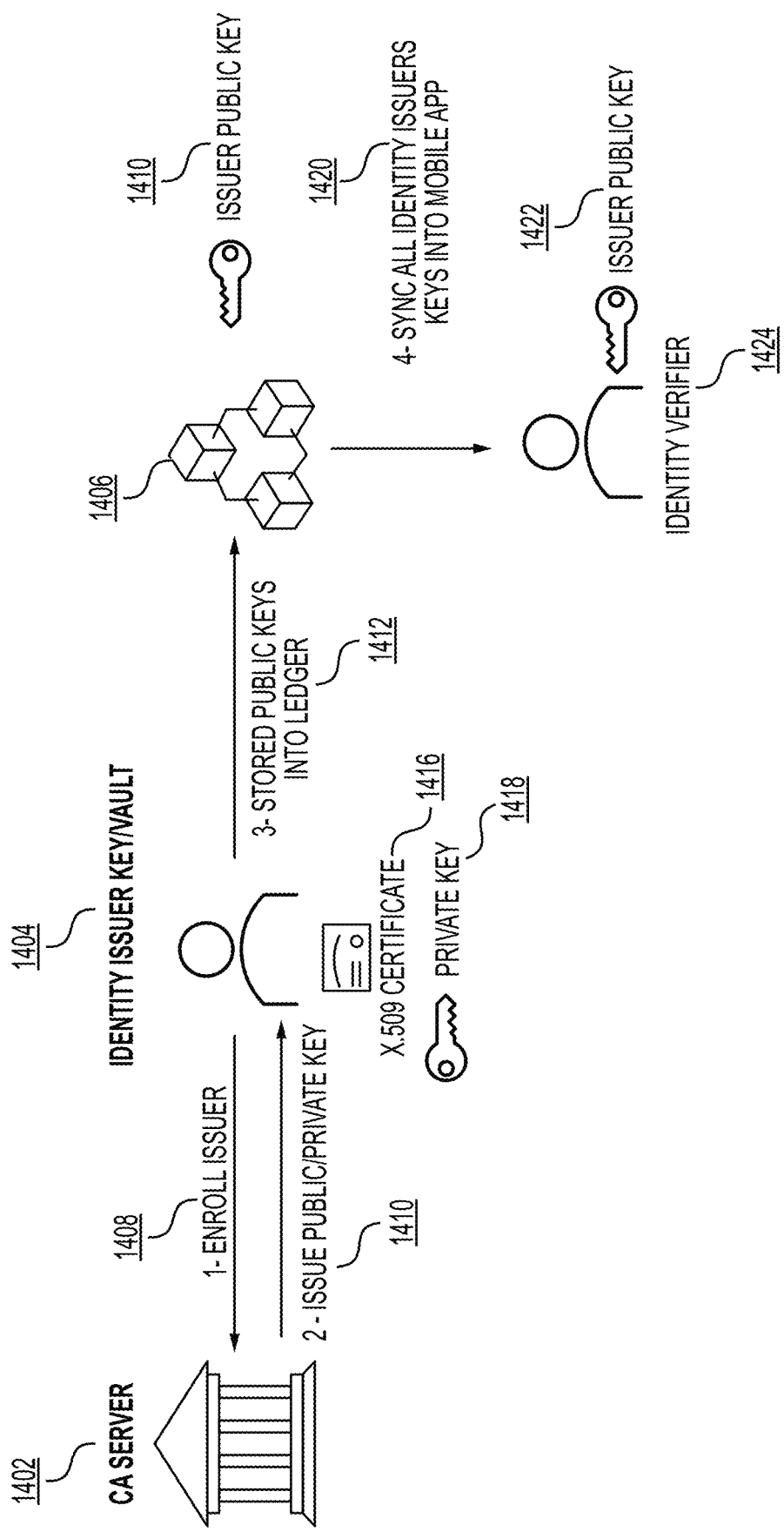
FIG. 14 schematically illustrates the process of onboarding an identity issuer and an identity verifier to a backend system of the identity claim framework, according to certain embodiments.

Onboarding Identity Issuer and Verifier 1302: in order to issue and verify the identity claims into the system, the identity issuers and identity verifiers have to go through the onboarding process (i.e., registering themselves to the framework). Identity issuers need to enroll in a Blockchain network using Fabric CA and get the public-private keys into configuring the key vault. The CA server registers an user of organization and provide the enrollment ID and secret key. Using the provided enrollment Id and secret key, the user can invoke enroll command to obtain a private key and a public key which can be used for signing identity claims and verifying signed identity claims respectively. Organisation users are personals like Police officer from Traffic police organization or administration from University organization. The identity issuers will store public keys into a blockchain so that the identity verifier apps, or even identity claim holder apps (in a claim verifier mode) can synchronize with the blockchain ledger and retrieves the public keys into their mobile identity verifier apps or identity claim holder apps for digital signature verification. FIG. 14 illustrates the onboarding process in detail. It is noted that the onboarding process would be similar when the backend system is a non-blockchain architecture.

Referring to FIG. 14, an identity issuer 1404 obtains (1410) public and private keys from the CA server 1402 at the time of onboarding (1408) a supporting blockchain network (note, the CA server 1402 is a part of the blockchain network). The issuer 1404 uses private key 1418 to digitally sign the identity claims of users (not shown) who seek issuance of their identity claims with the issuer. The identity issuer stores (1412) a copy of public key 1414 into blockchain's ledger 1406 so that any verifying party such as an identity verifier 1424 or an identity holder (not shown) can use the public key to verify the digitally signed identity claim to prove that identity claim presented by a user is actually signed by a legitimate identity issuer (i.e., the identity claim presented by the user is authentic, and un-tainted). In an offline operation mode, the identity verifier 1424 or the identity holder can pre-synchronize all identity users' public keys (including the identity issuer 1404's) into its verifier mobile app (1420) (or its holder mobile app (not shown)) and so that the identity verifier 1424 or the identity holder can have a copy of identity issuer 1404's public key (1422). In an online operation mode, the synchronization of all identity issuers' public keys can be carried out on-demand. It is noted that onboarding an identity issuer and an identity verifier in the case of the backend being a non-blockchain architecture would be similar. x.509 is a form of digital certificate standard that allows the subject to store identifying details in its structure. Subject can store identifiable information (location, email, organization name) into a cryptographic form to uniquely identify that this digital certificate belongs to a user.

In fact, iDentityChain mobile app, like the iDentityChain verifier mobile app, retrieves the issuer's public key and store it locally for any digital signature verification as well.

The onboarding of an identity issuer is a key service that distinguishes the identity management system in the embodiments of the disclosure from traditional identity management system. It enables the decoupling of identity issuers from the burden of identity management, so that performance bottleneck mentioned in the background section of this disclosure is avoided and the security of identities would be heightened as the security control is shifted to the management system rather than staying with the identity claim issuers.

When an identity issuer onboards a backend system, it also needs to provide required credentials to an administrator of the backend system to prove that it has been authorized by the government to issuing identity claims for the general public. Such credentials can be a government issued documents, and the documents can be submitted online or offline. When an identity claim verifier onboards a backend system, he/she needs to provide required credentials to an administrator of the backend system to prove that he/she has adequate governmental authorization to verifying identity claims for the general public. Such credentials can be a government issued documents, and the documents can be submitted online or offline. The identity claim verifier, when onboarding, also needs to provide basic identity claims (i.e., identity related information on his/her government issued identity document) to the administrator of the backend system to demonstrate that he/she is the person he/she claims he/she is. Similarly, when onboarding a backend system, an identity claim holder needs to provide basic identity claims (i.e., identity related information on his/her government issued identity document) to the administrator of the backend system to demonstrate that he/she is the person he/she claims he/she is. Submission of these required information for onboarding can be best done from a user interface in a web portal mode and when the device hosting the user interface is online to allow sending large volume of data (because data of basic identity claims and required documents for proving credentials can be voluminous).

Identity Creation/Issuance Process in Blockchain

Figure 15:
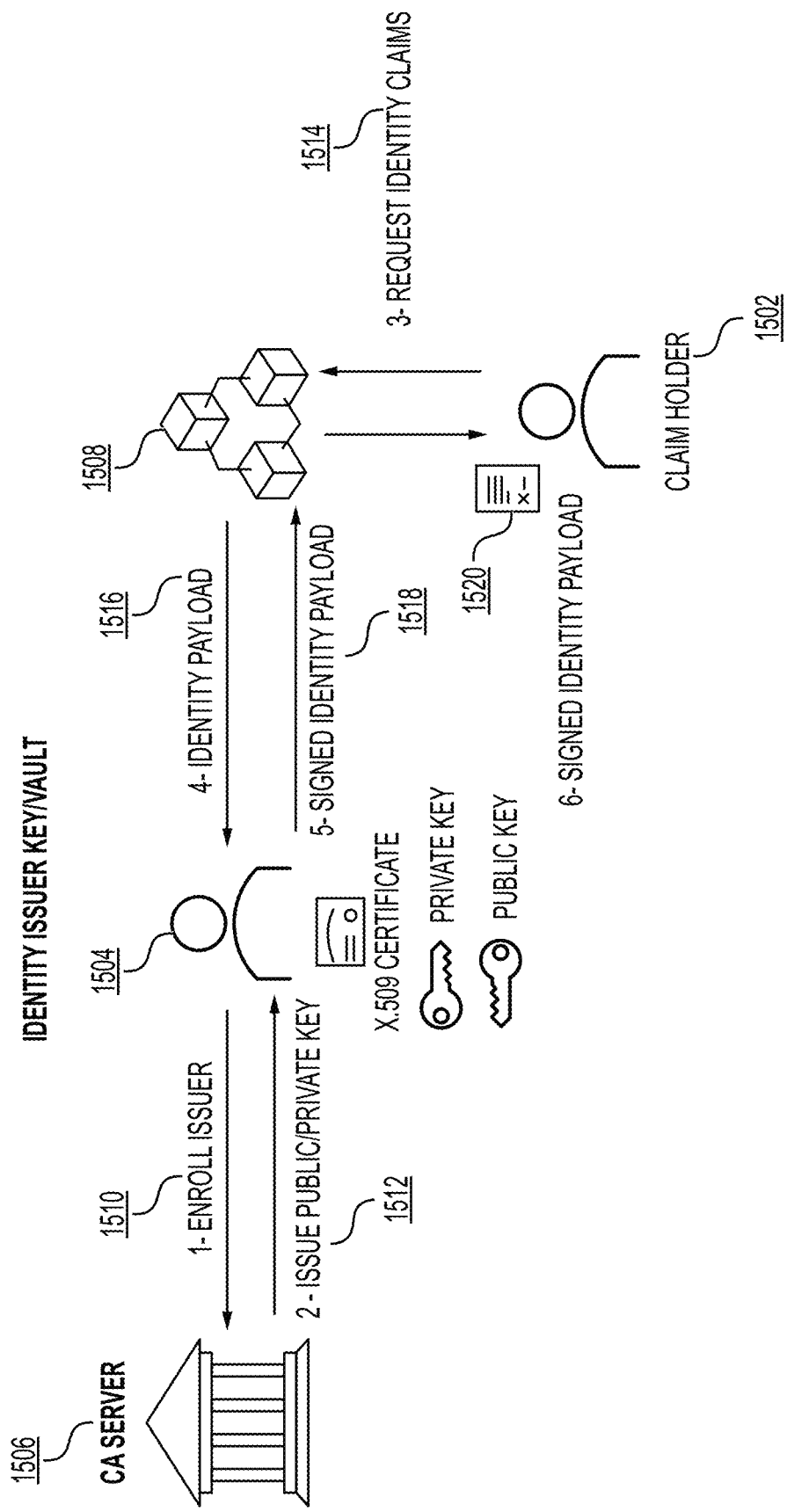
FIG. 15 schematically illustrates the creation and issuance of identity claims.

Referring to FIG. 15, after a successful authentication (i.e., in the registration page of iDentityChain web portal, an user provides his/her basic identity details which include national ID details like date of birth, mobile number, national ID number into the portal, and then user sets the password for login purpose. Once the registration is successful, an iDentityChain registration request is sent to user's national ID service provider's portal to approve the iDentityChain registration request. Once the request is approved, user can login to iDentityChain web portal. This additional authentication step is to prevent anyone else from providing national ID of the user and registering into the application and get all the identity claims), an user 1502 sends a request to issue new identity claims (step 1514) to the application server; there upon the smart contracts (note, smart contracts collectively are a business logic written in programming language and deployed in the blockchain nodes. Each node can have a different smart contract based on the business flow. In iDentityChain platform, a smart contract has logic to create, validate and verify the identity details of a claim holder.) validate the user's basic identity claims such as a National ID (note, an user's basic identity claim is verified by matching his/her national ID's details. When the user is successfully registered into the system, the user gets national ID into the ledger and can request any subsequent identities like driving license or passport. Only when the user's identity issuance requests contain identity information that matches with the details present in the national ID like National ID number, the requests of issuing additional identity claim are processed.) and send an event to specific service providers (note, a specific server is an identity issuer server where the user's identity lies in. For example, a driver's license may lies in the system of Ministry of Transport, a University degree lies in the system of the University education system, a passport identity lies in the system of the Minister of Interior) to fetch new identity claims data (e.g., a driver's license). The service provider creates a claim payload, embeds a digital signature, based on x.509 certificates (collectively they constitute to a signed identity payload 1520), previously issued by the CA server, and send to a smart contract via an event as shown in FIG. 15. The above process of identity claim issuance can be explained at a level of design. Initially the administrator of an Organisation enrolls him/herself with the Certifying Agency at the time of onboarding with the blockchain network and obtains the public/private keys in return as the result of the enrollment. This enroll-n-obtain-keys steps happen only one time at the time of network setup. What is recurring are users' requesting for identity claims. The recurring process starts when a user (e.g., a citizen) requests for identity claim(s) such as a passport claim, this request is directed to the IdentityChain server, which validates the request and forwards it to a smart contract. The smart contract sends the request to an organization (such as the passport organization) which stores the user passport information retrievable via an external API. The administrator of the Passport organization then digitally signs the request and stores the requested information (i.e., identity claim) into blockchain ledger and this information is shared with the requesting user.

Figure 16:
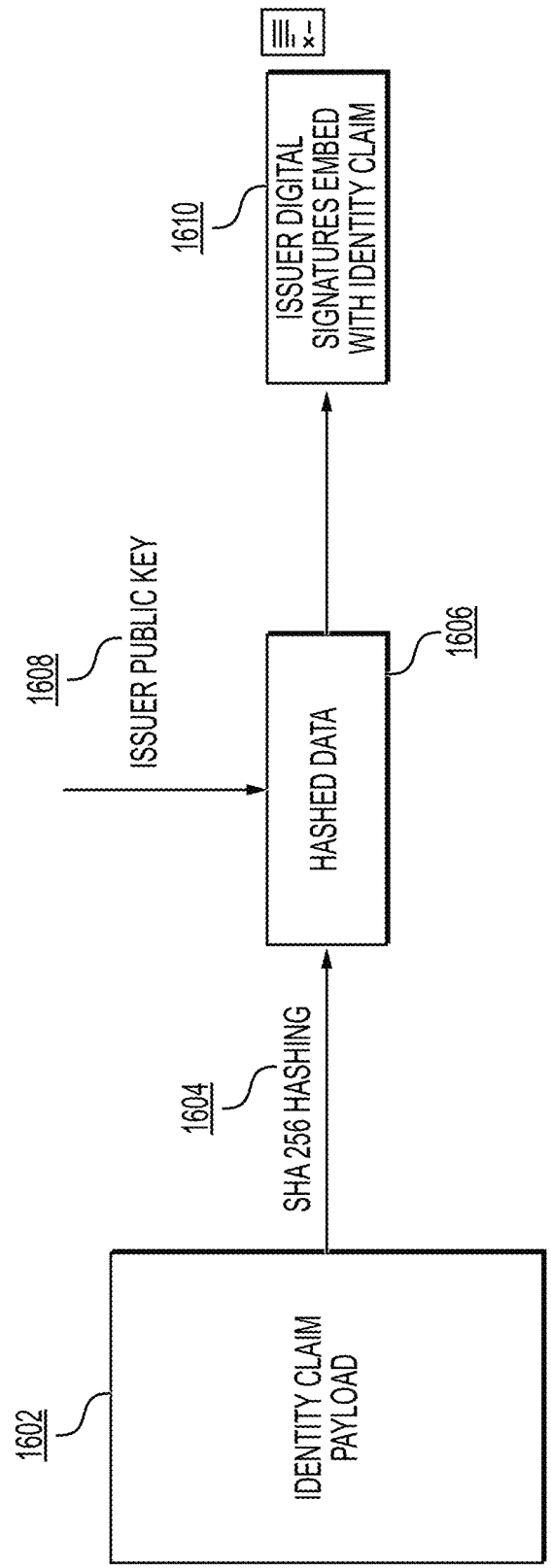
FIG. 16 schematically illustrates the process of digitally signing an identity claim payload using a private key of the claim issuer that issued the identity claim.

FIG. 16 illustrates as to how digital signing is performed for an identity claim payload, created by the service provider (e.g., the bureau that issues passports, the bureau that issues Driving Licenses, or the Office in a University that issues certificates for education credentials). Essentially, an identity claim payload 1602 is SHA 256 hashed (1604) into a hashed data 1606, followed by signing the hashed data with the issuer's private key (1608) wherein the issuer is an issuer who issues the identity claim, and the process concludes at creating a payload in which the issuer's digital signatures are embedded with the issued identity claim 1610).

Figure 17:
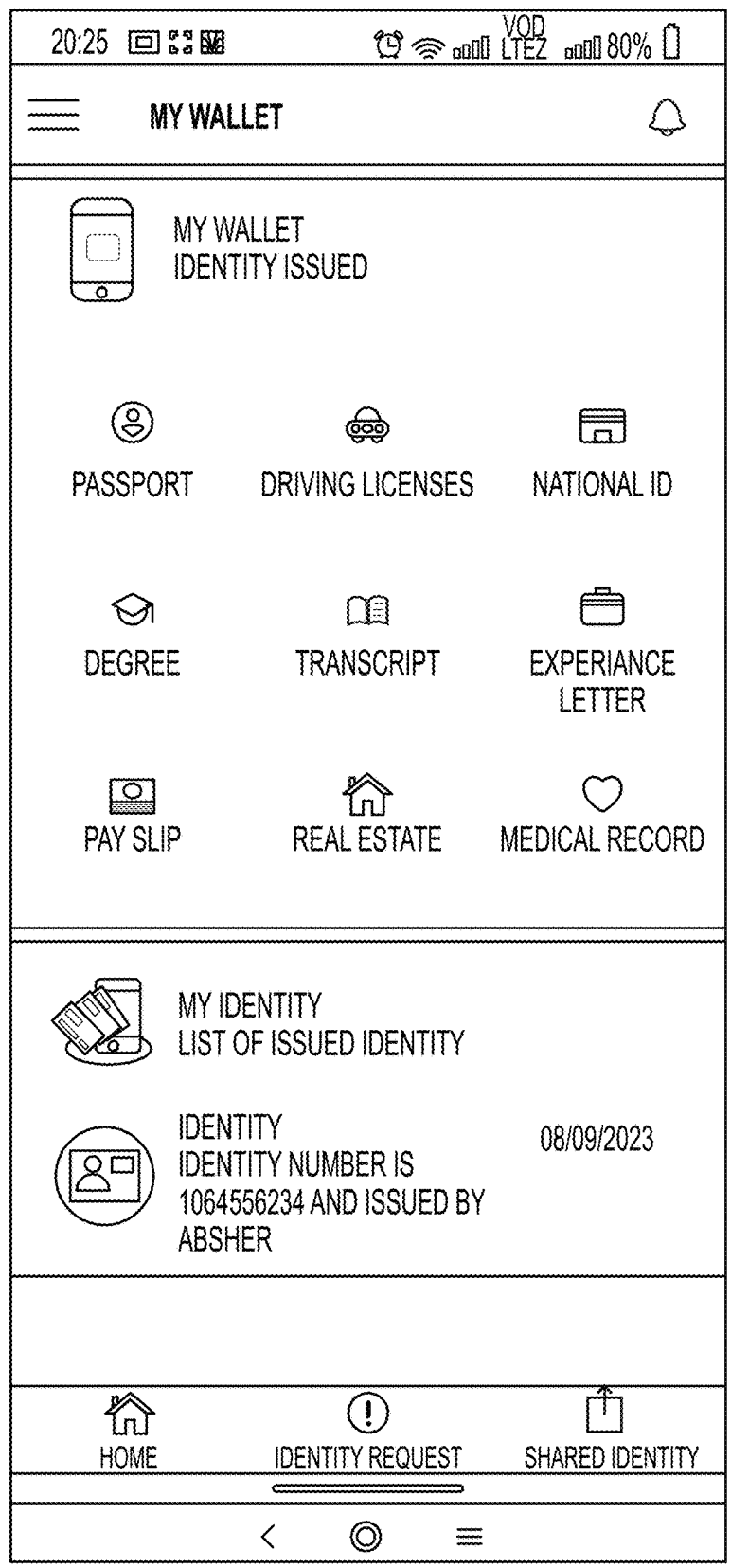
FIG. 17 shows an appearance of a mobile wallet that stores multiple identity claims.
Figure 17:
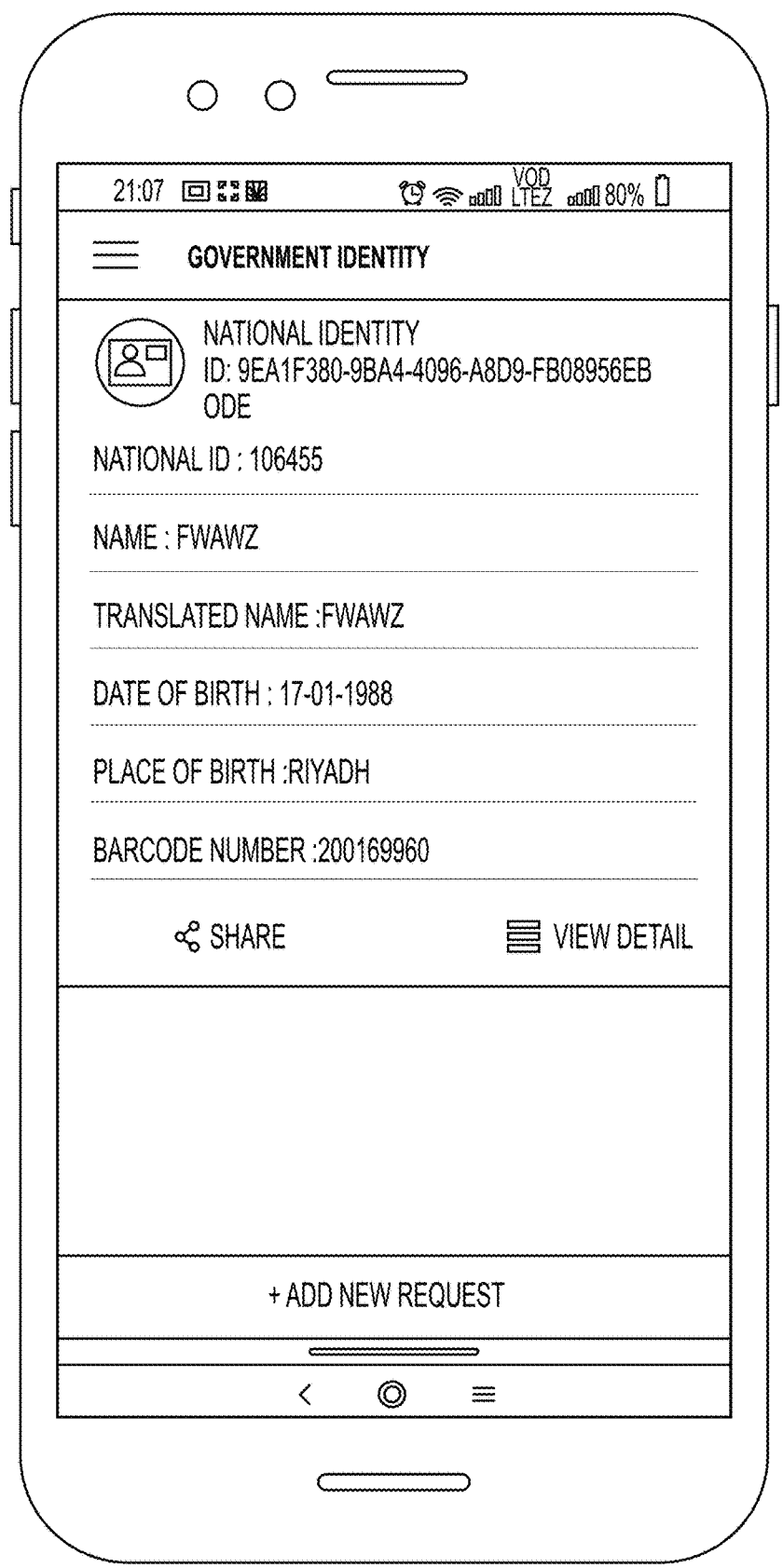

Digital signing makes up an integral part of an identity claim payload, and a signed payload can later be verified with regard to whether the integrity of the payload has been tampered or not. Smart contract, based on a receiving payload, further processes the transaction and sends the transaction to Orderer (demonstrated in FIG. 14 above) for creating blocks which are later stored in the fabric ledger. Payload response is sent back to the application server, once a new identity claim is stored into the ledger and server sends back (1520) the response to a mobile app where the new identity claim is stored offline to the mobile wallet as shown in FIG. 17 showing a digital wallet contains a variety of identity claims (the screenshot at the left side) and an example of identity claim—National Identity (shown in the screenshot at the right side).

Figure 18:
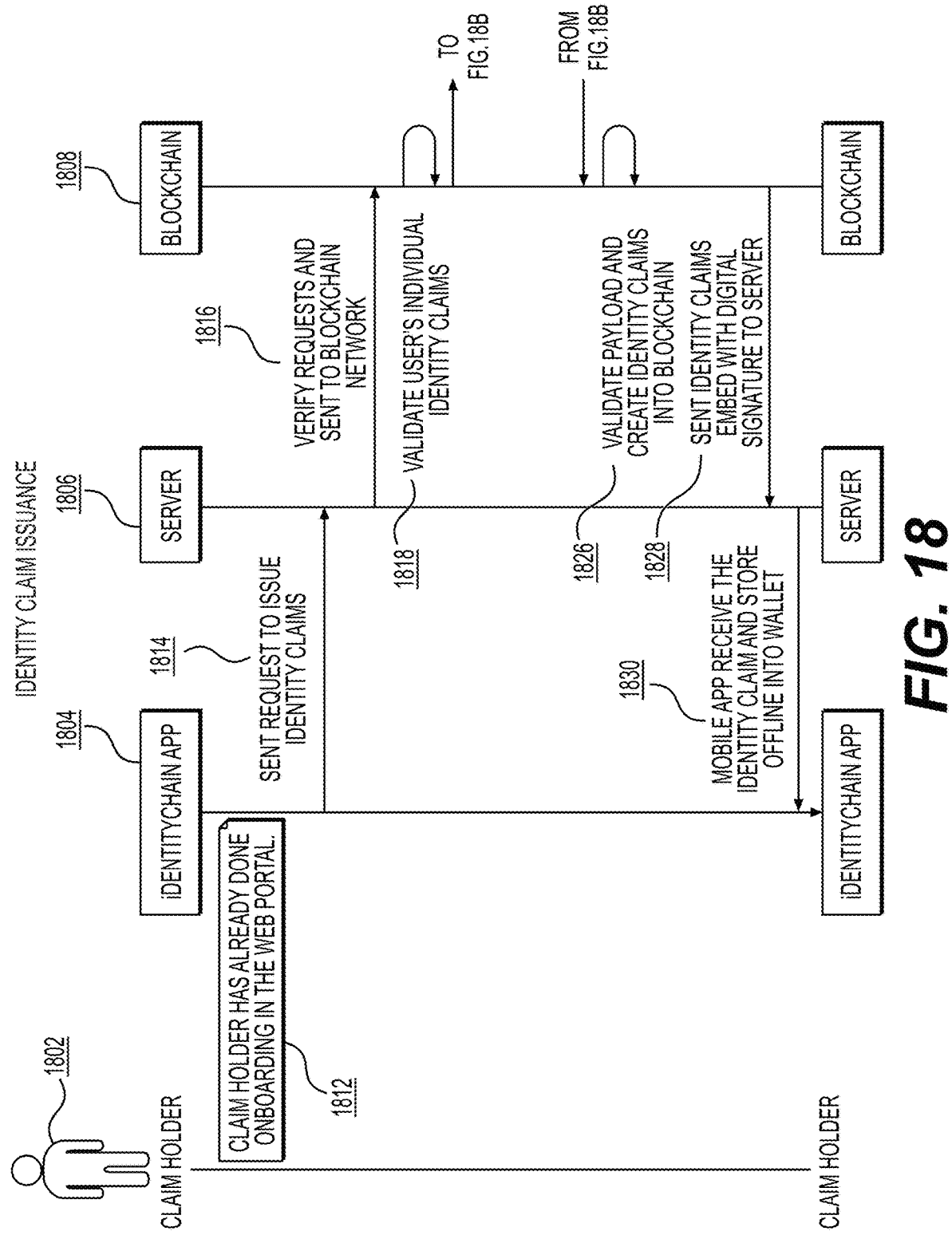
FIG. 18 schematically illustrates a flow of issuance of an identity claim.
Figure 18:
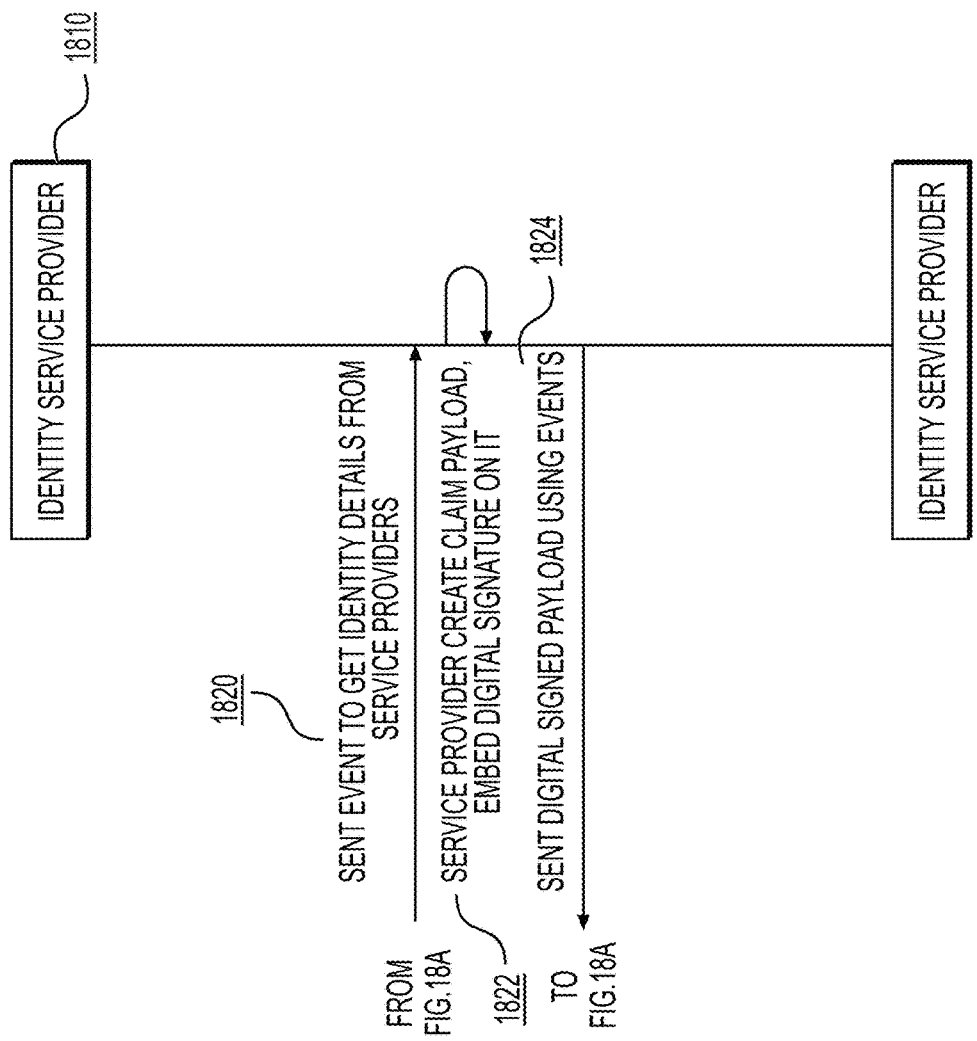

Referring to FIG. 18, a flow chart of the process of identity claim issuance demonstrates the interactions among a claim holder 1802 via an iDentityChain mobile app 1804 running on the holder's mobile phone, iDentityChain platform Server 1806, a Blockchain backend 1808, and an Identity Service Provider (i.e., an identity claim issuer) 1810. Since an identity claim plays a central part of the identity claim verification process, the process of identity claim issuance is an indispensable prerequisite of the identity verification process.

As 1812 indicates, the claim holder 1802, prior to the claim issuance process, has already done the onboarding to the iDentityChain platform via a web portal. That is to say, the claim holder has signed in on to the web portal and verifies the his/her basic identity in order to avail the services provided by the platform. Although not shown in FIG. 18, the identity service provider 1810 (i.e., the identity claim issuer) has done the onboarding with the iDentityChain platform as well, in order to provide claim issuance service via the platform. The claim holder can download the iDentityChain mobile app 1804 and then, via the app, request for identity claims (see step 1814). Upon receiving the request, the iDentityChain platform Server 1806 verifies the request and pass it to the blockchain network (see step 1816). The blockchain network, upon receiving the request, validate the holder's basic identity claims 1818, note, validating the holder's basic identity claims means that the holder's national ID is verified with national ID number. While requesting any identity claims except national ID, the holder of national ID needs to send his/her national ID along with his/her identity claim request to allow the system (an administrator of the system, in particular) to verify to ensure that the his/her national ID exists in the system before issuing any other identity claims such as a passport, driving license etc.)

Once the holder's basic identity claims are verified, the blockchain network sends an event to get identity claims from the service provider 1810 (see step 1820). The identity service provider (i.e., identity claim issuer) then creates and digitally signs a payload of identity claim for the claim holder (see step 1822) and sends the signed payload using events (see step 1824) to the blockchain network 1808, which, in turn, validates the signed payload and creates identity claims and stores/caches them into the blockchain's storage system (see step 1826) (note, this validation step is to ensure the blockchain server is getting the right user's identity claim by simply comparing the National ID stored in the blockchain server to the National ID sent by the corresponding service provider), and sends the signed payload to the iDentityChain server 1806 (see step 1828), which, in turn, sends the signed payload to the iDentityChain mobile app 1804 (see step 1830). The app then stores the signed payload in its identity wallet.

In some embodiments of the disclosure, since the backend system such as the blockchain system 1808 caches the signed payload received from the identity claim issuer 1810, the backend system can dispatch the cached signed payload to a requesting identity claim holder without proceeding to the step 1820 (sending an event to get identity claims from the identity claim issuer). The caching of payloads obviously is meant to reduce transaction time, but sometimes, cached payloads need to be flushed out and replenished to avoid having staled cached payloads.

It is noted that the blockchain network/backend 1806 can be replaced with a non-blockchain backend without altering the overall flow of the process.

It is also noted that the process depicted in FIG. 18 requires the presence of network connection that connects all relevant parties to the process. Therefore, to facilitate an offline identity claim sharing and verification, the claim holder 1802 must have his/her identity claims pre-loaded in his/her digital identity wallet (as shown in FIG. 17) when his/her mobile phone has an internet connection. During an online identity claim sharing and verification, the claim holder 1802 can request his/her digital identity claims needed on-demand, since his/her mobile phone has an internet connection. The iDentityChain platform supports the online/offline storage of identity claims. It allows the iDentityChain mobile app to fetch users' digitally signed claims in the case of having an active internet network and store them on the mobile phone where the app is running for offline sharing purposes.

The app stores the identity claims into a local database along with the last synced timestamp for offline sharing purposes. Keeping identity offline conveniently expedites the identity sharing process and put less load on the identity servers. In the case of having no internet connection, it acts as the only option to share identities between devices as shown in FIG. 19.

Figure 19:
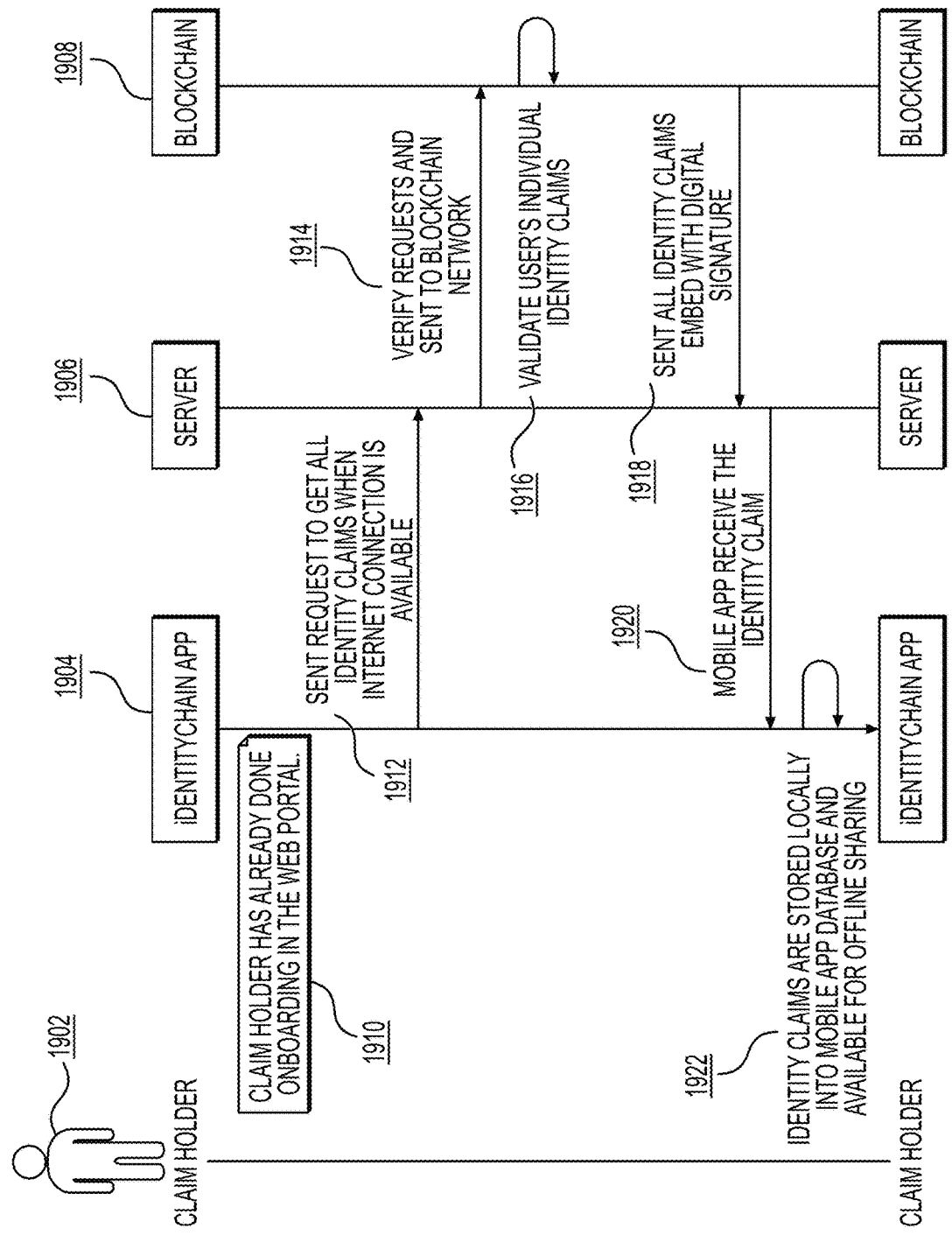
FIG. 19 schematically illustrates a flow of retrieval of an identity claim.

Unlike FIG. 18, the process depicted in FIG. 19 does not involve the Identity Service Provider (i.e., the claim issuer), because by the time when the process depicted in FIG. 19 is invoked, the process depicted in FIG. 18 has already invoked at least once so that the requested identity claims for a claim holder has already been stored in the blockchain network 1808, rendering the involvement of the identity service provider 1810 unnecessary in fulfilling the request for digital identity claim from the same claim holder.

Referring to FIG. 19, a flow chart of the process of identity claim issuance demonstrates the interactions among a claim holder 1902 via an iDentityChain mobile app 1904 running on the holder's mobile phone, iDentityChain platform Server 1906, and a Blockchain backend 1908. Since an identity claim plays a central part of the identity claim verification process, the process of retrieving identity claims for offline storage, like the process of identity claim issuance, is an indispensable prerequisite of the identity verification process, especially the offline identity verification process.

As 1910 indicates, the claim holder 1902, prior to the claim issuance process, has already done the onboarding to the iDentityChain platform via a web portal. That is to say, the claim holder has signed in on to the web portal and verifies the his/her basic identity in order to avail the services provided by the platform. Since the claim holder has already gone through the claim issuance process depicted in FIG. 18 before, he/she has already downloaded the iDentityChain mobile app 1904 and then, via the app, requests for identity claims 1912). Upon receiving the request, the iDentityChain platform Server 1906 verifies the request and pass it to the blockchain network 1908 (step 1914). The blockchain network 1908, upon receiving the request, validates the holder's basic identity claims (step 1916). Once the holder's basic identity claims are verified, the blockchain network 1908 sends all identity claims associated with the holder 1902, as signed payloads, to the iDentityChain server 1906 (see step 1918), which, in turn, sends the signed payloads to the iDentityChain mobile app 1904 (see step 1920). The app 1904 then stores the signed payloads in its identity wallet (see step 1922) to make them available for offline sharing/verification.

In general, the iDentityChain mobile app (or iDentityChain verifier mobile app) is to always sync with the server to fetch up-to-date digitally signed identity claims and store them in offline storage (such as the digital identity wallet shown in FIG. 17) to share and verify identity claims offline. A digital identity claim, because of being optimized by payload optimization algorithm (shown in Table 3), is small in size so that it can be shared to the iDentityChain verifier mobile app (or the iDentityChain mobile app if it's set to a claim verifier mode) using NFC HCE protocols by bringing two phones (on which the two apps are respectively up and running) closer together in a distance as short as within 10 centimeters. As stated before, when a claim holder is sharing identity claim, the mobile app running on his/her mobile phone acts as an NFC Host card emulator, and the verifier mobile app acts as an NFC Reader. Identity claims can be shared in handshake mode as well, when there is lack of trust between the claim holder and the verifier. Verifier, via the his/her verifier mobile app (which is set to a claim holder mode), sends the offline stored identity claim from the iDentityChain verifier mobile app and once holder verifies the authenticity of the verifier's identity claim, it shares its own identity claim to be verified by the verifier. Handshake mode thus adds additional layer of security between the two parties.

Figure 20:
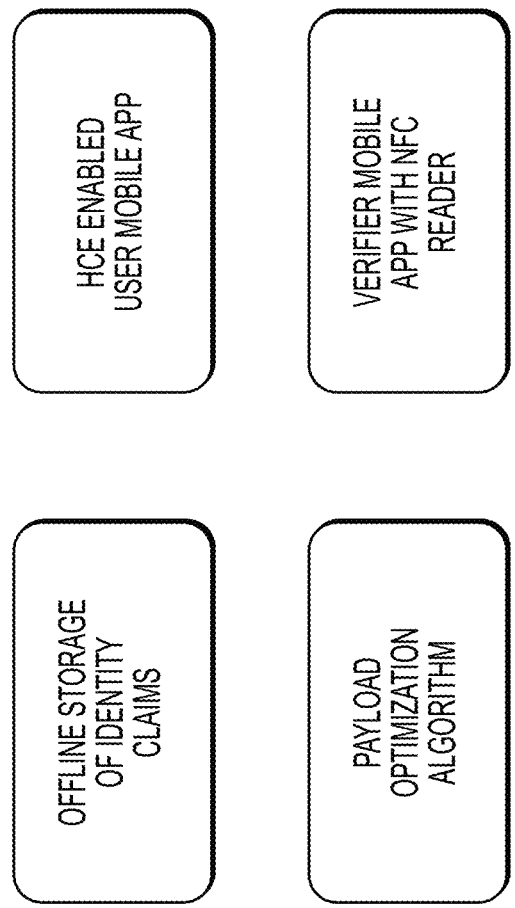
FIG. 20 shows four major components used in the identity sharing.

To facilitate the offline identity sharing summarized above, four major components are used: offline storage of identity claims, HCE enabled user mobile apps, payload optimization algorithm, and a verifier mobile app with NFC reader as shown in FIG. 20. Offline identity claims sharing enables users to share identity claims without having an active internet connection. Offline sharing supports sharing of identity between mobile-to-mobile devices using NFC wireless communication protocol, and the prerequisite of the sharing is that involving mobile devices should support the NFC HCE protocol. It's noted that the same components can also support online identity sharing and verification, and the system can be extended to other NFC terminal devices, payment systems, e-passport to manage identity claims on a larger scale.

Identity Management in NFC Enabled Smartwatches

It is worth mentioning the implementation details of using NFC-enabled smartwatches in identity claim sharing and verifying.

In one embodiment, Tizen OS-based NFC-enabled Samsung smartwatches are used for identity claim storage, sharing, and verification.

Tizen OS offers Host-based card emulation capabilities so that the smartwatch can read from and write identity claims to other devices. The app installed on the smartwatch for providing Host-based card emulation capabilities has a unique app code (i.e., AID D2760000850102) which gives it a unique identity that distinguishes it from another NFC-enabled app. Routing tables on the watch help Tizen OS to decide, by using the app codes, which app to enable at the time of reading/writing NFC data. Web-based smartwatch app has the same NFC configuration as it is for a mobile app like card emulation category as "OTHER" for nonpayment apps.

Figure 21:
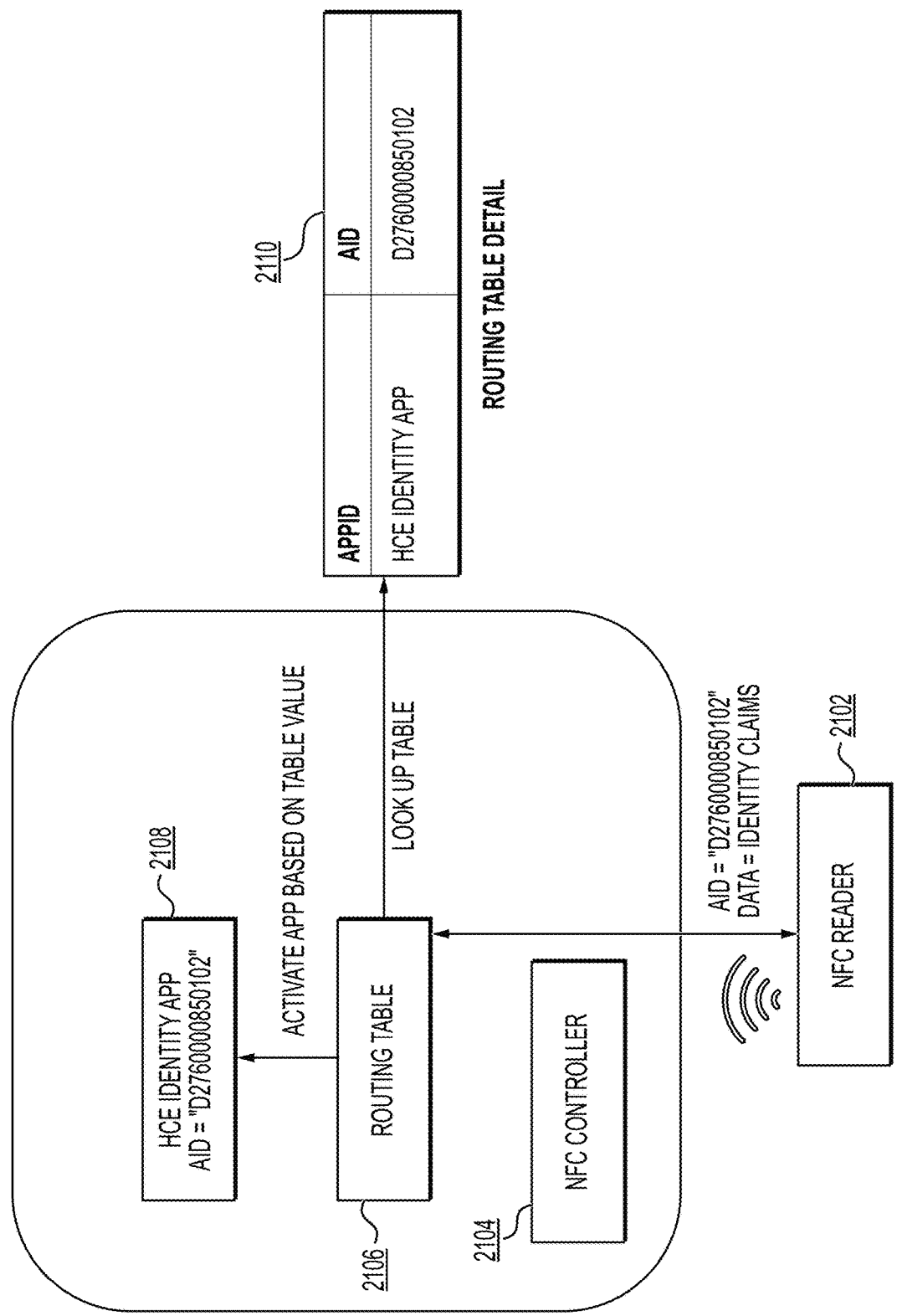
FIG. 21 schematically illustrates the host-based NFC card emulation device's key components, and the interactions among the components and an NFC Reader, in the settings under Tizen OS based NFC HCE. Note, Tizen OS is a Linux-based mobile operating system backed by the Linux Foundation, mainly developed and used primarily by Samsung Electronics. The project was originally conceived as an HTML5-based platform for mobile devices to succeed MeeGo.

FIG. 21, similar to FIG. 3 (smart device's Host-based Card Emulation (HCE)), shows the NFC Reader 2102, interacting with HCE-enabled app 2108 having a unique AID ("D2760000850102"), receiving routing table 2106 value (the value stored in 2110's "Appid" volume that corresponds to the AID of "D2760000850102") to be used in the app activation decision making process.

Figure 22:
FIG. 22 shows the appearances of the iDentityChain WaveID smartwatch app.
Figure 22:
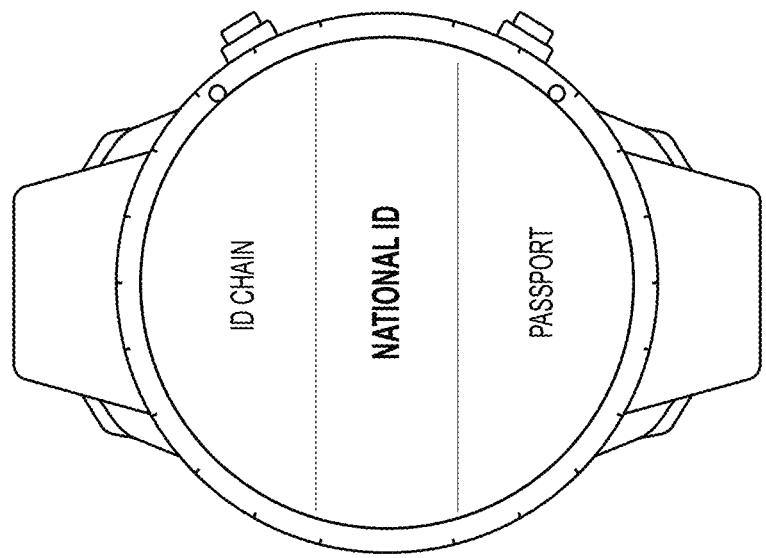

FIG. 22 shows an appearance of the iDentityChain WaveID smartwatch app specifically for wearable smartwatches. The app can be used for identity claims storage, sharing and verification.

A WaveID is an iDentityChain smartwatch app, and it lets its users to store, share and verify identity claims through NFC. WaveID is one of the portable identity systems where a user can simply wave and verify the his/her identities stored therein. The app is based on the Tizen OS and is available in Samsung based smartwatches. The app brings more portability to its users than the mobilephone based identity sharing/verifying apps bring, because the users need not to carry a physical card, nor to present phones to verify the identity—they just wave their WaveID enabled smartwatch and get their identities verified.

Offline Identity Sharing Between a Smartphone and a Smartwatch

Figure 23:
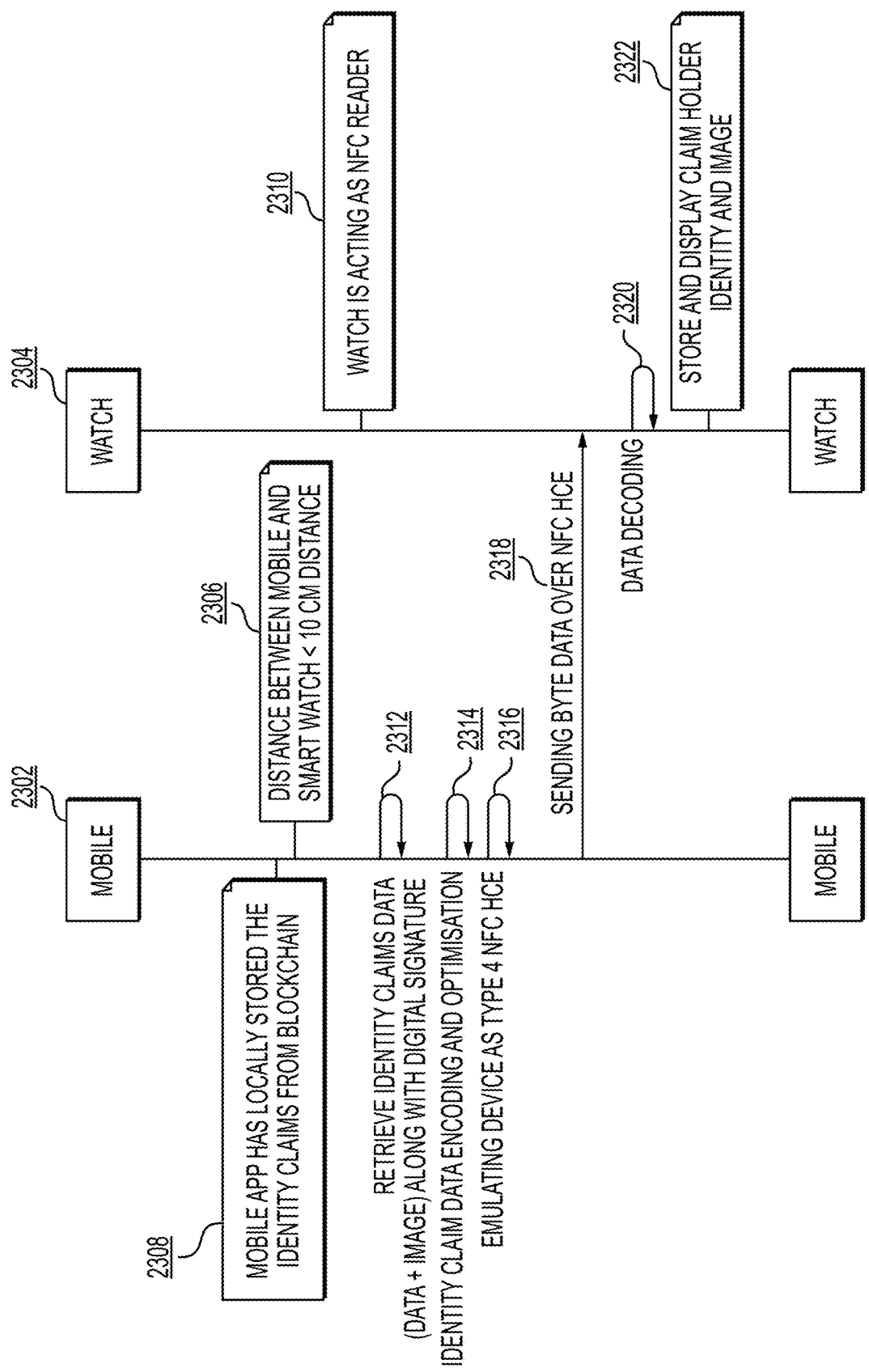
FIG. 23 schematically shows the flow of transferring an identity claim from an app-enabled smartphone to an app-enabled smartwatch.

To make identity claims usable and easier to share and verify, in one embodiment, the WaveID app has wave-n-verify features. Initially, as a setup, the user of a smartwatch enabled by an installed iDentityChain WaveID app, retrieves identity claims from the iDentityChain mobile app to the iDentityChain WaveID smartwatch app as depicted in FIG. 23. Note, since both the mobile phone 2302 and the watch 2304 are under the control of the user, the two devices are paired and thus making the watch retrieving information from the mobile phone is possible. Otherwise, the retrieval is not going to happen for the security reasons.

In the iDentityChain mobile app enabled mobilephone 2302, the app has locally stored the identity claims pre-retrieved from an identity claim management backend system (such as a blockchain system). In the WaveID app enabled smartwatch 2304, the watch acts as a NFC Reader (2310). When the mobilephone 2302 and the watch 2304 are placed within 10 cm (2306), identity claims data along with a digital signature is retrieved (2312) from the local storage of the mobilephone 2302. Using a payload optimization algorithm, packet size of the payload can be optimized in order to create a proper format to send the identity claims 2314). The formatted identity claims contain identity claim details in a comma-separated string in fixed order along with base 64 encoded user image and identity issuer digital signature.

The user mobilephone 2302 acts as HCE (2316) to write data (2318) to a close range (<10 cm) NFC reader such as the NFC-enabled watch 2304. Once received the identity claim data from the mobilephone, the NFC-enabled smartwatch reformats the data (2320), and stores information locally (2322).

Smartwatches, however, may need to sync after a few days as identity claims are not meant to be stored thereon for a very long time due to less frequent usage and due to the limited storage and processing capacity of smart watches. In some embodiments of the disclosure, cached identity claims on a smartwatch are removed after a pre-defined time limit (e.g., 2 days), and the removal and synchronization of identity claims from a pairing smartphone controlled by an identity claim holder can be done automatically at a pre-defined interval, so that identity claims on a watch stay relatively up-to-date. In fact, all claims on an identity claim holder's smartphone can also be automatically removed after a certain pre-defined time limit and re-synchronized in at a pre-defined interval so that the identity claims kept on the holder's smartphone are relatively up-to-date. Similarly, all claims on an identity claim verifier's smartphone (i.e., claims about the verifier's identity) can be automatically removed after a certain pre-defined time limit and re-synchronized in at a pre-defined interval so that the identity claims kept on the holder's smartphone are relatively up-to-date. All of the claim refreshing can be achieved via the apps on the smart devices. Usually, all identity claims cached on a phone is less frequently re-synchronized than all identity claims cached on a watch because phones have larger storage capacity than watches.

Offline Identity Sharing and Verification Between Smartwatch and Mobile App

Once the smartwatch app stores the identity claim claimed by a user (i.e., the claim holder), it is ready for any identity verification process offline. Like when applying a NFC payment, a smartwatch needs to be in and remain in close proximity to the iDentityChain Verifier mobile app enabled smartphone in order for the identity claim data to be transferred successfully.

In a similar way, a smartwatch like 2304 can also retrieve claim issuers' public key and/or other needed information/data stored on a smartphone 2302 on which those claim issuers' public key and/or needed information/data have been obtained when the smartphone onboarded the backend system. The retrieving process would essentially be the watch requesting the retrieval of all public keys and/or other needed information/data on the phone, whereas the phone granting the request and sending the keys and/or other needed information/data over to the watch, since the watch and phone are parried with each other and both are under the control of the identity claim holder who possesses the two devices. Having public keys of claim issuers on a watch is necessary, because the watch may need them to verify identity claims of an identity claim verifier in an offline identity sharing and verification using NFC Handshake between the watch and a smartphone held by the identity claim verifier in a similar way as shown in FIG. 8.

Figure 24:
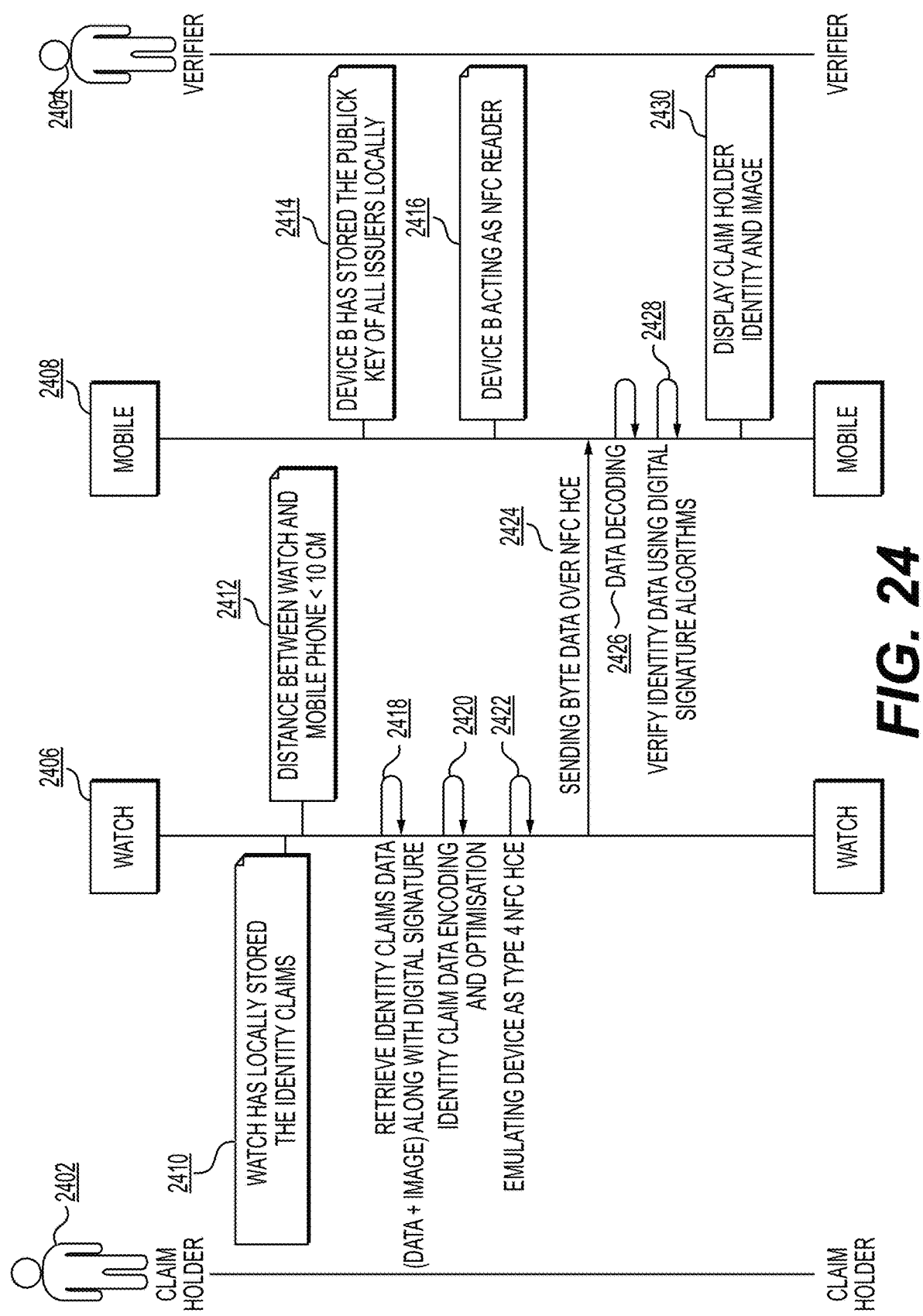
FIG. 24 schematically shows the flow of an app-enabled smartphone verifying an identity claim stored on an app-enabled smartwatch.

The process to share information between the a WaveID app enabled smartwatch and an iDentityChain Verifier mobile app enabled mobile phone is explained in FIG. 24.

NFC-enabled smartwatch app has retrieved, as shown in FIG. 23, the identity claims which consist of basic identity details, user Base64 image and identity issuers digital signatures.

The claim holder 2402 wears a WaveID app enabled smartwatch 2406, whereas the verifier 2404 carries an iDendityChain Verifier mobile app enabled mobile phone 2408. Being prepared by the process of retrieving identity claims shown in FIG. 23, the smartwatch 2406 has locally stored the identity claims in its WaveID app (2410) The mobile phone 2408, on the other hand, has stored the public key of all issuers locally in its iDentityChain Verifier mobile app (2414). When the two devices are placed close enough (<10 cm) (2412), the WaveID app starts the process with retrieving identity claims data (data+image) along with digital signature (2418), which is followed by encoding and optimizing the retrieved identity claim data (2420), and then by emulating the watch as Type NFC HCE (2422). In the mean time, the iDentityChain Verifier mobile app emulates the mobile phone 2408 as a NFC reader (2416). Then, the watch sends byte data of the claims over NFC HCE to the mobile phone (2424). Once all data have reached the mobile phone, the iDentityChain Verifier mobile app decodes the received data (2426), which is followed by verifying identity data using the digital signature algorithms (2428). And finally, if the data passes the verification, the iDentityChain Verifier mobile app displays Claim Holder 2402's identity and image on the screen of the mobile phone 2408, for the verifier 2404 to visually examine and/or orally inquiry the displayed information as if examining a passport or a driver's license of the claim holder.

It is noted that the verification process demonstrated in FIG. 24 can be extended to include a Handshake mode just as shown in FIG. 8 Offline identity sharing and verification using NFC Handshake between two app-enabled smartphones. In a Handshake mode verification between a smartwatch (held by an identity claim holder) and a smartphone (held by an identity claim verifier), before the holder shares his/her identity claim to the verifier, the verifier shares his/her identity claim to the holder to prove that he has the authority to verify other people's identity. In order for the holder to verify the verifier's identity claim, the holder's watch must have the public key of the issuer (who issued the verifier's identity claim) stored on the watch, and thus, the watch, when synchronizing the holder's identity claims from the holder's smartphone, also retrieves, from the holder's smartphone, the needed public keys of all issuers as well.

Additional Embodiment Details

The present disclosure may be a system, a method, and/or a computer program product. The computer program product and the system may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device or a computer cloud via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, Java, Python or the like, and conventional procedural programming languages, such as the "C" programming language or similar programming languages, and scripting programming languages, such as Perl, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

ADDITIONAL NOTES

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Certain embodiments of this disclosure are described herein, including the best mode known to the inventors for carrying out the disclosure. It should be understood that the illustrated embodiments are exemplary only, and should not be taken as limiting the scope of the disclosure.

Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for practice unless expressly described as "essential" or "critical". Moreover, those skilled in the art will recognize that changes and modifications may be made to the exemplary embodiments without departing from the scope of the present disclosure. Thus, different embodiments may include different combinations, arrangements and/or orders of elements or processing steps described herein, or as shown in the drawing figures. For example, the various components, elements or process steps may be configured in alternate ways depending upon the particular application or in consideration of cost. These and other changes or modifications are intended to be included within the scope of the present disclosure, as set forth in the following claims.

What is claimed is:

1. A method for offline sharing and verifying identity claims among app enabled and Near Field Communication (NFC) enabled portable devices, comprising:
    retrieving, by a first app installed and running on a first device that is held by an identity claim holder, a first set of identity claims that is pre-obtained and locally stored on the first device, wherein the first app is set to a claim holder mode, wherein the identity claim holder has onboarded with a backend system in an onboarding process of the identity claim holder with the backend system;
    encoding and optimizing, by the first app, the first set of identity claims into a first payload, and emulating the first device as a Type 4 NFC Host Card Emulation (HCE) device;
    moving, by an identity claim verifier, a second device enabled by a second app, to a distance less than 10 centimeter from the first device to allow the first device and the second device to establish an NFC communication, wherein the second device is a smartphone storing a public key of a claim issuer, and the second app is a smartphone-based app, wherein the second app is set to a claim verifier mode, wherein the public key of the claim issuer is previously retrieved from the backend system in an onboarding process of the identity claim verifier with the backend system, and wherein the public key of the claimer issuer is pre-assigned to the claim issuer by the backend system and stored in the backend system in an onboarding process of the claim issuer with the backend system;
    sending, by the first device upon an establishment of the NFC communication, the first payload to the second device;
    receiving and then decoding, by the second app, the first payload;
    verifying, by the second app, the authenticity of the first set of identity claims that is included in first payload, by validating, by using the pre-stored public key of the claim issuer, a first digital signature included in the first payload, wherein the validating applies a Rivest-Shamir-Adleman (RSA) algorithm to validate the first digital signature by passing the pre-stored public key of the claim issuer, the first digital signature, and a checksum of the first set of identity claims created by using a hashing algorithm;
    displaying, in the second app upon the authenticity of the first set of identity claims being verified, one or more identities and an image of the identity claim holder that are included in the first set of identity claims to the identity claim verifier.

2. The method for offline sharing and verifying identity claims among app enabled and Near Field Communication (NFC) enabled portable devices of claim 1, wherein the backend system is either a permissioned enterprise blockchain framework (FEBF) or a non-blockchain platform (NBP), wherein the FEBF comprises a built-in Certifying Authority (CA), a ledger, and a distributed network by using the FEBF's CA to obtain a plurality of public keys, a plurality of private keys, and a x.509 certificate, wherein the NBP comprises a data storage and an identity management server, wherein the first device is either a smartphone or a smartwatch, wherein the first app is a smartphone-based app when the first device is a smartphone, and the first app is a smartwatch-based app when the first device is a smartwatch.

3. The method for offline sharing and verifying identity claims among app enabled and Near Field Communication (NFC) enabled portable devices of claim 2, wherein the onboarding process of the claim issuer with the backend system comprising:
    registering the identity issuer in the backend system by providing a first set of required credentials of the identity issuer to an administrator of the backend system, wherein the required credentials of the identity verifier are information presented on a government issued document showing that the identity issuer is authorized to issue identity claims of other people within the scope of an authorized capacity,
    issuing, by the backend system, the public key, a x.509 certificate, and a private key to the claim issuer, and storing the public key, the x.509 certificate, and the private key in the backend system; and wherein the onboarding process of the identity claim holder with the backend system comprising:

registering the identity claim holder in the backend system by providing a first set of basic identity claims of the identity issuer to the administrator of the backend system, wherein the first set of basic identity claims of the identity claim holder comprises identity information about the identity claim holder presented on a government issued identification document of the identity claim holder, retrieving the public key of the identity issuer from the backend system, and storing the retrieved public key on the first device held by the identity claim holder; and wherein the onboarding process of the identity claim verifier with the backend system comprising:

registering the identity claim verifier in the backend system by providing a second set of basic identity claims and a second set of required credentials of the identity verifier to the administrator of the backend system, wherein the second set of basic identity claims of the identity claim verifier comprises identity information about the identity claim verifier presented on a government issued identification document of the identity claim verifier and the second set of required credentials of the identity verifier are information presented on a government issued document showing that the identity claim verifier is authorized to verify identity claims of other people, retrieving, by the identity claim verifier upon a successful registration of the identity claim verifier in the backend system, the public key of the identity issuer from the backend system, and storing the retrieved public key on the second device held by the identity claim verifier.

4. The method for offline sharing and verifying identity claims among app enabled and Near Field Communication (NFC) enabled portable devices of claim 3, wherein the first device is a smartphone, and wherein the first set of identity claims is pre-obtained by the first device when the first device is online in a first recurring process of obtaining the first set of identity claims for the first device, the first recurring process starts in a first pre-defined interval and the first recurring process comprising:

determining, by the first app, whether the first set of identity claims of the identity claim holder is stored on the first device;

in response to the determination of that the first set of identity claims of the identity claim holder is stored on the first device, further determining, by the first app, whether the first set of identity claims of the identity claim holder has been stored on the first device for more than a first pre-defined time limit;

in response to the determination of that the first set of identity claims of the identity claim holder has been stored on the first device for no more than the first pre-defined time limit, exiting the first recurring process of obtaining the first set of identity claims process, otherwise proceeding to the following steps;

removing, if there is the first set of identity claims of the identity claim holder on the first device, the first set of identity claims of the identity claim holder from the first device;

sending, by the identity claim holder via the first app on the first device, a request to issue the first set of identity claims of the identity claim holder, along with the first set of basic identity claims of the identity claim holder, to a middleware layer that infaces with the backend system;

sending, by the middleware layer upon successful authentication of the first set of basic identity claims of the identity claim holder based on the first set of basic identity claims of the identity claim holder, an event to the middleware layer to fetch a set of identity claims data for the identity claim holder;

determining, by the middleware layer, whether there is a signed identity payload of a set of identity claims of the identity claim holder stored on a storage device of the backend system;

in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the first app, otherwise creating, by the middleware layer, a signed identity payload, and sending the signed identity payload to the first app, wherein the creating step comprising:

sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system;

obtaining, by the first app, the signed identity payload from the middleware layer, and storing the signed identity payload on the first device, wherein the signed identity payload contains the first set of identity claims and a digital signature that is the result of the signing of the identity payload with the private key assigned to and possessed by the identity issuer; and storing, by the first app, the first set of identity claims on the first device.

5. The method for offline sharing and verifying identity claims among app enabled and Near Field Communication (NFC) enabled portable devices of claim 3, wherein the first device is a smartwatch, and wherein the first set of identity claims is pre-obtained by the first device from a third device that is an app-enabled and NFC-enabled smartphone and is under the control of the identity claim holder, in a second recurring process of obtaining the first set of identity claims for the first device, the second recurring process starts in a second pre-defined interval, and the second recurring process comprising:

determining, by the first app, whether the first set of identity claims of the identity claim holder is stored on the first device;

in response to the determination of that the first set of identity claims of the identity claim holder is stored on the first device, further determining, by the first app, whether the first set of identity claims of the identity claim holder has been stored on the first device for more than a second pre-defined time limit;

in response to the determination of that the first set of identity claims of the identity claim holder has been stored on the first device for no more than the second pre-defined time limit, exiting the second recurring process of obtaining the first set of identity claims process, otherwise proceeding to the following steps;

removing, if there is the first set of identity claims of the identity claim holder on the first device, the first set of identity claims of the identity claim holder from the first device, moving, by the identity claim holder, the first device, to a distance less than 10 centimeters from the third device, to allow the first device and the third device to establish an NFC communication, sending, by the first app upon establishing the NFC communication between the first device and the third device, a request to synchronize the first set of identity claims of the identity claim holder from the third device;

determining, by a third app running on the third device, whether the first set of identity claims of the identity claim holder is stored on the third device;

in response to the determination of that the first set of identity claims of the identity claim holder is stored on the third device, the third app sending the first set of identity claims of the identity claim holder to the first app, otherwise the third app conducting steps comprising:

sending, by the third app, a request to issue the first set of identity claims of the identity claim holder, along with the first set of basic identity claims of the identity claim holder, to a middleware layer that infaces with the backend system, sending, by the middleware layer upon successful authentication of the first set of basic identity claims of the identity claim holder, an event to the middleware layer to fetch a set of identity claims data for the identity claim holder, determining, by the middleware layer, whether there is a signed identity payload of a set of identity claims of the identity claim holder stored on a storage device of the backend system, in response to the determination of that there is a signed identity payload of a set of identity claims of the identity claim holder stored on the storage device of the backend system, retrieving and sending to the third app on the third device, by the middleware layer, the signed identity payload, and obtaining, by the third device, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device; otherwise, creating, by the middleware layer, an identity payload based on the x.509 certificate assigned to and possessed by the identity issuer and is signed with the private key assigned to and possessed by the identity issuer, storing, by the middleware layer, the signed identity payload in the storage device of the backend system, sending to the third app, by the middleware layer, the signed identity payload, obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer, and storing, by the third app, the first set identity claims on the third device; and sending, by the third app, the first set of identity claims of the identity claim holder to the first app.

6. The method for offline sharing and verifying identity claims among app enabled and Near Field Communication (NFC) enabled portable devices of claim 5, wherein the first set of identity claims is pre-obtained by the third device when the third device is online in a third recurring process of obtaining the first set of identity claims for the third device, the third recurring process starts in a third pre-defined interval and the third recurring process comprising:

determining, by the third app, whether the first set of identity claims of the identity claim holder is stored on the third device;

in response to the determination of that the first set of identity claims of the identity claim holder is stored on the third device, further determining, by the third app, whether the first set of identity claims of the identity claim holder has been stored on the third device for more than a third pre-defined time limit;

in response to the determination of that the first set of identity claims of the identity claim holder has been stored on the third device for no more than the third pre-defined time limit, exiting the third recurring process of obtaining the first set of identity claims process, otherwise proceeding to the following steps;

removing, if there is the first set of identity claims of the identity claim holder on the third device, the first set of identity claims of the identity claim holder from the third device;

sending, by the identity claim holder via the third app on the third device, a request to issue the first set of identity claims of the identity claim holder, along with the first set of basic identity claims of the identity claim holder, to the middleware layer that infaces with the backend system;

sending, by the middleware layer upon successful authentication of the first set of basic identity claims of the identity claim holder based on the first set of basic identity claims of the identity claim holder, an event to the middleware layer to fetch a set of identity claims data for the identity claim holder;

determining, by the middleware layer, whether there is a signed identity payload of a set of identity claims of the identity claim holder stored on a storage device of the backend system;

in response to the determination of that there is a signed identity payload of a set of identity claims of the identity claim holder stored on the storage device of the backend system, retrieving, by the middleware layer, the signed identity payload of a set of identity claims of the identity claim holder stored on the storage device of the backend system, and sending the signed identity payload to the third app, otherwise creating, by the middleware layer, a signed identity payload, and sending the signed identity payload to the third app, wherein the creating step comprising:

sending, by the backend system, an event to the identity issuer to get identity details of the identity claim holder, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system;

obtaining, by the third app, the signed identity payload from the middleware layer, and storing the signed identity payload on the third device, wherein the signed identity payload contains the first set of identity claims and a digital signature that is the result of the signing of the identity payload with the private key assigned to and possessed by the identity issuer; and storing, by the third app, the first set of identity claims on the third device.

7. The method for offline sharing and verifying identity claims among app enabled and Near Field Communication (NFC) enabled portable devices of claim 6, wherein the third pre-defined interval is longer than the second pre-defined interval, and the third pre-predefined time limit is longer than the second pre-defined time limit.

8. The method for offline sharing and verifying identity claims among app enabled and Near Field Communication (NFC) enabled portable devices of claim 3, further comprising verifying, by the identity claim holder, the identity of the identity claim verifier prior to the step of retrieving, by the first app installed and running on a first device that is held by an identity claim holder, a first set of identity claims that is pre-obtained and locally stored on the first device, wherein the verifying the identity of the identity verifier comprising:

setting the second app to a claim holder mode, setting the first app to the claim verifier mode, retrieving, by the second device acting as an NFC Writer under the control of the second app, a second set of identity claims that is pre-obtained and locally stored on the second device, encoding and optimizing, by the second app, the second set of identity claims into a second payload, adding a nonce value to the second payload, and emulating the second device as a Type 4 NFC HCE device, moving, by the identity claim verifier, the second device, to a distance less than 10 centimeters to the first device to allow the second device and the first device to establish an NFC communication, wherein the first device stores the public key of the identity issuer, wherein the public key of the claim issuer is previously retrieved from the backend system in the onboarding process of the identity claim holder with the backend system, sending, by the second app upon an establishment of the NFC communication, the second payload to the first device, receiving, by the first device acting as an NFC Reader under the control of the first app, the second payload, decoding, by the first app, the second payload, and storing the nonce value added to the second payload on the first device;

verifying, by the first app by using the public key of the claim issuer, the authenticity of the second set of identity claims by validating a second digital signature included in the second payload, wherein the validating applies the RSA algorithm to validate the second digital signature by passing the public key of the claim issuer, the second digital signature, and a checksum of the second set of identity claims created by using the hashing algorithm;

displaying, in the first app upon the authenticity of the second set of identity claims being verified, one or more identities and an image of the identity claim verifier that are included in the second set of identity claims to the identity claim holder;

wherein the encoding and optimizing, by the first app, the first set of identity claims into a first payload, further comprising adding the nonce value stored on the first device to the first payload; and wherein the verifying, by the second app, the authenticity of the first set of identity claims, further comprising:

determining whether the nonce value included in the first payload matches with the nonce value added to the second payload;

in response to the determination of that the nonce value included in the first payload does not match with the nonce value added to the second payload, aborting, by the second app, the verifying step, otherwise, continuing the verifying step.

9. The method for offline sharing and verifying identity claims among app enabled and Near Field Communication (NFC) enabled portable devices of claim 8, wherein the step of retrieving the first set of identity claims only proceeds when the identity of the identity claim verifier is successfully verified by the identity claim holder.

10. The method for offline sharing and verifying identity claims among app enabled and Near Field Communication (NFC) enabled portable devices of claim 8, wherein the second set of identity claims is pre-obtained by the second device when the second device is online in a fourth recurring process of obtaining the second set of identity claims for the second device, the fourth recurring process starts in a fourth pre-defined interval and the fourth recurring process comprising:

determining, by the second app, whether the second set of identity claims of the identity claim verifier is stored on the second device;

in response to the determination of that the second set of identity claims of the identity claim verifier is stored on the second device, further determining, by the second app, whether the second set of identity claims of the identity claim verifier has been stored on the second device for more than a fourth pre-defined time limit;

in response to the determination of that the second set of identity claims of the identity claim verifier has been stored on the second device for no more than the fourth pre-defined time limit, exiting the fourth recurring process of obtaining the second set of identity claims process, otherwise proceeding to the following steps;

removing, if there is the second set of identity claims of the identity claim verifier on the second device, the second set of identity claims of the identity claim verifier from the second device;

sending, by the identity claim verifier via the second app on the second device, a request to issue the second set of identity claims of the identity claim verifier, along with the second set of basic identity claims of the identity claim verifier, to a middleware layer that infaces with the backend system;

sending, by the middleware layer upon successful authentication of the second set of basic identity claims of the identity claim verifier based on the second set of basic identity claims of the identity claim verifier, an event to the middleware layer to fetch a set of identity claims data for the identity claim verifier;

determining, by the middleware layer, whether there is a signed identity payload of a set of identity claims of the identity claim verifier stored on a storage device of the backend system;

in response to the determination of that there is a signed identity payload of a set of identity claims of the identity claim verifier stored on the storage device of the backend system, retrieving, by the middleware layer, the signed identity payload of a set of identity claims of the identity claim verifier stored on the storage device of the backend system, and sending the signed identity payload to the second app, otherwise creating, by the middleware layer, a signed identity payload, and sending the signed identity payload to the second app, wherein the creating step comprising:

sending, by the backend system, an event to the identity issuer to get identity details of the identity claim verifier, creating, by the identity issuer, an identity payload based on the x.509 certificate assigned to and possessed by the identity issuer and signing the payload with the private key assigned to and possessed by the identity issuer, sending, by the identity issuer, the signed identity payload to the backend system, and storing, by the backend system, the signed identity payload in the storage device of the backend system;

obtaining, by the second app, the signed identity payload from the middleware layer, and storing the signed identity payload on the second device, wherein the signed identity payload contains the second set of identity claims and a digital signature that is the result of the signing of the identity payload with the private key assigned to and possessed by the identity issuer; and storing, by the second app, the second set of identity claims on the second device.

\* \* \* \* \*